METHOD OF MAKING CHROMOGEN-BONDED-POLYMER AND PRODUCTS THEREOF

Filed Aug. 4, 1967 3 Sheets-Sheet 1

INVENTORS
SHOJIRO HORIGUCHI
MICHIEI NAKAMURA

BY Bernard Olcott

ATTORNEY

METHOD OF MAKING CHROMOGEN-BONDED-POLYMER AND PRODUCTS THEREOF

Filed Aug. 4, 1967 3 Sheets-Sheet 2

*INVENTORS*
SHOJIRO HORIGUCHI
MICHIEI NAKAMURA

*BY* Bernard Olcott

ATTORNEY

METHOD OF MAKING CHROMOGEN-BONDED-POLYMER AND PRODUCTS THEREOF

Filed Aug. 4, 1967 3 Sheets-Sheet 3

INVENTOR.
SHOJIRO HORIGUCHI
MICHIEI NAKAMURA

BY Bernard [signature]

ATTORNEY

United States Patent Office 3,637,581

Patented Jan. 25, 1972

1

3,637,581

METHOD OF MAKING CHROMOGEN-BONDED-POLYMER AND PRODUCTS THEREOF

Shojiro Horiguchi, 965 Shimohoya, Hoyamachi, Kitatama-gun, Tokyo, Japan, and Michiei Nakamura, 156, 5-chome, Motobuto-cho, Urawa-shi, Saitama-ken, Japan Continuation-in-part of application Ser. No. 477,946, Aug. 6, 1965. This application Aug. 4, 1967, Ser. No. 658,465

Int. Cl. B44d *1/00;* C08d *11/00;* C08f *45/04*

U.S. Cl. 260—41.5 R 21 Claims

ABSTRACT OF THE DISCLOSURE

A method of making a metal phthalocyanine-bonded-polymer comprising diazotizing triamino metal phthalocyanine in aqueous medium containing hydrochloric acid in a quantity which exceeds its theoretical quantity by at least 10 moles per one amino radical to produce the diazotized product comprising diazotized triamino metal phthalocyanine, stabilizing the diazotized product with a stabilizer to produce the stabilized diazo compound, mixing the stabilized diazo compound with an addition-polymerizable monomer and polymerizing said monomer using the stabilized diazo compound as an initiator for the polymerizing to form the metal phthalocyanine-bonded-polymer and the metal phthalocyanine-bonded-polymer made thereby.

CROSS REFERENCE TO RELATED APPLICATIONS

This application is a continuation-in-part application of application S.N. 477,946, filed Aug. 6, 1965, now abandoned for A Method of Making Chromogen Bonded Polymer and Products Thereof.

BACKGROUND OF THE INVENTION

This invention relates to colored polymers. More particularly, it relates to a novel chromogen-bonded-polymer, a method of making such novel chromogen-bonded-polymer and a process for coloring articles therewith.

Known dyes which have been generally utilized in the dyeing industry, while satisfactorily bright in color, are characterized by weak resistance to light, heat, chemicals, migration, solvents, etc. By contrast, pigments generally have satisfactory resistance characteristics but the brightness of their color and the transparency thereof are much inferior to conventional dye both in the case of a single color as well as that of combined colors. Therefore, in using a pigment which is inherently of much larger particle size than a dye, as a coloring agent, the pigment has to be repeatedly kneaded with solvents, varnishes, plasticizers, plastics and the like, using various dispersing apparatus to obtain smaller particles.

Particles of pigment tend to reaggregate or refloculate during a pressure filtering process, and may further aggregate again several times during a drying process to form very hard clusters. Pigment, once formed into such hard clusters, can never again be dispersed completely satisfactorily with mechanical devices. As particles of pigment are much larger than those of dyes to begin with, not only are pigments insufficiently transparent but also their brightness in color is much inferior to that of dyes. Furthermore, large particles result in a lowering of abrasion resistance in case of coatings, and in a degradation of mechanical and electrical properties in the case of mixed coloring and inner coloring, and thus adversely affect the colored material to cause ageing, degradation, excoriation and delamination thereof.

2

Accordingly, it is an important object of this invention to provide a chromogen-bonded-polymer which overcomes the aforestated defects of dyes and pigments, i.e., which has a high degree of transparency and high tinting strength, and which is characterized by superior retention of physical, mechanical and electrical properties, and good resistance to chemical and physical wear.

A chromogen-bonded-polymer is a colored polymer in which a chromogen-portion is directly and chemically bonded to a polymer portion. It has been found to be an excellent coloring agent having a brightness of color comparable to that of dyes, light and chemical resistance characteristics which are superior to those of pigments and tinting and fixing strength comparable to that of high-polymer binders.

SUMMARY OF THE INVENTION

In accordance with this object there is provided an addition-polymer having in its structure at least one chromogen containing unit to provide a metal phthalocyanine bonded polymer. This chromogen portion has the following general structural formula:

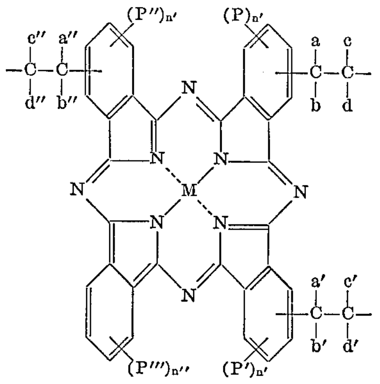

wherein M is selected from the group consisting of copper, cobalt, and nickel in which *a*, *a'* and *a''* are selected from the group consisting of —H and —$CH_3$ radicals; *b*, *b'*, and *b''* are selected from the group consisting of —H and —$CH_3$ radicals; *c*, *c'*, and *c''* are selected from the group consisting of —H, —$CH_3$, —Cl, and —CN radicals; *d*, *d'*, and *d''* are selected from the group consisting of —OCOR, —OCOAr, —COOH, —COOR, —$COOR_2OH$,

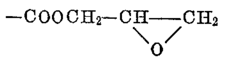

—CHO, —COCl, —CN, $CONH_2$, —$CONHCH_2OH$, —$CONHCH_2OR_1$, —$CONHCH_2SO_3H$, —$CON_3$

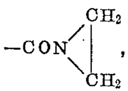 , —$CONHC_2H_4SO_3H$, —NCO, —$NHCONH_2$

—NHCOOAr,

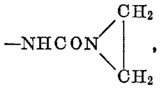 , 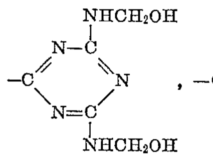 , 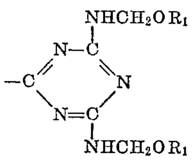

—Ar, —Cl, and —Br radicals wherein $R_1$ is selected from the group consisting of $C_nH_{2n''+1}$ in which *n''* is an integer from 1 to 18, $R_2$ is selected from the group consisting of $C_{n''}H_{2n'''}$, which *n'''* is an integer from 1 to 5 and Ar is selected from the group consisting of —$C_6H_5$, —$C_6H_4CH_3$, and $C_{10}H_7$ radicals; $p$, $p'$, $p''$, and $p'''$ are selected from the group consisting of —H, halogen radicals, and $—SO_3H$,

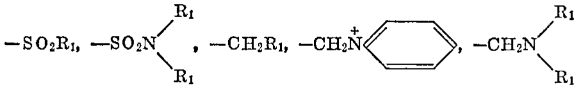

radicals wherein $R_1$ is selected from the group consisting of —H, $—CH_3$, $—C_2H_5$, $—C_3H_7$, and $—C_4H_9$ radicals and in which $n'$ is an integer from 1 to 3 and $n''$ is an integer of from 1 to 4.

DESCRIPTION OF PREFERRED EMBODIMENTS

Figure 1:
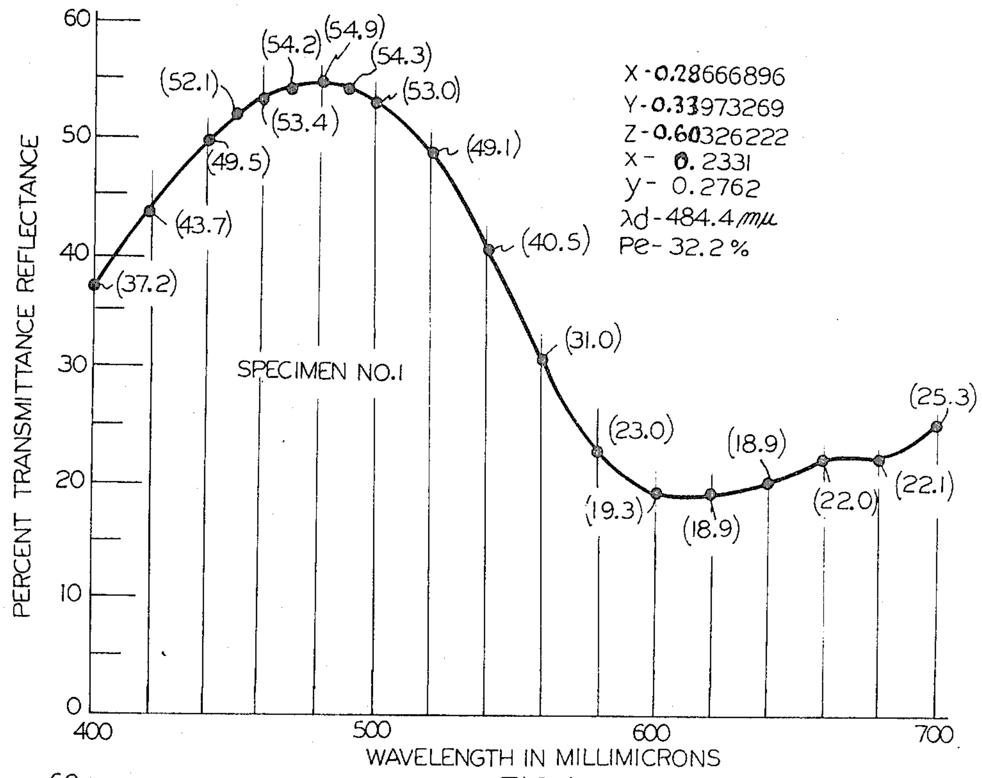
FIG. 1 is a curve showing percent transmittance reflectance of a specimen of a mixed polyester-cotton cloth colored with a methylolated copper phthalocyanine blue (tri)-bonded-polyacrylamide in accordance with the invention.
Figure 2:
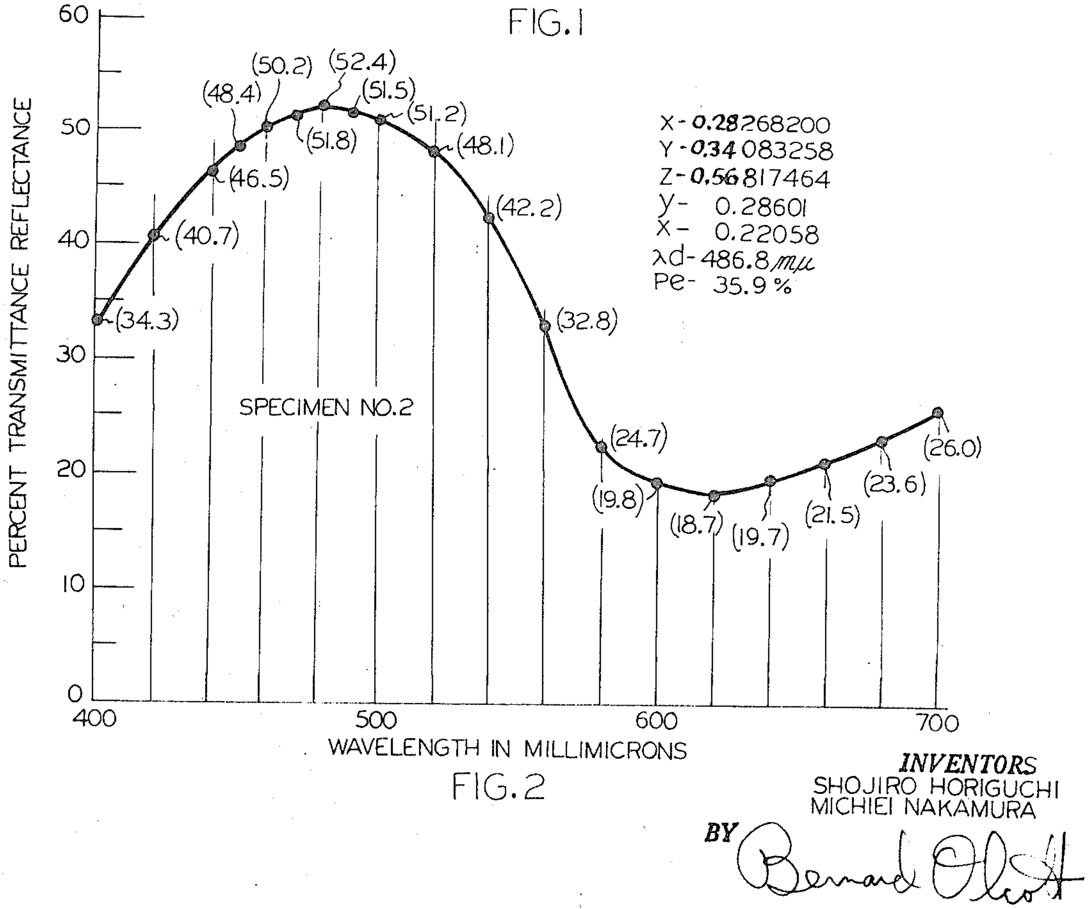
FIG. 2 is a curve similar to that of FIG. 1 but showing the reflectance of a specimen of a polyester-cotton cloth colored with a methylolated copper phthalocyanine blue (tetra)-bonded-polyacrylamide.
Figure 3:
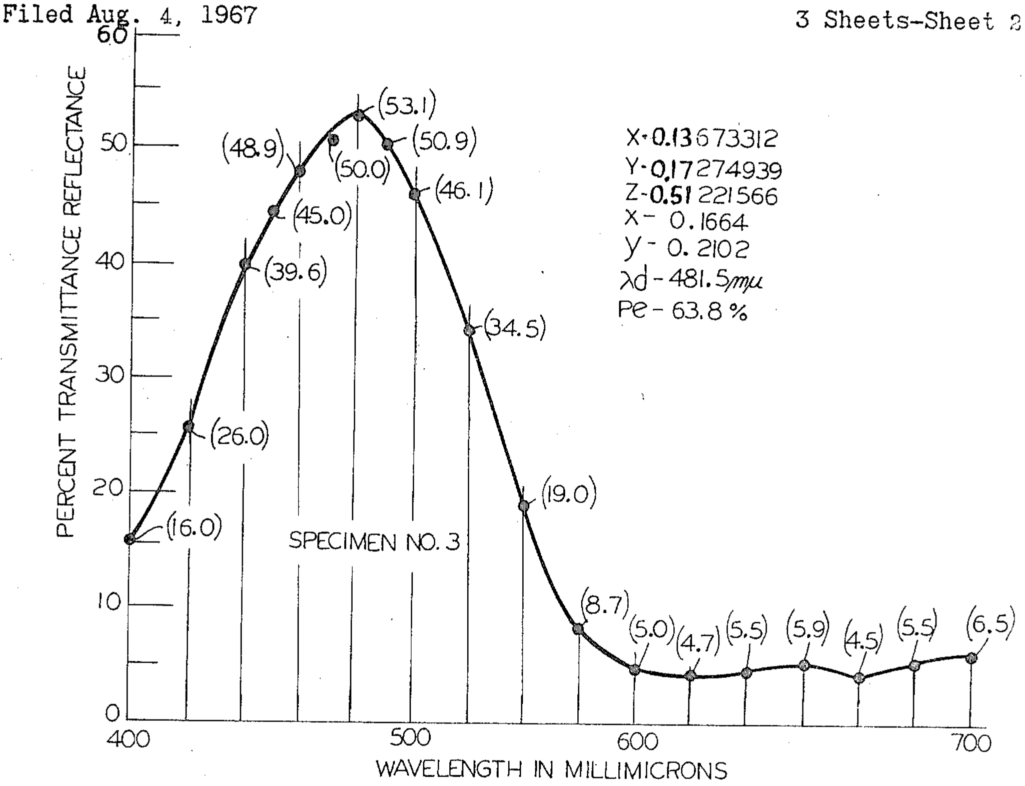
FIG. 3 is a curve similar to that of FIGS. 1 and 2 showing the reflectance of art paper treated with copper phthalocyanine blue (tri)-bonded-polymethyl methacrylate according to the invention.
Figure 4:
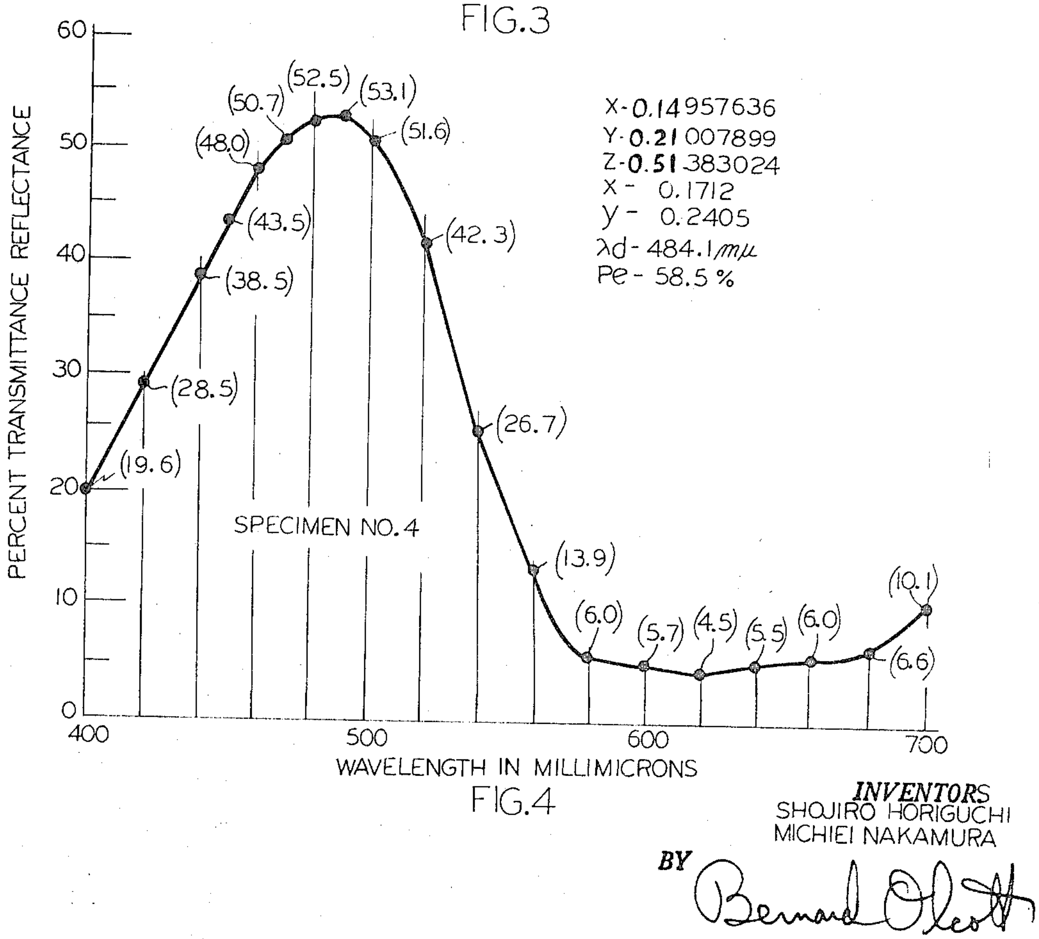
FIG. 4 is a curve similar to that of FIGS. 1 to 3 but showing the reflectance of a specimen of art paper treated with copper phthalocyanine blue (tetra)-bonded-polymethyl methacrylate.

The method of producing the chromogen-bonded-polymer comprises diazotizing triamino metal phthalocyanine in aqueous medium containing hydrochloric acid in a quantity which exceeds its theoretical quantity by at least 10 mols per one amino radical to produce the diazotized product comprising diazotized triamino metal phthalocyanine, stabilizing this diazotized product with a material selected from the group consisting of heavy metal salts, organic acids, inorganic acids, salts of organic acids, salts of inorganic acids and amino compounds, mixing the stabilized product with an addition-polymerizable monomer and polymerizing the monomer to form the metal phthalocyanine-bonded-polymer.

The mechanism of formation of the metal phthalocyanine-bonded-polymer is a follows:

The stabilized diazonium salt or the stabilized diazo compound of the metal phthalocyanine is decomposed by an action of pH variation, heat or light, etc., producing nitrogen gas to form a free radical-containing-metal phthalocyanine which acts as a polymerization initiator for the polymerization of the addition-polymerizable monomers.

The thus formed free radical-containing-metal phthalocyanine attacks the monomers and reacts to them, binding the metal phthalocyanine to the monomer with a covalent bond of carbon to carbon and forming free radicals at the end group of this reaction product. Simultaneously, the free radicals of the reaction product are continuously propagated to the other monomers and polymerize the latter monomers thereby producing the chromogen-bonded-polymer.

The existence of the carbon to carbon covalent bond of the metal phthalocyanine portion and the polymer portion was confirmed by both chemical analysis and instrumental analysis. It was ascertained that one of the products obtained by the procedure of the decomposition (depolymerization, oxidation and hydrolysis) of the copper phthalocyanine blue-bonded-polymer produced by using 4.4'.4''-triamino copper phthalocyanine blue was trimellitic acid (benzene-1,2,4-tricarboxylic acid) through the examinations of its infrared spectrum and melting point. From the examinations, it can be concluded that that first methylene group in the polymer portion, was converted to a carboxylic acid group by oxidation, and that the position of this carboxylic acid group was the same as that of the stabilized diazonium salt group in the copper phthalocyanine blue-containing-stabilized diazonium salt.

The metal phthalocyanine blue-bonded-polymer could not be separated into two parts, i.e., a copper phthalocyanine blue part and a polymer part, by using solvents. In photographs thereof obtained by the electron microscope, no particle of the copper phthalocyanine blue was recognized in the cases both before and after a xylene treatment at elevated temperature. In addition, its X-ray diffraction analysis charts showed that the copper phthalocyanine blue-bonded-polymer was amorphous and free of any crystalline material both before and after the xylene treatment at elevated temperatures. This is because, the polymer portion bonded to the chromogen portion acts as the solubilizing or dispersing group in a suitable medium, and interferes with the formation of a crystalization of the copper phthalocyanine portion with its steric hindrance.

Known pigments of the phthalocyanine group, of which only those of reddish blue, yellowish green and black have been discovered heretofore, are generally quite stable with good resistance to the deleterious effects of light, heat, acids, bases, solvents, chemicals and oils. The one exception among the phthalocyanine pigments is the unstable phthalocyanine blue.

Furthermore, phthalocyanine pigments have better tinting strength and are produced at a cost much lower than other pigments. Consequently, the phthalocyanine pigments, of substantially all pigments, are the ones most advantageously utilized in industry.

With regard to the phthalocyanine blue, such as copper phthalocyanine blue, it has been definitely established by internal observation and investigation that copper phthalocyanine blue, upon being chlorinated or brominated, can be varied in color shade from blue to green depending upon the number of substituents and the position of these substituents. It is also known that copper-phthalocyanine blue forms several types of crystalline structures such as the alpha, beta and gamma types. However, the use of the known copper-phthalocyanine blue, presents the following disadvantages:

(1) Dispersibility is extremely poor. Since crystalline structures of the alpha, beta, gamma types, etc. form exceedingly solid crystals, they cannot be completely broken down into ultrafine particles by mechanical means. Therefore, if copper-phthalocyanine blue is used as mix-coloring material, it is physically weakened whereby ageing of an article colored thereby is accelerated, and the electric properties of such article are adversely affected. Moreover, when copper-phthalocyanine blue is used as a coating coloring material, the color shade turns to almost black because of its strong tinting ability and lack of transparency, whereby the attractive blue shade that copper-phthalocyanine blue normally possesses cannot be maintained. Accordingly, the pigment concentration of the copper-phthalocyanine blue has to be decreased to a desired level with white pigment.

(2) It presents the problem of double colors: As mentioned hereinabove, because of the darkening caused by the good tinting strength, lack of transparency of copper-phthalocyanine blue, white pigments such as titanium oxide are often used to dilute the copper-phthalocyanine blue pigment in order to obtain a desirable concentration thereof. However, during the process of dilution, only the copper-phthalocyanine blue pigment flocculates causing color separation whereby the surface of the colored article is made light brown and dull as well as uneven in color.

In order to improve the properties of copper-phthalocyanine blue, it has been attempted to prevent color separation of the titanium white pigment by the introduction into the benzene nucleus of copper-phthalocyanine blue of various substituents (such as hydrogen, halogens (Cl, Br, etc.) or $—SO_2R$, $SO_3H$, $—SO_2NRR'$, $—CH_2R$,

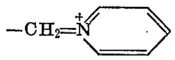

$—CH_2NRR'$, etc.), or by coating the surface of the pigment with other materials. However, introduction of such substituents has not produced desired results. Such ineffectiveness of substituents results from the different electric charge of the copper-phthalocyanine blue as compared with other pigments. In this latter connection, it has been shown that when degrees of electrophoresis of organic pigments fully dispersed in water are measured, only copper-phthalocyanine blue is found to have plus charge, while the other pigments respectively have minus charges. This unique characteristic of copper-phthalocyanine blue with regard to such electric charge tends to lower the electrical resistance of the colored material or article.

The known copper phthalocyanine blue pigment cannot be dissolved in any organic or inorganic solvent except sulfuric acid (it is slightly soluble in α-chloronaphthalene).

In general, the crude copper phthalocyanine blue pigment condensed at elevated temperatures, of which the crystal form is stable, has very poor tinting ability. To improve such tinting ability under ordinary processing conditions, the crude pigment is dissolved in sulfuric acid and then this sulfuric acid solution is poured slowly into a large quantity of water with strong stirring to form fine particles of copper phthalocyanine pigment which is employed in conventional usage.

However, the thus obtained copper phthalocyanine blue pigment, which has an attractive and distinct color, is extremely unstably crystalline in a solvent other than a hydrophilic one, and in a plasticizer. Particularly, in an organic solvent of the aromatic group, copper phthalocyanine blue reforms into relatively large crystals after undergoing a stable-type crystal transposition. Consequently, the result is that the copper phthalocyanine blue is finally of no value as a pigment, is dull in color with a greyish shade, and also loses tinting strength.

Such undesirable phenomena occur only in such media as aromatic solvents but also, in varnish, plasticizers and plastics, in which the pigment gradually undergoes crystal transposition and grows into particles. Coloring materials such as inks and paints containing the pigment and which have been in storage for a relatively long time may lose their properties as coloring materials and not only are their tinting strengths weakened, but their physical characteristics are also degraded.

Thus, it is readily appreciated that the mixing of the unstable type of copper phthalocyanine blue for combinations of colors is not desirable, and that a more stable crystal type of copper phthalocyanine blue has to be employed for paints, lacquers, inks, etc. in which a hydrophobic solvent is used.

A stable copper phthalocyanine blue pigment is produced in a method of making corpuscles of the unstable type of phthalocyanine blue such minute particles being obtained by recrystallizing the copper phthalocyanine blue in sulfuric acid solvent, the latter particles undergoing crystal transposition into a stable type in acetone or xylene, and being broken down using a ball-mill or like means. When the said particle crystals are broken down in the ball-mill, small particles of stable pigment are obtained.

However, since the aforesaid process of producing the stable type of copper phthalocyanine blue pigment is complicated, takes a long time, and entails the use of an inflammable solvent, it is not suitable for mass-production. As a consequence, the production cost thereof is considerably higher than that of the method for making the unstable type of phthalocyanine blue pigments.

In order to overcome the aforementioned defects of the ordinary unstable type of copper phthalocyanine blue pigment, viz: (1) inferior dispersibility, (2) lack of transparency, (3) the problem of double color caused by its unique electric charge, and (4) crystal transposition, etc. while retaining the various advantageous properties of phthalocyanine blue as a pigment, various types of pigments of the phthalocyanine group are utilized as the chromogen portion of a chromogen-bonded-polymer.

In this regard, the variations in the phthalocyanine group pigments are considered from the following two points.

(1) Variation due to the type of metal forming its central nucleus (2) Variation due to substituents on the outer benzene nucleus, i.e., types and numbers of substituents and the positions thereof.

First, in connection with the effects of different metals forming the central nucleus of the phthalocyanine pigments, variations in color from blue to green have been produced, but red and yellow colors have not been produced using all species of metals. It is to be noted that:

Metals unstably electrovalent are: Li, Na, K, Ag, Ca, Ba, Cd, etc.

Metals of the stable covalent bond type are: Cu, Be, Mg, Zn, Al, Ti, Sn, Pb, V, Cr, Mo, Mn, Fe, Co, Ni, Pd, Pt. Of the stable metals, the most stable ones thereof are: Cu, which when used as the central nucleus provides a vivid blue color, Zn (greenish blue), V (greenish blue), Cr (dark green), Mo (dark blue green), Mn (olive green), Fe (dark yellowish green), Co (blue), Ni (greenish blue), and Pt (greenish blue).

The metals which provides a pigment most resistive to the effects of sunlight and with vivid color are Cu, Co and Ni.

In view of the foregoing, an intensive study has been made of the following selected from among the metal phthalocyanine group:

(a) copper phthalocyanine group
(b) cobalt phthalocyanine group
(c) nickel phthalocyanine group The standard formula of the metal phthalocyanine follows in which M is selected from the group consisting of Cu, Co, and Ni.

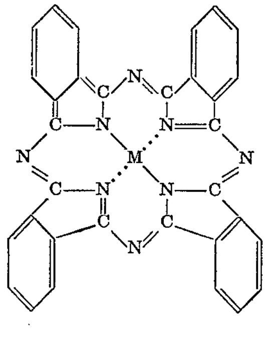

With regard to the number and types of substituents on the outside benzene nucleus of the metal phthalocyanine, it has been found that when electro-negative radicals, i.e. electron acceptors such as —$NO_2$, —Cl, —Br, —$SO_3H$, —$N_2Cl$ and radicals in which the π-electron moves easily such as in the phenyl and naphthyl radicals, are replaced, absorbed light waves are transformed to a longer wave length and consequently the visible color of the pigment turns from blue into green.

As the number of substituents is increased, such tendency to change color is enhanced and accelerated. By contrast, electro-positive radical substituents such as —$CH_2$—, —$CH_3$, —$CH_2CH_3$, —$CH_2R$, etc. do not cause a varying in color but the absorbed wave lengths are increased.

As for the effect of the selection of substituent positions, substituent positions 3 and 6 are more effective for its green shade than positions 4 and 5. In this latter connection, it has been found that in the introducing of substituents into copper phthalocyanine blue by an after-treatment such as chlorination, bromination, etc., it is more desirable to leave positions 3 and 6 unsubstituted. In this connection, an attempt was first made to produce copper phthalocyanine blue and green with

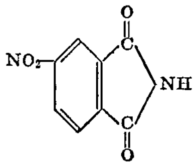 or 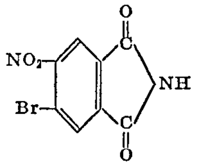

as a starting material. The combinations which were attempted are set forth in the following table. The reactants utilized were 4-nitro-phthalimide and phthalimide.

TABLE I

| 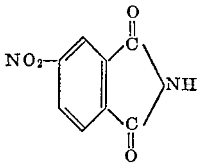 4-nitro-phthalimide | 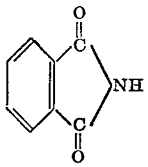 Phthalimide | Main product | —$NH_2$·HCl | —$N_2Cl$ |
|---|---|---|---|---|
| 1 mol | 3 mol | 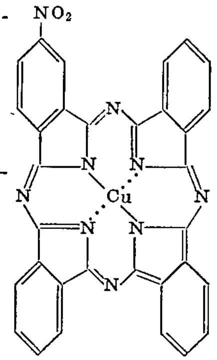 4-nitro-copper-phthalocyanine | (I) —$NH_2$·HCl | (I) —$N_2Cl$ |

TABLE—Continued
| | 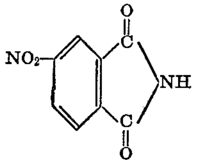 4-nitro-phthalimide | 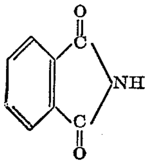 Phthalimide | Main product | $-NH_2 \cdot HCl$ | $-N_2Cl$ |
|---|---|---|---|---|---|
| (II) | 2 mol | 2 mol | 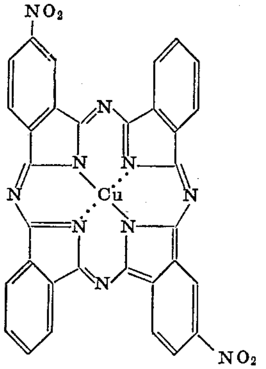 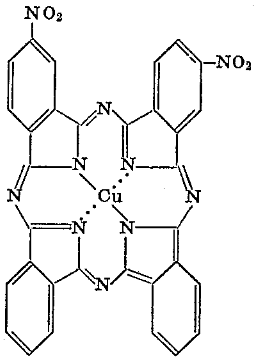 4,4′-dinitro-copper-phthalocyanine | (II) $-NH_2'HCl$ | (II) $-NCl$ |
| (III) | 3 mol | 1 mol | 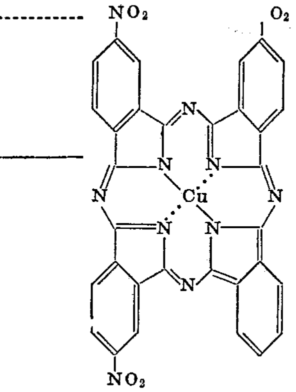 4,4′,4″-trinitro-copper-phthalocyanine | (III) $-NH_2'HCl$ | (III) $-N_2Cl$ |

TABLE—Continued
| | 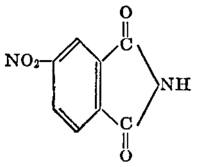 4-nitro-phthalimide | 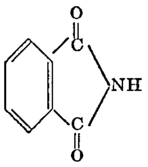 Phthalimide | Main product | —$NH_2$·HCl | —$N_2C^1$ |
|---|---|---|---|---|---|
| (IV) | 4 mol | 0 mol | 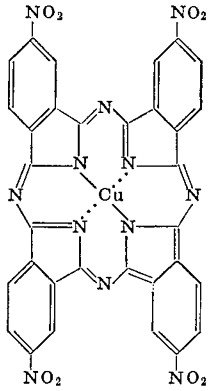 4,4′,4″,4‴-tetranitro-copper-phthalocyanine | (IV) —$NH_2$'HCl | (IV) —$N_2Cl$ |
| (V) | 0 mol | 4 mol | 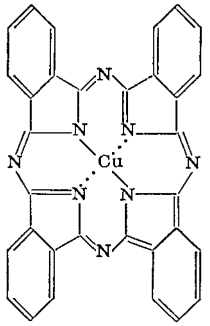 Copper-phthalocyanine-blue | (V) | (V) |

An attempt was also made to produce several types of a chromogen-bonded-polymer in accordance with the following process.

4-nitrophthalimide and phthalimide were mixed according to the molar ratios of the above table and the mixture pulverized to fine uniform powder. Urea, cuprous chloride and a catalyst such as ammonium molybdate and arsenic pentaoxide were added to the powder thus obtained and mixed well therewith. Then, the mixed raw materials were condensed under the method of either direct-fusion or condensation in trichlorobenzene solvent to form the nitro derivatives of copper phthalocyanine. After such condensation, the condensate was dissolved in sulfuric acid for purification, and was further purified with aqueous hydrochloric acid solution and aqueous sodium hydroxide solution. Thereafter, these purified nitro derivatives were reduced to amino derivatives with sodium sulfide and stannous chloride and were converted to salts of hydrochloric acid. The hydrochlorides of the amino derivatives corresponding to the compounds of (I), (II), (III), and (IV) of the above table were each separated from the obtained hydrochloride salts of the reduced products making use of the difference in their solubilities or in their centrifugal separation effects. Thereafter, the separated hydrochloride salts were respectively diazotized with sodium nitrite. Acrylamide was mixed with the thus obtained diazonium salt of copper phthalocyanine blue and polymerization of acrylamide was carried out using as the polymerization initiator the copper phthalocyanine chromogen-containing diazonium salt to form the chromogen-bonded-polymer.

In comparing the color shade of the chromogen-bonded-polymer with that of the known copper phthalocyanine blue (compound (V) of the above table), the chromogen-bonded-polymer which was obtained using the mono-diazonium salt (compound I of the table), the di-diazonium salt (compound II of the table) and the tri-diazonium salt (compound III of the table) showed little difference in color. Perhaps, the chromogen-bonded-polymers were faintly yellowish in color, the yellow being progressively less in the order of compounds I, II, and III of the table. By contrast, the chromogen-bonded-polymer obtained by using copper phthalocyanine blue tetra-diazonium salt (compound IV of the table) showed an extremely yellowish color shade and turned into a dull greenish blue as compared with the chromogen-bonded-polymers obtained from compounds I, II and III.

Although reasons for the above set forth results have not been completely determined, it is believed that their mechanisms occur in the following manner. Metal phthalocyanine, assuming a resonance-structure therefor in which the $\pi$-electron can easily move around one of the four phenyl nuclei forming the outside resonance structure of metal phthalocyanine, has to be forming a quinoid type structure. For this reason, mono-, di- and tri-substituents on the phenyl nuclei of copper phthalocyanine cause substantially little change in the color shades of the resulting chromogen. However, in the case of tetra-substituted copper phthalocyanine, i.e., one substituent on each of the four phenyl nuclei, the fourth phenyl nucleus, which assumes the quinoid structure, is stabilized and the $\pi$-electron easily moves all over the phthalocyanine molecule. Furthermore, the tetra-substituted metal phthalocyanine absorbs the longer waves of the visible light spectrum and presents a greenish shade to the eye.

Therefore, in improving the various defects of the phthalocyanine group pigments in connection with their dispersibility, transparency, crystalline transposition, etc., while maintaining at the same time, the excellent properties for resistance against light, heat, etc., as described hereinabove, it has been found that copper phthalocyanine-tetra-diazonium salt is not advantageously suitable as starting material for the chromogen-portion of the chromogen-bonded-polymer, when copper phthalocyanine blue which is normally vivid in color is selected as the chromogen.

Furthermore, when introducing strong reactive functional radicals into the polymer portion of the chromogen-bonded-polymer, methylolating polyacrylamide with an aqueous solution of formaldehyde, it has been found that the copper phthalocyanine-bonded-reactive polymer wherein the mono- and di-azonium salts of copper phthalocyanine blue are used as starting materials, has poor dispersibility in water. Particularly, the chromogen-bonded-polymer obtained from the mono-diazonium salt is only slightly superior to an ordinarily dispersed pigment such as the known copper phthalocyanine blue pigment which is dispersed mechanically with the use of surface active agent.

However, the chromogen-bonded-polymers which are obtained from tri- and tetra-diazonium salts are quite soluble in the form of polyacryl amides. On methylolation thereof however, the polyacrylamide of the tetra-diazonium salt often undergoes gelation, resulting in poor dispersibility. Moreover, the said chromogen-bonded-polymer produced from the aforesaid tetradiazonium salt of copper phthalocyanine blue is inferior to the chromogen-bonded-polymer obtained from the tri-diazonium salt of copper phthalocyanine blue with regard to storage stability. Short pot-life is a fatal defect in a commercial product. Furthermore, the chromogen-bonded-polymer from compound III of the table is superior to that from the mono-, di- and tetra-substituted compounds in every respect, i.e., color, dispersibility, storage stability reactivity, etc.

Where there is used a hydrophobic addition-polymerizable monomer such as methylmethacrylate, mono- derivatives and di-derivatives of copper phthalocyanine blue are inferior to tri- and tetra-derivatives of copper phthalocyanine blue as to dispersibility. It has been discovered that the mono- and di-derivatives are inferior to the tri-derivatives in their storage stability and physical properties. Although the reasons for these differences in the derivatives have not been completely clarified as yet, it is believed that they are caused by the number of diazonium salts contained in the chromogen, i.e. its solubility in water.

With regard to the pigments which are completely insoluble in solvents other than sulfuric acid such as phthalocyanine blue, they become soluble and dispersible in water, solvents, varnishes, plasticizers and plastics, etc. due to solubility or dispersibility of the polymer portion of the chromogen-bonded-polymer. However, mono- and di-diazonium salts of copper phthalocyanine blue do not become soluble or dispersible, since the chromogen containing diazonium salt itself has a low water solubility, and only a portion of the surface aggregated diazonium salt decomposes immediately. Consequently, sufficient free radicals are not formed to polymerize the monomer to introduce into copper phthalocyanine blue the polymer portion which may be dispersible in a suitable medium.

In other words, the higher the solubility of the chromogen containing diazonium salt is, the higher is the effectiveness of free radicals in causing polymerization of the addition-polymerizable monomer. In the production process using the tetradiazonium salt, much care has to be given to the reaction conditions such as pH, chlorine cation, temperature and the method of adding monomers. However, according to this invention, an attractive chromogen-bonded-polymer can be obtained quite easily by using copper phthalocyanine blue-tri-diazonium salt, the method of production of which lends itself readily to mass production techniques in industry.

The following table (Table II) indicates a comparison of the various diazonium salts when used to form a chromogen-bonded-polymer. In this connection, the raw material line restates in abbreviated form molar ratios of 4-nitro phthalimide and phthalimide used as depicted in Table I.

TABLE II.—M-PHTHALOCYANINE-BONDED-POLYMER

| | Raw material | | | |
|---|---|---|---|---|
| | 4-nitro-Ph.I./Ph.I.=1/3 | 4-nitro Ph.I./Ph.I.=2/2 | 4-nitro Ph.I./Ph.I.=3/1 | 4-nitro Ph.I./Ph.I.=4/0 |
| Solubility in water: | | | | |
| —$NH_2HCl$ | Precipitation | Precipitation | Dispersion particle small. | Swelling. |
| —$N_2Cl$ | Incapable of dispersion. | Dispersion particle large. | Clear solution | Clear solution. |
| Reaction against non-reactive monomer | Extremely poor | Fairly poor | Excellent | Good. |
| Reaction against reactive monomer | do | do | do | Gelation. |
| Product from nonreactive monomer | Poor dispersion | do | do | Fairly poor. |
| Product from reactive monomer | do | do | do | Gelation. |
| Introduction of reactive radical into product | Out of the question. | Possible to some extent. | Fully possible | Poor dispersion cause gelation often. |
| Storage life | Stable | Stable | Stable | Unstable. |
| Color shade | Reddish-blue | Blue | Blue | Dull green-blue. |
| Transparency | Opaque | Fairly opaque | Transparent | Transparent with impurity. |
| Usefulness as industrial material compared to the usual copper-phthalocyanine. | Poor | Fairly good | Excellent | Good. |

From the foregoing, it is seen that in accordance with the invention, a chromogen-bonded-polymer utilizing triamino metal phthalocyanine as the chromogen provides an excellent coloring agent in which the metal phthalocyanine blue as shown in the following flow diagram retains the advantages of copper phthalocyanine blue as pigment and at the same time completely eliminates the defects of conventional copper phthalocyanine blue.

The following flow diagram depicts the process of making triamino copper phthalocyanine blue. In the diagram, K indicates kilograms, l. indicates liters and T.C.B. indicates trichlorobenzene.

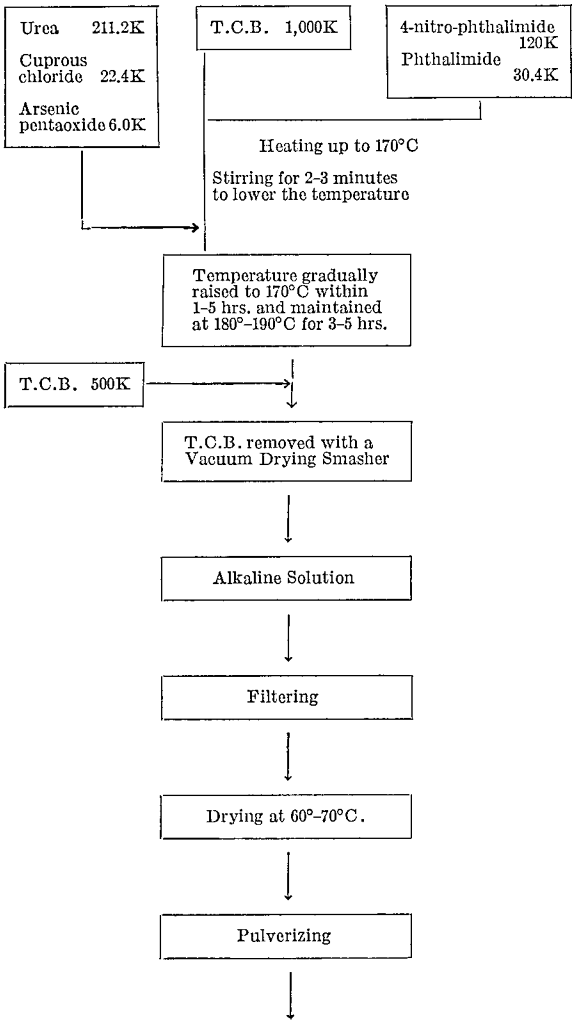

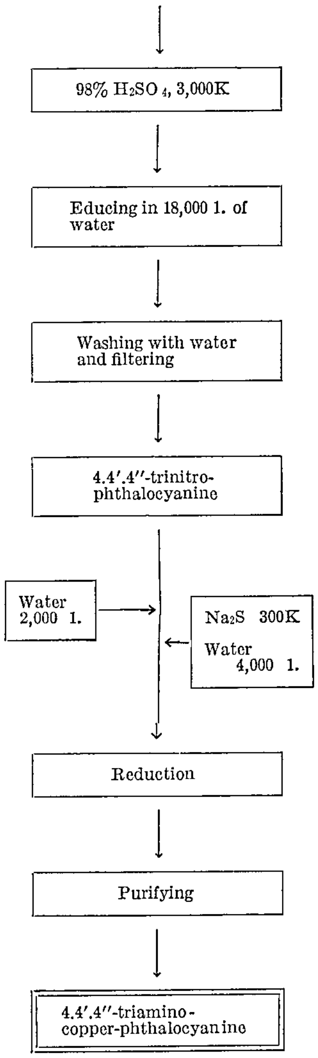

Method of making 4.4'.4''-triamino-copper-phthalocyanine

There are several other methods for producing 4.4'.4''-triamino-copper-phthalocyanine. One is to effect chlorination or bromination of the copper phthalocyanine with amination thereafter; another is to produce the aforesaid copper-phthalocyanine by employing $NH_2OH$ in $H_2SO_4$ with a catalyst such as ferrous sulfate. However, with these methods, the positions 4 and 5 are not necessarily substituted and there is the decided possibility of, an amino radical being introduced into the positions 3 and 6 which are the more reactive positions.

Consequently, the 4.4'.4'' - triamino - copper-phthalocyanine used herein comprises the steps of preparing 4.4'.4'' - trinitro - copper-phthalocyanine which is dark green, thereafter dissolving the latter compound in $H_2SO_4$, discharging it in a very great quantity of water to make it educe fine-particles of phthalocyanine, and then subjecting it to a water-treatment to reduce it with sodium sulfide to obtain 4.4'.4''-triamino-copper-phthalocyanine.

Another object of this invention is to provide a process for making a chromogen-bonded-polymer in accordance with the first object which has a high yield rate.

As has been stated hereinabove, the object of attaining a metal-phthalocyanine bonded polymer in which the metal phthalocyanine and the polymer are directly and chemically bonded is obtained by producing 4.4'.4''-trinitro-metal phthalocyanine from a mixture of 4-nitrophthalimide and phthalimide in a 3 to 1 molar ratio respectively, reducing the trinitro compound to the triamino compound and diazotizing the triamino compound to form the 4.4'.4''-tri-diazonium salt thereof. The latter functions as the polymerization initiator in the polymerization of an addition-polymerizable monomer which is polymerized to produce the chromogen-bonded-polymer.

Using the known method of diazotization in which the concentration of hydrochloric acid is relatively low, it has been found that the ratio of the chromogen portion to the monomer portion of the chromogen-bonded-polymer which is obtained using the triamino copper phthalocyanine was approximately 1 to 4, i.e., the portion of the chromogen in the final product is small. Furthermore, the yield rate of the chromogen-bonded-polymer produced as measured against the starting materials used was rather low, i.e., about only 30 to 40%.

Intensive investigation of the mechanisms causing the low proportion of the chromogen in the final chromogen-bonded-polymer product and the relatively low yield of the final product showed that there were defects in the process of diazotization, and in the usual polymerization process. However, an almost 80 to 90% yield rate had been attained in the overall process as shown in the flow diagram below, i.e., the condensation process to form 4.4.'4''-trinitro-metal-phthalocyanine from 4 - nitro - phthalimide/phthalimide in a 3 to 1 molar ratio and reducing process to reduce nitro phthalocyanine to 4.4'.4''-triamino-metal-phthalocyanine.

An explanation of these phenomena is as follows and the improved process for producing chromogen (metal-phthalocyanine blue)-bonded-polymer from triamino-metal-phthalocyanine is as shown in the following flow diagram.

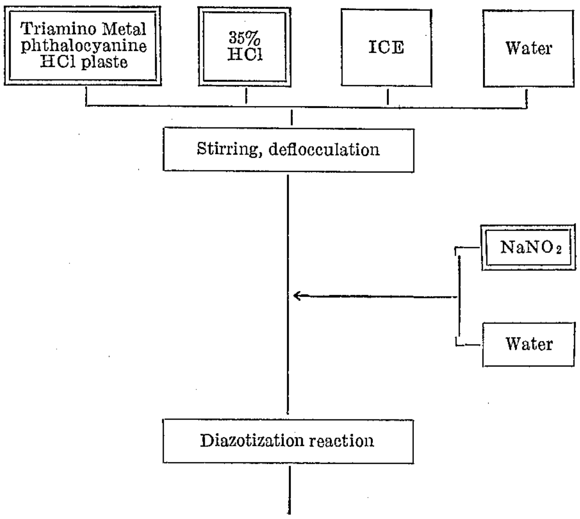

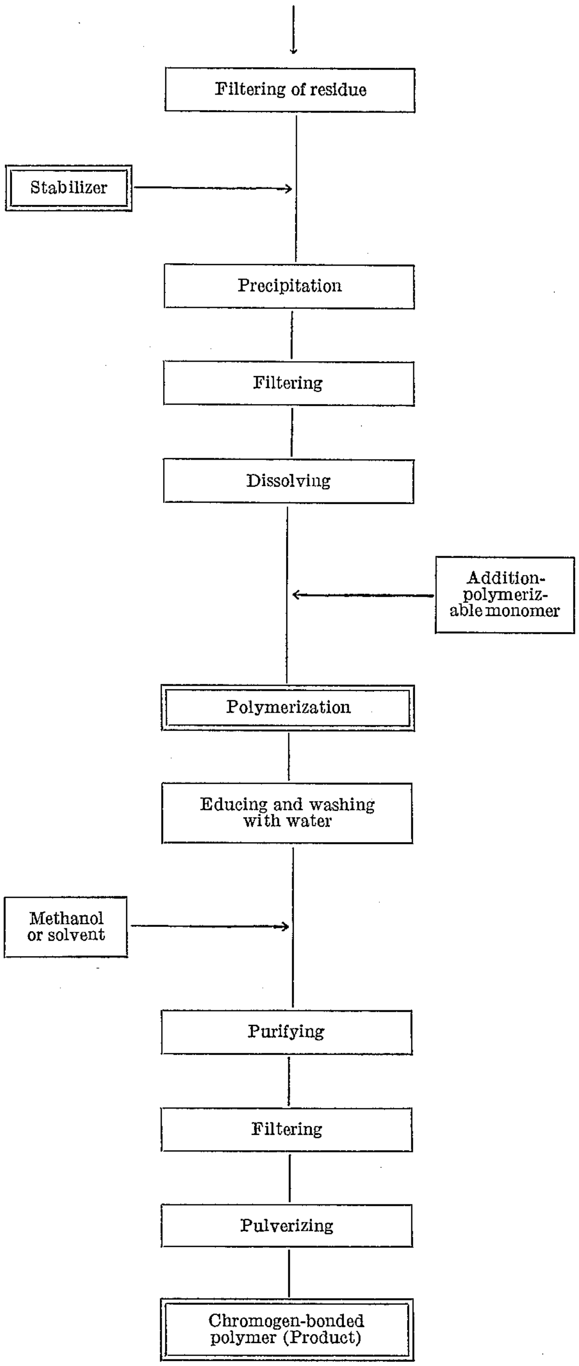

With the usual process of diazotizing tetramino-copper-phthalocyanine into tetradiazo-copper-phthalocyanine, approximately 8 moles of HCl per —$NH_2$ radical is used whereby such proportion is approximately 6 moles more than the theoretical proportion of 2 mol (required to carry out the process of —$NH_2HCl$, $NaNO_2 \rightarrow HNO_2$. With this process, only 40 to 50% of diazotization rate is attained in diazotizing triamino-copper-phthalocyanine, even if diazotization is carried out while maintaining the reaction temperature very low. Moreover, much diazo residue is left, and satisfactory polymerization is not effected during the process of polymerization. As a result, the reaction rate of monomers is poor, culminating in an unsatisfactory final yield rate. High quantities of the chromogen portion in the chromogen-bonded-polymer cannot be attained even through a purifying process.

Polymerization is carried out after neutralizing excessive HCl on the assumption that the volume of HCl is sufficient for the diazotization process. However, this assumption is not correct.

As a result of the investigation into this matter, it was found that the volume of HCl required in the process had to be in excess of that theoretically required quantity by at least 10 mols per one amino radical, and that the highest yield rate was effected with an excess which was 15 mols per one amino radical.

In such medium of a highly concentrated aqueous solution of hydrochloric acid, reaction begins in the reaction system immediately and the temperature thereof rises rapidly when monomers are added to the medium. However, there may result a spurting out of monomers, and by-products composed of a polymer not containing any chromogen, yielded by the polymerization initiated by a free radical of chlorine having been produced by the decomposition of the diazonium chloride, and there may result a great loss in monomers whereby the yield rate of the chromogen-bonded-polymer will be lowered. Furthermore, during the process of polymerization and of educing and taking out thereafter, monomers having ester and amide radicals often react according to the following formula: R—COOR′, $R—CONH_2 \rightarrow ROCOOH$, which may deleteriously eliminate the desired properties of the polymer portion.

However, by stabilizing the diazonium chloride in the medium of highly concentrated hydrochloric acid solution, using a stabilizer, and at the same time precipitating, filtering and separating hydrochloric acid with a centrifugal separation machine, solubilizing again and dispersing in water, and adding monomers under mild conditions to polymerize the monomers, there results a minimization of loss of monomers, and a high yield rate is attained in the production of the polymer portion.

Such stabilizer is selected from the group consisting of a first subgroup consisting of heavy metal salts, a second subgroup consisting of inorganic acids and their salts, a third subgroup consisting of organic sulfonic acid, organic sulfonates, organic sulfuric acids and organic sulfates, a fourth subgroup consisting of amino compounds and a fifth subgroup consisting of thiophenols. The first subgroup of the stabilizer consists of zinc chloride, stannic chloride, calcium chloride, barium chloride and aluminum chloride. The second subgroup of the stabilizer consists of fluoroboric acid and its salt of sodium, potassium and ammonium. The third subgroup consists of a first division consisting of alkyl sulfonic acid and its salts which consist of octyl sulfonic acid, decyl sulfonic acid, lauryl sulfonic acid, tetradecyl sulfonic acid, hexadecyl sulfonic acid, octadecyl sulfonic acid and their salts of sodium, potassium, ammonium and triethanolamine; a second division consisting of alkylaryl sulfonic acid and its salt which consists of butyl benzene sulfonic acid, amylbenzene sulfonic acid, hexylbenzene sulfonic acid, heptyl benzene sulfonic acid, octyl benzene sulfonic acid, nonyl benzene sulfonic acid, decyl benzene sulfonic acid, dodecyl benzene sulfonic acid, tetradecyl benzene sulfonic acid, hexadecylbenzene sulfonic acid, octadecyl benzene sulfonic acid, and their salts of sodium, potassium, ammonium and triethanolamine; a third division consisting of aryl sulfonic acid and its salt which consists of benzene sulfonic acid, p-chlorobenzene sulfonic acid, p-methylbenzene sulfonic acid, naphthalene-1.5-disulfonic acid, naphthalene-2.6-disulfonic acid, dinaphthylmethane sulfonic acid and their salts of sodium, potassium, amomnium and triethanol amine; a fourth division consisting of alkyl sulfuric acid and its salt which consists of octyl sulfuric acid, decyl sulfuric acid, lauryl sulfuric acid, tetradecyl sulfuric acid, hexadecyl sulfuric acid, octadecyl sulfuric acid and their salts of sodium, potassium, ammonium and triethanolamine; and a fifth division consisting of polyalkyleneoxide sulfuric acid and its salt which consists of polyethyleneglycol sulfuric acid, polyethyleneglycol nonylphenyl ether sulfuric acid, polypropyleneglycol-polyethyleneglycol sulfuric acid and their salts of sodium, potassium, ammonium and triethanolamine. The fourth subgroup of the stabilizer consists of 2-methylamino-5-sulfo benzoic acid, N-methyltaurine and sarcosine. The fifth subgroup of the stabilizer consists of β-naphthylthiophenol and p-tertiary butyl thiophenol.

The diazotization process is carried out in a medium of highly concentrated hydrochloric acid to obtain at a high yield rate chromogen-containing-diazonium chloride which becomes the chromogen portion of the final product. The stabilized diazonium salt is taken out after stabilizing the diazonium salt by adding a stabilizer such as $ZnCl_2$ to the clear highly concentrated hydrochloric acid solution obtained by centrifugal separating.

Then, the polymerization process is carried out under relatively mild pH conditions (low concentration of hydrochloric acid in the medium). The chromogen-bonded-polymer obtained at the high yield rate by the above process has a desirably increased ratio of chromogen portion to polymer portion therein.

A further object of the invention is to provide a process for making a coloring agent employing the chromogen-bonded-polymer obtained in accordance with the preceding objects.

Another object is to provide a process for coloring articles with the coloring agent obtained in accordance with the immediately preceding object.

The processes for making a coloring agent utilizing a metal phthalocyanine type chromogen-bonded-polymer made in accordance with the invention and for coloring articles with such coloring agent are set forth in the hereinbelow pertinent examples.

The following are structural formulae of isomers of triamino-metal-phthalocyanine.

ISOMERS OF TRIAMINO-METAL-PHTHALOCYANINE 4.4′.4″-triamino-m-phthalocyanine blue

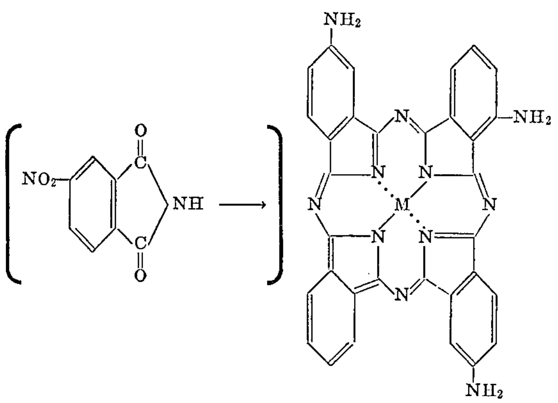

3.3′.3″-triamino-m-phthalocyanine blue

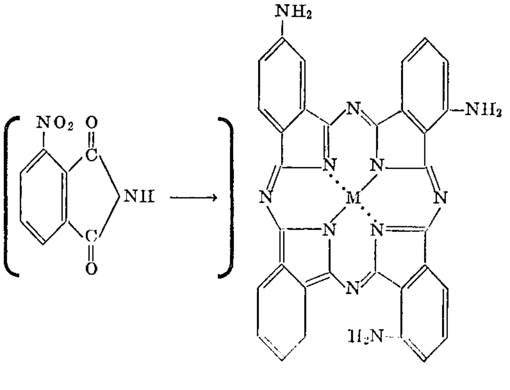

4.3'.4''-triamino-m-phthalocyanine blue

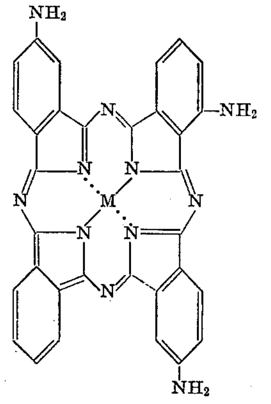

3.4'.3''-triamino-m-phthalocyanine blue

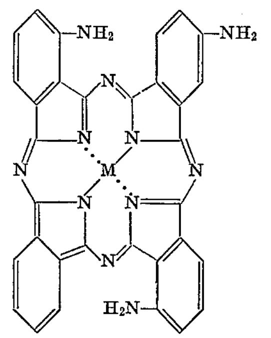

3.3'.4''-triamino-m-phthalocyanine blue

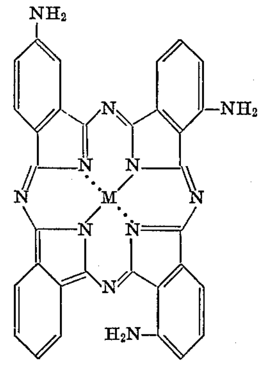

4.4'.3''-triamino-m--phthalocyanine blue

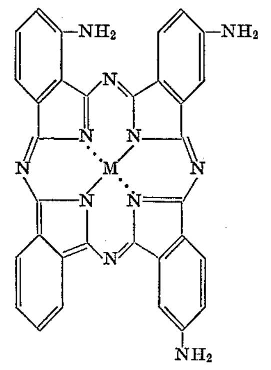

The following are examples of triamino metal phthalocyanines suitable for use according to the invention.

TRIAMINO METAL-PHTHALOCYANINE

(I) Triamino copper phthalocyanine group (1) Triamino copper phthalocyanine group obtained by reducing the trinitro copper phthalocyanine group prepared by using 4-nitro phthalimide and phthalimide at a molar ratio 3 to 1: triamino non-substituted copper phthalocyanine, triamino chlorinated copper phthalocyanine, triamino brominated copper phthalocyanine, triamino sulfonated copper phthalocyanine, triamino sulfonated copper phthalocyanine, triamino sulfonated brominated copper phthalocyanine and the like.

(2) Triamino copper phthalocyanine group obtained by reducing the trinitro copper phthalocyanine group prepared by using 4-nitro phthalimide, 3-nitro phthalimide and phthalimide at a molar ratio 2:1:1: triamino non-substituted copper phthalocyanine, triamino chlorinated copper phthalocyanine, triamino brominated copper phthalocyanine, triamino sulfonated copper phthalocyanine, triamino sulfonated chlorinated copper phthalocyanine, triamino sulfonated brominated copper phthalocyanine, and the like.

(3) Triamino copper phthalocyanine group obtained by reducing the trinitro copper phthalocyanine group prepared by using 4-nitro phthalimide, 3-nitro phthalimide and phthalimide at a molar ratio 1:2:1: triamino non-substituted copper phthalocyanine, triamino chlorinated copper phthalocyanine, triamino brominated copper phthalocyanine, triamino sulfonated copper phthalocyanine, triamino sulfonated chlorinated copper phthalocyanine, triamino sulfonated brominated copper phthalocyanine, and the like.

(4) Triamino copper phthalocyanine group obtained by reducing the trinitro copper phthalocyanine group prepared by using 3-nitro phthalimide and phthalimide at a molar ratio 3 to 1: triamino non-substituted copper phthalocyanine, triamino chlorinated copper phthalocyanine, triamino brominated copper phthalocyanine, triamino sulfonated copper phthalocyanine, triamino sulfonated chlorinated copper phthalocyanine, triamino sulfonated brominated copper phthalocyanine, and the like.

(5) Triamino copper phthalocyanine group prepared by introducing into copper phthalocyanine amino radicals by post amination: triamino non-substituted copper phthalocyanine, triamino chlorinated copper phthalocyanine, triamino chlorinated copper phthalocyanine, triamino brominated copper phthalocyanine, triamino sulfonated chlorinated copper phthalocyanine, triamino sulfonated brominated copper phthalocyanine, and the like.

(II) Triamino cobalt phthalocyanine group (1) Triamino cobalt phthalocyanine group obtained by reducing the trinitro cobalt phthalocyanine group prepared by using 4-nitro phthalimide and phthalimide at a molar ratio 3 to 1: triamino non-substituted cobalt phthalocyanine, triamino chlorinated cobalt phthalocyanine, triamino brominated cobalt phthalocyanine, triamino sulfonated cobalt phthalocyanine, triamino sulfonated chlorinated cobalt phthalocyanine, triamino sulfonated brominated cobalt phthalocyanine and the like.

(2) Triamino cobalt phthalocyanine group obtained by reducing the trinitro cobalt phthalocyanine group prepared by using 4-nitro phthalimide, 3-nitro phthalimide and phthalimide at a molar ratio 2:1:1: triamino non-substituted cobalt phthalocyanine, triamino chlorinated cobalt phthalocyanine, triamino brominated cobalt phthalocyanine, triamino sulfonated cobalt phthalocyanine, triamino sulfonated chlorinated cobalt phthalocyanine, triamino sulfonated brominated cobalt phthalocyanine, and the like.

(3) Triamino cobalt phthalocyanine group obtained by reducing the trinitro cobalt phthalocyanine group prepared by using 4-nitro phthalimide, 3-nitro phthalimide and phthalimide at a molar ratio 1:2:1: triamino non-substituted cobalt phthalocyanine, triamino chlorinated cobalt phthalocyanine, triamino brominated cobalt phthalocyanine, triamino sulfonated cobalt phthalocyanine, triamino sulfonated chlorinated cobalt phthalocyanine, triamino sulfonated brominated cobalt phthalocyanine, and the like.

(4) Triamino cobalt phthalocyanine group obtained by reducing the trinitro cobalt phthalocyanine group prepared by using 3-nitro phthalimide and phthalimide at a molar ratio of 3 to 1: triamino non-substituted cobalt phthalocyanine, triamino chlorinated cobalt phthalocyanine, triamino brominated cobalt phthalocyanine, triamino sulfonated cobalt phthalocyanine, triamino sulfonated chloriated cobalt phthalocyanine, triamino sulfonated brominated cobalt phthalocyanine, and the like.

(5) Triamino cobalt phthalocyanine group obtained by introducing into cobalt phthalocyanine, amino radicals by post amination: triamino non-substituted cobalt phthalocyanine, triamino chlorinated cobalt phthalocyanine, triamino brominated cobalt phthalocyanine, triamino sulfonated cobalt phthalocyanine, triamino sulfonated chlorinated cobalt phthalocyanine, triamino sulfonated brominated cobalt phthalocyanine, and the like.

(III) Triamino nickel phthalocyanine group (1) Triamino nickel phthalocyanine group obtained by reducing the trinitro nickel phthalocyanine group prepared by using 4-nitro phthalimide and phthalimide at a molar ratio 3 to 1: triamino non-substituted nickel phthalocyanine, triamino chlorinated nickel phthalocyanine, triamino brominated nickel phthalocyanine, triamino sulfonated nickel phthalocyanine, triamino sulfonated chlorinated nickel phthalocyanine, triamino sulfonated brominated nickel phthalocyanine, and the like.

(2) Triamino nickel phthalocyanine group obtained by reducing the trinitro nickel phthalocyanine group prepared by using 4-nitro phthalimide, 3-nitro phthalimide and phthalimide at a molar ratio 2:1:1: triamino-non-substituted nickel phthalocyanine, triamino chlorinated nickel phthalocyanine, triamino brominated nickel phthalocyanine, triamino sulfonated nickel phthalocyanine, triamino sulfonated chlorinated nickel phthalocyanine, triamino sulfonated brominated nickel phthalocyanine, and the like.

(3) Triamino nickel phthalocyanine group obtained by reducing the trinitro nickel phthalocyanine group prepared by using 4-nitro phthalimide, 3-nitro phthalimide and phthalimide at a molar ratio 1:2:1: triamino non-substituted nickel phthalocyanine, triamino chlorinated nickel phthalocyanine, triamino brominated nickel phthalocyanine, triamino sulfonated nickel phthalocyanine, triamino sulfonated chlorinated nickel phthalocyanine, triamino sulfonated brominated nickel phthalocyanine, and the like.

(4) Triamino nickel phthalocyanine group obtained by reducing the trinitro nickel phthalocyanine group prepared by using 3-nitro phthalimide and phthalimide at a molar ratio 3 to 1: triamino non-substituted nickel phthalocyanine, triamino chlorinated nickel phthalocyanine, triamino brominated nickel phthalocyanine, triamino sulfonated nickel phthalocyanine, triamino sulfonated chlorinated nickel phthalocyanine, triamino sulfonated brominated nickel phthalocyanine, and the like.

(5) Triamino nickel phthalocyanine group prepared by introducing into nickel phthalocyanine amino radicals by post amination: triamino non-substituted nickel phthalocyanine, triamino chlorinated nickel phthalocyanine, triamino brominated nickel phthalocyannie, triamino sulfonated nickel phthalocyanine, triamino sulfonated chlorinated nickel phthalocyanine, triamino sulfonated brominated nickel phthalocyanine, and the like.

Furthermore, in the process for preparing triamino metal phthalocyanine for use according to the invention, instead of the above-illustrated 4-nitro phthalimide and 3-nitro phthalimide, there are used 4-nitro phthalic acid, 3-nitro phthalic acid, and their unseparated compound, 4-nitro phthalic anhydride, 3-nitro phthalic anhydride and their unseparated compound, 4-nitro phthalamide, 3-nitro phthalamide and their unseparated compound, the unseparated compound of 4-nitro phthalimide and 3-nitro phthalimide, 4-nitro phthalonitrile, 3-nitro phthalonitrile and their unseparated compound, and mono-, di- and trihalogenated derivatives of above-listed nitro compounds and their sulfonated derivatives also, instead of the above-illustrated phthalimide, there are used phthalic acid, phthalic anhydride, phthalamide, phthalonitrile and their mono-, di-, tri- and tetra-halogenated derivatives and their sulfonated derivatives.

In addition, in the process of the post-halogenation or post-sulfonation for preparing triamino metal phthalocyanine, there may be also employed triamino-, triacylamino-, tritosylamino- or trinitro metal phthalocyanine. In the case of using triacylamino and tritosylamino derivatives they are further converted to triamino derivatives by hydrolysis and in the case of using trinitro derivatives they are further converted to triamino derivatives by reduction.

Monomers that are addition-polymerizable and that can be used in the process of the invention are, for example, vinyl formate, vinyl acetate, vinyl chloroacetate, vinyl propionate, vinyl stearate, vinyl oleate, vinyl benzoate, vinyl chloride, vinylidene chloride, methyl vinyl ketone, styrene, methyl styrene, chlorostyrene, vinylphenol, nitrostyrene, aminostyrene, acrylic acid, methacrylic acid, crotonic acid, itaconic acid, maleic acid, fumaric acid, monomethylitaconate, monoethylitaconate, monobutylitaconate, monohexylitaconate, monomethylmaleate, monoethylmaleate, monobutylmaleate, monomethylfumarate, monoethylfumarate, monobutylfumarate, itaconic anhydride, maleic anhydride, methylacrylate, methylmethacrylate, methylcrotonate, dimethylitaconate, dimethylmaleate, dimethylfumarate, ethylacrylate, ethyl methacrylate, ethylcrotonate, diethylitaconate, diethylmaleate, diethylfumarate, propyl acrylate, propyl methacrylate, dipropylitaconate, butylacrylate, butylmethacrylate, butylcrotonate, dibutylitaconate, dibutylmaleate, dibutylfumarate, amylacrylate, amylmethacrylate, diamylitaconate, hexylacrylate, hexylmethacrylate, hexylitaconate, octylacrylate, octylmethacrylate, octylcrotonate, dioctylitaconate, dioctylmaleate, dioctylfumarate, laurylacrylate, laurylmethacrylate, laurylcrotonate, dilaurylitaconate, stearylacrylate, stearylmethacrylate, distearylitaconate, ethoxyethyl methacrylate, methyl $\alpha$-chloroacrylate, ethyl $\alpha$-chloroacrylate, ethyleneglycolmonoacrylate, ethyleneglycolmonomethacrylate, ethyleneglycolmonocrotonate, ethyleneglycolmonoitaconate, ethyleneglycoldiacrylate, ethyleneglycoldimethacrylate, ethyleneglycoldiitaconate, polyethyleneglycolmonoacrylate, polyethyleneglycolmonomethacrylate, polyethyleneglycolmonoitaconate, polyethyleneglycoldiacrylate, polyethyleneglycoldimethacrylate, propyleneglycolmonoacrylate, propyleneglycolmonomethacrylate, propyleneglycolmonoitaconate, propyleneglycoldiacrylate, propyleneglycoldimethacrylate, polypropyleneglycolmonoacrylate, polypropyleneglycolmonomethacrylate, polypropyleneglycoldiacrylate, polypropyleneglycoldimethacrylate, propanediolmonoacrylate, propanediolmonomethacrylate, propanedioldiacrylate, propanedioldimethacrylate, butanediolmonoacrylate, butanediolmonomethacrylate, butanedioldiacrylate, butanedioldimethacrylate, glycidylacrylate, glycidylmethacrylate, glycidylcrotonate, glycidylmonoitaconate, glycidylmonomaleate, glycidylmonofumarate, diglycidylitaconate, $\beta$-hydroxy - $\gamma$-chloro-$\eta$-propylacrylate, $\beta$-hydroxy-$\gamma$-chloro-$\eta$-propylmethacrylate, mono-$\beta$-hydroxy-$\gamma$-chloro-$\eta$-propylitaconate, di-$\beta$-hydroxy-$\gamma$-chloro-$\eta$-propyl itaconate, allylacrylate, allylmethacrylate, N,N-dimethylaminoethyl acrylate, N,N-dimethylaminoethylmethacrylate, acrylic chloride, methacrylic chloride, crotonic chloride, itaconic chloride, acrolein, methacrolein, crotonic aldehyde, itaconic aldehyde, acrylonitrile, methacrylonitrile, crotonic nitrile, itaconic nitrile, acrylamide, N-methylacrylamide, methacrylamide, N-methylmethacrylamide, crotonicamide, itaconicdiamide itaconicmonoestermonoamide, itaconicmonoacidmonoamide, maleicamide, fumaricamide, N-butylmethylolcrotonicamide. N-butylmethylol-N - methylolcrotonicamide, N - methylolitaconicamide, N,N′-dimethylolitaconicamide, N-methylolmaleicamide, N-methylolfumaricamide, N-methylmethylolacrylamide, N - methylmethylolmethacrylamide, N - methylmethylolcrotonicamide, N-methylmethylolitaconicamide, N,N'-dimethylmethylolitaconicdiamide, N-methylmethylolmaleicamide, N-methylmethylolfumaricamide, N-ethylmethylolacrylamide, N-ethylmethylolmethacrylamide, N,N'-diethylmethylolitaconicdiamide, N - ethylmethylolitaconicmonoamide, N - propylmethylolacrylamide, N - propylmethylolmethacrylamide, N-propylmethylolitaconicamide, N - butylmethylolacrylamide, N-butylmethylolmethacrylamide, N-butylmethylolcrotonicamide, N-butylmethylolitaconicmonoamide, N,N'-dibutylmethylolitaconicdiamide, N - butylmethylolmaleicamide, N-butylmethylolfumaricamide, N - sulfomethylacrylamide, N - sulfomethylmethacrylamide, N-sulfomethylcrotonicamide, N-sulfomethylitaconicmonoamide, N,N'-disulfomethylitaconicdiamide, N-sulfomethylmaleicamide, N-sulfomethylfumaricamide, N,N' - methylenebisacrylamide, N,N'-methylenebismethacrylamide, acrylicazide, methacrylicazide, crotonicazide, itaconicazide, acrylicethyleneimide, methacrylicethyleneimide, crotonicethyleneimide, itaconicethyleneimide, N-sulfoethylacrylimide, N-sulfoethylmethacrylimide, N-sulfoethylcrotonicimide, N-sulfoethylitaconicimide, N-carboxyethyleneacrylimide, N - carboxyethylenemethacrylimide, N-carboxyethylenecrotonicimide, N-carboxyethyleneitaconicimide, vinylisocyanate, propenylisocyanate, vinylurea, propenylurea, vinylphenylurethane, propenylphenylurethane, vinylethyleneurea, propenylethyleneurea, 4-chloro-6-amino-2-vinyl-S-triazine, 4,6-diamino-2-vinyl-S-triazine 4.6 - dichloro-2-vinyl-s-triazine, 4.6-diethyleneimino-2-vinyl-s-triazine, N-methylolvinylurea, N,N-dimethylolvinylurea, N-methylolpropenylurea, N,N-dimethylolpropenylurea, N,N'-dimethylol-4.6-diamino-2-vinyl-s-triazine, N.N.N'.N' - tetramethylol-4.6-diamino-2-vinyl-s-triazine, N-methylmethylolvinylurea, N.N-dimethylmethylolvinylurea, N-methylmethylolpropenylurea, N.N-dimethylmethylolpropenylurea. N.N'-dimethylmethylol-4,6-diamino - 2-vinyl-s-triazine, N.N.N'.N'-tetramethylmethylol-4.6-diamino-2-vinyl-s-triazine, N-ethylmethylolvinylurea, N.N-diethylmethylolvinylurea, N-ethylmethylolpropenylurea, N.N-diethylmethylolpropenylurea, N.N'-diethylmethylol-4,6-diamino-2-vinyl-s-triazine, N.N.N'.N'-tetraethylmethylol - 4.6 - diamino - 2-vinyl-s-triazine, N-propylmethylolvinylurea, N.N' - dipropylmethylol-4.6-diamino-2-vinyl-s-triazine, N-butylmethylolvinylurea, N.N-dibutylmethylolvinylurea, N-butylmethylolpropenylurea, N.N-dibutylmethylolpropenylurea, N.N'-dibutylmethylol-4.6-diamino-2-vinyl-s-triazine, N.N.N'.N'-tetrabutylmethylol - 4.6-diamino-2-vinyl-s-triazine, N-sulfomethyl vinyl urea, N.N-disulfomethyl vinyl urea, N-sulfomethylpropenyl urea, N.N-disulfomethyl propenyl urea, N.N'-disulfomethyl-4.6-diamino-2-vinyl-s-triazine, N.N.N'.N'-tetrasulfomethyl - 4.6-diamino-2-vinyl-s-triazine, N-sulfoethylvinylurea, N-sulfoethylpropenylurea, N.N'-disulfoethyl - 4.6-diimino-2-vinyl-s-triazine, N-carboxyethylenevinylurea, N-carboxyethylenepropenylurea, N.N'-dicarboxyethylene-4.6-diimino-2-vinyl-s-triazine, allylacetate, allylmethylether, allylbutylether, allylglycidylether, allyl-$\beta$ - hydroxy-$\gamma$-choro-$\eta$-propylether, butadiene, isoprene, chloroprene, vinyldimethylamine, vinyldiethylamine, vinylcarbazole, N-vinylsuccinimide, N-vinylphthalimide, N-vinylcaprolactum, N-vinylpyrrolidone, 2-vinyl-5-methylpyridine, vinylsulfonicacid and the like.

Polymerization can be carried out by mixing one or more types of monomers without any regard to ratio of the types of respective monomers. The properties of the polymer portion in the chromogen-bonded-polymer are derived from those of the mixed monomers of various types, i.e., active-reactive, weak reactive or non-reactive, or water or oil dispersibility, depending upon the ratios of the types of respective monomers. Such polymerization can be carried out by any of the known methods of addition-polymerization such sas solution-, block-, emulsion- and suspension-polymerization.

The aforementioned addition-polymerizable monomers may be largely divided into three groups according to the reactivity of the radical of the aforesaid monomers, viz:

(1) Active-reactive monomer group
(2) Weak-reactive monomer group
(3) Non-reactive monomer group (1) The active-reactive monomer group is the group in which each of the addition-polymerizable monomers has at least one active-reactive radical in its structure and, after polymerization, reaction, can introduce into the chromogen-bonded-polymer radicals capable of linking with themselves and other radicals of a cross-linking agent, precondensate of thermosetting resin, reactive high polymer or reactive latex.

The following tabulation is a list of some examples of suitable active-reactive radicals:

| Names of radicals | Structure |
|---|---|
| Methylol | $-CH_2OH$ |
| Alkylmethylol | $-CH_2OR$ (R: $-CH_3$, $-C_2H_5$, $-C_3H_7$, $-C_4H_9$, etc.). |
| Sulfomethyl | $-CH_2SO_3H$ |
| Epoxy | 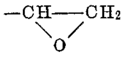 |
| Chlorohydrin | 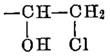 |
| Ethyleneimide | 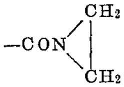 |
| N-sulfoethyleneimide | $CONHCH_2CH_2SO_3H$ |
| Ethyleneurea | 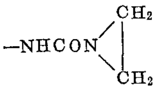 |
| N-sulfoethylene urea | $-NHCONHCH_2CH_2SO_3H$ |
| Acid chloride | $-COCl$ |
| Chlorotriazine | 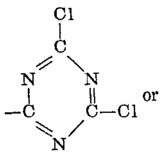 or 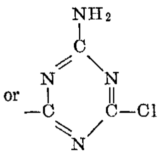 |
| Ketene | $-CH=C-O$ |
| Aldehyde | $-CHO$ |
| Vinyl | $-CH=CH_2$ |
| Isocyanate | $-N=C=O$ |
| Acid azide | $-CON_3$ |
| Phenylurethane | 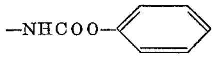 and the like. |

(2) The weak-reactive monomer group is one in which each addition-polymerizable monomer therein has at least one weak-reactive radical in its structure and, after polymerization reaction, can introduce into the chromogen-bonded-polymer radicals incapable of linking with themselves under ordinary cross-linking conditions but capable of linking with active-reactive radicals derived from other comonomers or of linking with active-reactive radicals of a crosslinking agent, precondensate of thermosetting resin and the like, and also can introduce the active-reactive radicals into the chromogen-bonded-polymer, after polymerization, by reacting with a material having at least two active-reactive radicals in its structure such as formaldehyde, glyoxal, epichlorohydrin, dichlorohydrin, cyanuric chloride, dimethylolurea, tetramethylolmelamine, hexamethylolmelamine, or precondensates of ordinary thermosetting resins and the like.

The following tabulation is a list of some examples of suitable weak-reactive radicals:

| Names of radicals | Structure |
|---|---|
| Hydroxyl | —OH |
| Mercapto | —SH |
| Amino | —$NH_2$ |
| Imino | —NH— |
| Carboxyl | —COOH |
| Carboamide | —$CONH_2$, —CONH— |
| Sulfoamide | —$SO_2NH_2$, —$SO_2NH$— |
| Urea | —$NHCONH_2$, —NHCONH— |
| Ureido | —CONHCONH— |
| Urethane | —OCONH— |
| (Nitrile | —CN) and the like. |

(3) The non-reactive monomer group is one in which each addition-polymerizable monomer therein has at least one non-reactive radical in its structure and, after polymerization reaction, can introduce into the chromogen-bonded-polymer radicals incapable of linking with themselves and other reactive radicals under ordinary cross-linking conditions.

The following tabulation is a list of some examples of suitable non-reactive radicals:

| Names of radicals | Structure |
|---|---|
| Alkyl ester | —OCOR, —COOR wherein (R: is $C_{n''}H_{2n''+1}$ wherein $n''$ is an integer of numbers 1 to 18). |
| Aryl ester | —OCOAr, —COOAr (Ar: —$C_6H_5$, $C_7H_7$, $C_{10}H_7$). |
| Alicyclic | 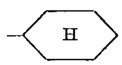 |
| Aryl | 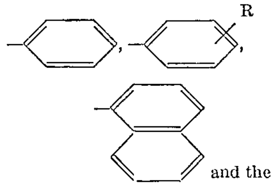 and the like. |

According to the classification described hereinabove, the addition-polymerizable monomers which are used in this invention are divided into groups, as follows:

(1) Active-reactive monomer group (a) Active-reactive and water soluble or dispersible monomer group:

N-methylol acrylamide, N-methylol methacrylamide, N-methylol crontonic amide, N-methylol itaconic amide, N.N'-dimethylol itaconic amide, N-methylol maleic amide, N-methylol fumaric amide, N-methylol vinyl urea, N.N-dimethylol vinyl urea, N.N'-dimethylol-3.5-diamino-1 - vinyl - s - triazine, N-methylmethylol acrylamide, N-methylmethylolmethacrylamide, N- methylmethylolcrotonic amide, N-methylmethylol itaconic amide, N.N'-dimethylmethylol itaconic amide, N-methyl methylol maleic amide, N - methylmethylol fumaric amide, N - methylmethylol vinyl urea, N.N'-dimethylmethylol vinyl urea, N.N' - dimethylmethylol - 4.6-diamino-2-vinyl-s-triazine, N-ethylmethylol acrylamide, N-ethylmethylol methacrylamide, N-ethylmethylolcrotonic amide, N-ethylmethylol itaconic amide, N-ethylmethylolvinylurea, N.N'-diethylmethylol-4.6-diamino-2-vinyl-s-triazine, (and the like), N-propylmethylol acrylamide, N-propylmethylol methacrylamide, N-propylmethylol itaconic amide, N-propylmethylol methacrylamide, N-propylmethylol itaconic amide, N-propylmethylol vinyl urea, N.N'-dipropylmethylol-4.6-diamino-2-vinyl-s-triazine (and the like,) N-sulfomethylacrylamide, N - sulfomethylmethacrylamide, N-sulfomethyl crotonic amide, N- sulfomethyl itaconic amide, N-sulfomethylmaleicamide, N-sulfomethylfumaric amide, N-sulfomethyl vinyl urea, N.N'-disulfomethyl-4.6-diamino-2-vinyl-s-triazine, acrylic azide, methacrylic azide, N - sulfoethylacrylimide, N - sulfoethylmethacrylimide, N - carboxyethylacrylimide, N - carboxyethylmethacrylimide (and the like,) acrolein (and the like).

(b) Active-reactive oil-soluble or -dispersible monomer group:

Acrylic chloride, methacrylic chloride, crotonic chloride, itaconic chloride, itaconic anhydride, maleic anhydride, acrylethyleneimide, methacrylethyleneimide, crotonic ethyleneimide, itaconic ethyleneimide, N-butylmethylolacrylamide, N - butylmethylolmethacrylamide, N-butylmethylol, vinyl urea, N.N'-dibutylmethylol-4.6-diamino-2-vinyl-s-triazine, glycidyl acrylate, glycidyl methacrylate, glycidyl crotonate, glycidyl itaconate, $\beta$-hydroxy-$\gamma$ - chloro-n-propylacrylate, $\beta$-hydroxy-$\gamma$-chloro-n-propylmethacrylate, $\beta$ - hydroxy - $\gamma$ - chloro - n - propyl itaconate, ethyleneglycoldiacrylate, ethyleneglycoldimethacrylate, ethyleneglycoldiitaconatediacid, allylglycidylether, allyl $\beta$-hydroxy-$\gamma$-chloro-n-propyl ether, vinyl isocyanate, propenyl isocyanate, vinyl phenylurethane, propenyl phenyl urethane, vinyl ethyleneurea, propenyl ethyleneurea, 4,6 - dichloro-2-vinyl-s-triazine, 4-chloro-6-amino - 2 - vinyl-s-triazine, 4.6-diethyleneimino-2-vinyl-s-triazine, N.N'-methylenebis-acrylamide, N.N'-methylenebismethacrylamide, methacrolein, crotonic aldehyde, itaconic aldehyde, allyl acrylate, allyl methacrylate, ethyleneglycoldiacrylate, ethyleneglycoldimethacrylate, ethyleneglycoldiitaconate, polyethyleneglycoldiacrylate, polyethyleneglycoldimethacrylate, propandioldiacrylate propanediol dimethacrylate, polypropyleneglycoldiacrylate, polypropyleneglycol dimethacrylate, butanediol diacrylate, butanediol dimethacrylate (and the like).

(2) Weak-reactive monomer group (a) Weak-reactive and water-soluble or -dispersible monomer group:

Acrylic acid, methacrylic acid, crotonic acid, itaconic acid, maleic acid, fumaric acid, acrylamide, methacrylamide, crotonic amide, itaconic diamide, itaconic monoamide, maleic diamide, maleic monoamide, fumaric amide, ethyleneglycol monoacrylate, ethyleneglycolmonomethacrylate, polyethyleneglycol monoacrylate, polyethyleneglycolmonomethacrylate, polyethyleneglycolmonoitaconatemonoamide, polyethyleneglycolmonofumarate monoamide, N-vinyl urea and the like.

(b) Weak-reactive and oil-soluble or -dispersible monomer group:

Monomethylitaconate, monomethylmaleate, monoethylitaconate, monobutylitaconate, propanediolmonoacrylate, propanediolmonomethacrylate, propanediolmonoitaconate, propanediolmonomaleate, polypropyleneglycolmonoacrylate, polypropyleneglycolmonomethacrylate, butanediolmonoacrylate, butanediolmonomethacrylate, butanediolmonoitaconate, acrylonitrile, methacrylonitrile, crotonicnitrile, itaconic nitrile and the like.

(3) Non-reactive monomer group (a) Non-reactive and water-soluble or -dispersible monomer group:

N-vinyl pyrrolidone, 2-vinyl-5-methyl pyridine.

(b) Non-reactive and oil-soluble or -dispersible monomer group:

Methylacrylate, methylmethacrylate, methylcrotonate, dimethylitaconate, dimethylmaleate, methylfumarate, ethylacrylate, ethylmethacrylate, ethylcrotonate, diethylitaconate, ethylmaleate, ethylfumarate, propylacrylate, propylmethacrylate, propylitaconate, butylmaleate, butylfumarate, hexylacrylate, hexylmethacrylate, hexylitaconate, octylacrylate, octylmethacrylate, octylcrotonate, octylitaconate, octylmaleate, octylfumarate, laurylacrylate, laurylmethacrylate, laurylitaconate, stearylacrylate, stearylmethacrylate, stearylitaconate, ethoxyethylmethacrylate, vinyl acetate, vinyl propionate, vinyl stearate, styrene, vinyl toluene, vinyl chloride, vinylidene chloride, methyl vinyl ketone, N-vinyl-$\epsilon$-caprolactum, N-vinylphthalimide, butadiene, isoprene and chloroprene.

If the polymer contains the aforementioned reactive radicals, which are in themselves solubilizable or dispersible, then the solubilizing or dispersible radical need not be subsequently introduced. For a hydrophilic radical solubilizable or dispersible in water, at least one polar radical is properly selected from anionic, nonionic and cationic hydrophilic radicals according to the object to be performed by coloring matter. As typical thereof, there can be enumerated such anionic hydrophilic radicals as carboxyl (—COOH), sulfate (—$OSO_3H$) and sulfo (—$SO_3H$) radicals, such nonionic hydrophilic radicals as hydroxyl (—OH), ether (—O—) and carboamide (—$CONH_2$) radicals and such cationic hydrophilic radicals as amino (—$NH_2$), imino (—NH—), tertiary amino

and pyridine

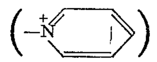

radicals. For a hydrophobic radical solubilizable or dispersible in oil there is properly selected at least one nonpolar group from aliphatic hydrocarbon radicals and esters, ether, carboamide, sulfoamide, urea and urethane condensates thereof according to the use desired of the aforesaid coloring matter.

Processes in accordance with the invention for making a chromogen-bonded-polymer having a hydrophilic or hydrophobic radical may include the following:

(1) Introduction of water-solubilizable or dispersible radicals.
- (A) Introduction of anionic hydrophilic radicals.
  - (a) A carboxyl radical is introduced by using chloroacetic acid.
  - (b) A sulfo radical is introduced by using sodium bisulfite.
  - (c) A sulfonyl radical is introduced by using sulfamic acid.
- (B) Introduction of nonionic hydrophilic radicals.
  - (a) A polyether type radical is introduced by using ethylene oxide.
  - (b) A polyalcohol type radical is introduced by using glycerine or glycidol.
- (C) Introduction of cationic hydrophilic radicals.
  - (a) An amino or imino radical is introduced by using a lower amine.
  - (b) A pyridinium radical is introduced by using pyridine hydrochloride.
  - (c) An imino radical is introduced by using ethylene imine.

(2) Introduction of oil-solubilizable or dispersible radicals.

By using a reactive compound having such hydrophobic hydrocarbon radical as, for exacple, a higher aliphatic, or aromatic-amine, -alcohol, -carboamide, -methylol carboamide, -isocyanate, -urea, -urethane or ethylene urea or a phenolic derivative, the aforesaid hydrocarbon radical is introduced.

The introduction of the solubilizing or dispersing radical into the chromogen-bonded-polymer enables it to be used in many different ways depending upon the nature of the radical introduced thereinto.

The chromogen-bonded-polymer of the present invention can be utilized for different uses depending on the kind of the solubilizable or dispersible radical contained therein, i.e., the chromogen-bonded-polymer into which there is introduced a hydrophilic radical can be extensively utilized as a material similar to a dye in such conventional uses of dyes as dyeing fibrous materials. The polymer into which there is introduced a hydrophobic radical can also be extensively utilized, as a coloring material for paints and printing inks in the conventional uses of pigments.

This is because the chromogen-bonded-polymer of the invention, having in its structure radicals solubilizable or dispersible respectively in water, organic solvents, plasticizers or/and other vehicles, can be easily dissolved or finely dispersed in such vehicles by merely being mixed and stirred therein. In case of the chromogen-bonded-polymer having reactive radicals in its structure, when an after-treatment such as heating, addition of a catalyst or a heavy metal or variation of pH is then carried out, the reactive (functional) radicals of the chromogen-bonded-polymer will be made to react with each other or with the vehicle so that the polymer may be crosslinked to be of a higher molecular weight. Thus, its resulting solubilizability or dispersibility will be so negligible as compared with the molecular weight of the crosslinked polymer that it will be able to be made insoluble.

In the case of using the chromogen-bonded-polymer coloring agent provided by this invention for ball-point ink, stamp pad ink, cosmetics and soap, such agent will be stable during long periods of storage and the solubility thereof will retain its excellent properties if the chromogen-bonded-polymer has weak-reactive and/or non-reactive radicals, particularly if it only has non-reactive radicals.

Useful chromogen-bonded-polymers are produced by utilizing the properties of solubilizable radicals of addition-polymerizable monomers. For example, a coloring agent for ball-point pen ink is required to be characterized by extensive solubility and the property of not bleeding in fatty oils.

Thus, for example, if the polymer portion of the ball-point pen ink is one which becomes polymethyl methacrylate in the inventive process as when methylmethacrylate is used as the addition-polymerizable monomer, the chromogen-bonded-polymer which results will be soluble in esters, ketones, benzyl alcohol, etc., and will not bleed in fatty oils.

Such properties are not possessed by any known oil-soluble dyes.

As for a coloring agent for the inner coloring of synthetic resins and synthetic fibers, if an addition-polymerizable monomer is selected which results in a polymer having properties which are similar to the properties of the resin or fiber in its material nature or which has affinity therewith, their physical and chemical properties coincide to some extent. In such situation if it is desirable to color such polymer the material to be colored thereby will not be destroyed or harmed.

For example, if a chromogen-bonded-polymer is selected in which the polymer portion is polyacrylonitrile, for the dope dyeing of polyacrylonitrile, a resulting colored yarn will be obtained without changing the conditions for the spinning thereof.

The effects of coloring articles and materials with the chromogen-bonded-polymer having solubilizing or dispersing radicals as compared with those of conventional dyes and pigments is explained as follows.

The chromogen-bonded-polymers which have radicals solubilizable or dispersible in oil, for example, have such high dispersibility in solvents and varnishes that when they are utilized as a paint or ink, for example, they will be transparent, high in concentration and have good spreadability. If the chromogen-bonded-polymers also have the aforesaid reactive radicals, the latter will cross link to each other or to a functional radical of an article being coated with the chromogen-bonded-polymer upon an after-treatment of the coated article. If the chromogen-bonded-polymer is used to color the interiors of synthetic resins and synthetic fibers and a dispersible radical high in compatibility with the resins and/or fibers is present in the chromogen-bonded-polymer, the latter chromogen-bonded-polymer will be high in dispersibility and tinting strength, will cause no migration and will not deleteriously reduce the normal physical and electrical characteristics of such resins and fibers.

In coloring with conventional water-soluble coloring material such as known reactive dyes, the chromogens in these dyes are generally chosen to have a functional radical which is believed to covalently bond with a functional radical of the material, such as a fibrous substance, to be bonded to color the material. In this situation, a reactive dye which has been hydrolyzed with the water medium or a reactive dye which has lost its functional radicals through reaction with a sizing material, for example, will no longer be able to react with the material to be colored thereby to reduce fastness of color. Furthermore, conventional dyes having a radical such as a sulfo or carboxyl radical in its chromogen, if not sufficiently applied to fabric materials, for example, will again dissolve or disperse in water when the dyed materials are washed and will stain white and light colored portions of the material. Even where sufficient dye has been applied, variations in pH or other conditions may result in a varying of the hue.

By contrast, when the chromogen-bonded-polymer produced in accordance with the invention has present therein reactive radicals and a radical solubilizable or dispersible in water and such chromogen-bonded-polymer is caused to permeate materials such as fibrous materials in a state having affinity with water and then the reactive radicals are caused to cross link with each other or to react with the functional radical or radicals of the materials in an after-treatment of the materials coated with the chromogen-bonded-polymer such as by heating or pH variation, the chromogen-bonded-polymer will readily be crosslinked to a higher polymer. The resulting higher polymer is necessarily so insoluble and stable within the coated materials that, even if the materials are washed with hot water, acid or alkali, the color on the material remains fast. Thus it has been found that the crosslinked chromogen-bonded-polymer produced by the after-treatment is so high in its fixing ratio, abrasion resistance and other characteristics of fastness that not only cotton, and other cellulose fibers such as viscose rayon and acetate rayon fibers but also wool and such synthetic fibers as polyester, polyamide, polyacrylonitrile and polyvinyl formal fibers can be uniformly dyed with it.

Where solutions for producing fibers, papers and nonwoven fabrics are colored with a conventional coloring material, dye, etc., the coloring material will act as an impurity and will deleteriously affect physical properties of the colored objects by reducing, for example, their tensile strength and tearing, bending and abrasion resistance. By contrast, the chromogen-bonded-polymer of the invention enhances such properties.

In addition, it has been found that when materials and articles such as papers, textiles, leathers, wooden articles, hard boards, concrete walls, metal plates, glass plates and the like are colored with the chromogen-bonded-polymer of the invention while simultaneously being resin treated, they are advantageously endowed with the desirable property of proof against stain and water, fire and moth damage.

The following examples will serve to illustrate the invention. However, it is to be understood that it is not intended to limit the scope of the invention thereto. The word "parts" appearing in the examples is intended to signify parts by weight.

EXAMPLE 1

40 parts of 4.4.4″-triamino copper phthalocyanine blue hydrochloride paste (the converted weight as a dried solid), which was produced by condensing 4-nitrophthalimide and phthalimide (molar ratio 3 to 1) using cuprous chloride and reducing the nitro radicals of the condensate to amino radicals with stannous chloride, was thoroughly mixed with 200 parts of 35% hydrochloric acid aqueous solution, and the resulting mixture was then made up to 1,300 parts by adding water and ice. This aqueous mixture was maintained by adding thereto 12 parts of sodium nitrite. After decomposing excess nitrous acid with sulfamic acid using potassium iodide starch paper, an aqueous solution of diazotized triamino copper phthalocyanine blue was obtained. Thereafter, to this diazotized solution, 27 parts of zinc chloride were added to make copper phthalocyanine blue-tri-stabilized diazonium salt. The copper phthalocyanin-tri-stabilized diazonium salt was precipitated by salting out and filtered to obtain its paste.

Then, the stabilized diazonium salt paste was dissoled in water and made up to 1,500 parts by the adding of water thereto.

To this aqueous solution, there were added 100 parts of acrylamide, 30 parts of methyl acrylate and 10 parts of butyl acrylate. When the resulting mixture was kept at room temperature for about 20 minutes and then heated to 65° C. for 120 minutes, addition-polymerization occurred with the evolution of foams. The end point of the polymerization was fixed at a point where foaming ceased, i.e., the stabilized diazonium salt to be used as an initiator was almost decomposed. After polymerization, 4,500 parts of methyl alcohol were added to precipitate the chromogen-bonded-polymer resulting therefrom. The chromogen-bonded-polymer powder was obtained by filtering, washing thereof with 1,000 parts of methyl alcohol and drying in open air.

EXAMPLE 2

A quantity of 5 parts of the blue polymer powder which was synthesized according to the method described in Example 1 was dissolved in 95 parts of water to make a blue aqueous solution. 3 parts of a 37% aqueous solution of formaldehyde were added thereto and methylolation was carried out at 65° C. for 25 minutes under the condition of pH 9 which was regulated by the addition of 5% aqueous sodium carbonate solution.

By adding 300 parts of methyl alcohol, a chromogen-bonded-polymer was obtained. This polymer was dried in open air to obtain blue polymer powder. This blue polymer powder was quite soluble in water and a clear blue aqueous solution was obtained therewith.

EXAMPLE 3

A quantity of 3 parts of unmethylolated blue chromogen-bonded-polymer synthesized according to the method described in Example 1 was dissolved in 97 parts of water to make a blue aqueous solution. A quantity of 0.5 part of melamine and 5.4 parts of a 37% aqueous solution of formaldehyde were added to the solution. The pH of the solution was regulated to 7.5 by the addition of 5% aqueous sodium carbonate solution. Clear solution was obtained by then heating at 70° C. for 10 minutes.

After cooling the solution down to 45° C., 0.2 part of sulfamic acid and 2.0 parts of 30% aqueous hydrochloric acid solution were added together to the solution, and then, by lowering the pH of the solution to 4.5, condensation occurred. After about 10 minutes, by taking a drop of reactant solution, the condensation degree was detected by dropping it into a large quantity of cold water and checking the point where a resinous precipitate formed.

Then 0.8 part of 20% aqueous sodium hydroxide solution were added to the solution to make the pH of the reactant about 10, at which point blue chromogen-bonded-polymer solution was obtained. At this state of precipitation, nothing could be detected when one drop of reactant was dropped into a large amount of cool water.

To a blue chromogen-bonded-polymer solution which was synthesized according to the method described in this example, 3 times its volume of methanol was added, whereby blue chromogen-bonded-polymer precipitate was obtained. This polymer precipitate was dissolved in water to dilute it to 5% by weight in aqueous solution.

According to the following composition, emulsion-polymerization was carried out at 55° C. for 1 hour, 65° C. for 4 hours, and 80° C. for 2 hours, with a continuous agitation and heating, and thus colored latex was obtained.

| | Parts |
|---|---|
| Chromogen-bonded-polymer solution mentioned above | 75.0 |
| Butyl acrylate | 9.5 |
| Vinyl acetate | 1.5 |
| Vinylidene chloride | 9.0 |
| Acrylamide | 0.2 |
| Sodium phosphate | 0.5 |
| Sodium alkyl benzene sulfonate | 0.5 |
| Potassium persulfate | 0.04 |
| Water | 3.76 |
| Total | 100.00 |

Similar colored latex was also obtained using the blue chromogen-bonded-polymer solution which was synthesized according to Example 2 instead of this example.

This example shows the production of a chromogen-bonded-polymer which is both methylolated to be reactive and has introduced thereinto a water solubilizable sulfo radical by the use of sulfamic acid. In addition, it illustrates the production of a colored latex comprising mixing a reactive solubilizable chromogen-bonded-polymer with addition-polymerizable monomers and polymerization initiator, and polymerizing these monomers in aqueous solution of the chromogen-bonded-polymer.

EXAMPLE 4

5 parts of unmethylolated chromogen-bonded-polymer which was synthesized according to the method described in the method of Example 1 were dissolved in 95 parts of water to give a blue chromogen-bonded-polymer aqueous solution. 10 parts of melamine and 43 parts of a 37% aqueous solution of formaldehyde were added to the colored solution. Methylolation reaction was carried out at 70° C. after the pH of the reactant was regulated with 5% aqueous sodium carbonate solution to 7.5. After complete dissolution was achieved by the addition of 50 parts of butanol and 1 part of phosphoric acid, a dehydration reaction was carried out at 90° C. by circulating the butanol and water, which was stripped off and collected from the reactant. After the reaction was completed, by taking off the excess butanol under reduced pressure, and by concentrating the reactant to a viscous solution containing 50% of solid content, butyl-methylolmelamine type blue resinous solution was obtained.

EXAMPLE 5

Triamino copper phthalocyanine blue, obtained by reducing trinitro copper phthalocyanine blue prepared by using 4-nitro-phthalimide, 3-nitrophthalimide and phthalimide (molar ratio 2:1:1), was diazotized in an aqueous medium containing a quantity of hydrochloric acid in an amount of moles equal to 14 times the stoichiometric amount of the amino compound according to the method described in Example 1. The diazonium salt resulting was stabilized using zinc chloride according to the method described in Example 1.

A mixture was then formulated as follows:

| | Parts |
|---|---|
| A 15% paste containing the above obtained stabilized diazonium salt | 25 |
| Acrylamide | 4 |
| Itaconamide | 2 |
| Water | 69 |
| Total | 100 |

A polymerization was carried out according to the method described in Example 1. After polymerization, 400 parts of methyl alcohol and 5 parts of sodium chloride were added to the polymeriaztion solution to precipitate the chromogen-bonded-polymer. The precipitate was filtered and dried in an open air to obtain the chromogen-bonded-polymer powder.

Thereafter, 5 parts of the chromogen-bonded-polymer powder were dissolved in 95 parts of water, and 10 parts of 37% aqueous solution of formaldehyde were added thereto. Methylolation reaction was carried out according to the method described in Example 2.

After filtration, 500 parts of methyl alcohol were added to filtrate. The chromogen-bonded-polymer was obtained by filtering, washing with 10 parts of methyl alcohol, and drying in open air.

EXAMPLE 6

Triamino copper phthalocyanine blue, obtained by reducing trinitro copper phthalocyanine blue prepared by using 4-nitro-phthalimide, 3-nitrophthalimide and phthalimide (molar ratio 1:2:1), was diazotized and stabilized using zinc chloride according to the method described in Example 1.

A mixture was then formulated as follows:

| | Parts |
|---|---|
| A 15% paste containing thus-obtained stabilized diazonium salt | 25 |
| N-methylmethylolacrylamide | 7 |
| Water | 68 |
| Total | 100 |

When this solution was kept for 10 minutes with stirring at room temperature and then at 60° C. for 20 minutes, polymerization occcurred with the continuous foaming at which point the reaction temperature was raised to 65° C. The end point of the polymerization was fixed at a point of where no further foaming occurred.

After filtration, 300 parts of methanol were added to the filtrate to precipitate the chromogen-bonded-polymer. This polymer was dried in open air to obtain polymer powder. The polymer powder was quite soluble in water and a clear aqueous solution was obtained.

EXAMPLE 7

Triamino copper phthalocyanine blue, prepared according to the method described in Example 5, was diazotized in an aqueous hydrochloric acid medium containing a molar concentration of hydrochloric acid and equal to at least 12 times the molar concentration of the amino radicals of the amino compound according to the method described in Example 1 and was stabilized using naphthalene - 1.5 - disulfonic acid instead of using zinc chloride (as described in Example 1) according to the method described in Example 1.

A mixture was then formulated as follows:

| | Parts |
|---|---|
| A 15% paste containing the above-obtained stabilized diazonium salt | 25 |
| Methyl acrylate | 1 |
| Glycidyl methacrylate | 0.5 |
| Acrylamide | 6 |
| Polyethyleneglycolalkylether | 0.1 |
| Water | 67.4 |
| Total | 100.0 |

The polymerization was carried out according to the method described in Example 1.

After polymerization, 200 parts of methyl alcohol and 5 parts of sodium chloride were added to the solution to precipitate the chromogen-bonded-polymer. After filtration, the chromogen-bonded-polymer was washed in 50 parts of methyl alcohol and dried in open air to obtain the chromogen-bonded-polymer powder.

EXAMPLE 8

60 parts of 4.4′.4″-triamino copper phthalocyanine blue hydrochloride paste (the converted weight as the dried solid) were thoroughly mixed with 426 parts of 35% hydrochloric acid aqueous solution and the resulting mixture was then made up to 1,800 parts by adding water and ice thereto. This aqueous mixture was kept below 5° C. in an ice-bath and diazotized for 15 minutes by adding 18 parts of sodium nitrite thereto. After decomposing excess nitrous acid with sulfamic acid using potassium iodide starch paper, an aqueous solution of diazotized copper phthalocyanine blue, which was greenish blue, was obtained. To this aqueous solution, 60 parts of triethanolaminedodecylbenzene sulfonate were added to stabilize the diazonium salt. After filtering the precipitated stabilized diazonium salt, the stabilized diazonium salt was dispersed in water and the solution was made up to 1,800 parts by adding of water.

Thereafter, 420 parts of methylmethacrylate and 4 parts of glycidyl methacrylate were added.

When the resulting mixture was kept at room temperature for 20 minutes and then heated to 65° C. for 120 minutes, addition-polymerization occurred with the evolution of foams, i.e. nitrogen gas produced by the decomposition of the diazonium salt. The end point of the polymerization was fixed at a point where foaming no longer occurred and the color of the solution changed from greenish blue to sky blue.

After polymerization, the precipitated chromogen-bonded-polymer was filtered and washed with 2,000 parts of water and 500 parts of methyl alcohol. The washed chromogen-bonded-polymer was dissolved in acetone solvent to prepare the 10% acetone solution of the chromogen-bonded-polymer.

After filtration, the acetone solution of the chromogen-bonded-polymer was poured in small portions into a large quantity of water with stirring to precipitate the chromogen-bonded-polymer. After filtration, the precipitated chromogen-bonded-polymer was again washed with 500 parts of water and 500 parts of methyl alcohol and dried in open air to obtain the chromogen - bonded - polymer powder.

EXAMPLE 9

4.4'.4''-triamino copper phthalocyanine blue prepared according to the method described in Example 1 was diazotized and stabilized using sodium dodecylbenzenesulfonate according to the method described in Example 8.

A mixture was then formulated as follows:

| | Parts |
|---|---|
| A 15% paste containing thus-obtained stabilized diazonium salt | 30 |
| Glycidyl acrylate | 6 |
| Water | 64 |
| Total | 100 |

The polymerization was carried out according to the method described in Example 8.

After polymerization, the precipitated chromogen-bonded-polymer was filtered and washed with 100 parts of water and 50 parts of methyl alcohol to obtain the chromogen-bonded-polymer.

EXAMPLE 10

Triamino copper phthalocyanine blue, which was prepared by introducing into copper phthalocyanine blue amino radicals by post-amination using hydroxylamine and ferrous sulfate as catalysts in sulfuric acid, was diazotized and stabilized using sodium laurylsulfate (instead of the naphthalene - 1.5 - disulfonic acid of Example 7), according to the method described in Example 7.

A mixture was then formulated as follows:

| | Parts |
|---|---|
| A 15% paste containing the above-obtained stabilized diazonium salt | 30 |
| Propyl methacrylate | 7 |
| Glycidyl methacrylate | 1 |
| N.N'-dimethylformamide | 62 |
| Total | 100 |

When this solution was kept at 50° C. for 20 minutes, and then at 65° C. for 60 minutes, polymerization occurred with evolution of foam. The solution was poured into 5,000 parts of water with violent stirring, and chromogen-bonded-polymer was precipitated. After filtration, the chromogen-bonded-polymer was obtained.

EXAMPLE 11

3.3'.3''-triamino copper phthalocyanine blue was diazotized and stabilized using zinc chloride according to the method described in Example 5.

A mixture was then formulated as follows:

| | Parts |
|---|---|
| A 15% paste containing thus-obtained stabilized diazonium salt | 25.0 |
| Methylmethacrylate | 6.0 |
| Ethylacrylate | 1.5 |
| Glycidylmethacrylate | 0.5 |
| Water | 67.0 |
| Total | 100.0 |

The polymerization was carried out according to the method described in Example 8.

After polymerization, the precipitated chromogen-bonded-polymer was filtered and washed with 100 parts of water and 50 parts of methyl alcohol. The chromogen-bonded-polymer was thus obtained.

EXAMPLE 12

A quantity of 25 parts of glycerine was reacted together with 190 parts of linseed oil in a reaction vessel at 180° C. for 2 hours under the circulation of nitrogen gas. 0.2 part of zinc acetate and 10 parts of chromogen-bonded-polymer powder synthesized according to the method of Example 11 were added in the form of 60% xylene solution to the above reaction mixture.

Elevating the temperature to 140° C., gradually, and stripping off the mixed vapour of alcohol and xylene, reaction was carried out. The reaction was then carried out for 30 minutes at 200° C. and thereafter was continued for 4 hours at 230 to 250° C. with the addition of 60 parts of phthalic acid. A viscous, alkyd type blue solution was obtained.

This example illustrates the formation of a viscous alkyd type chromogen-bonded-polymer having weak reactive radicals, which are stable at room temperature and react with each other at high temperature, i.e., carboxyl and hydroxyl radicals, and hydrophobic radicals, i.e., aryl and aliphatic hydrocarbon radicals.

EXAMPLE 13

Monobromo-4.4'.4''-triamino nickel phthalocyanine was diazotized and stabilized using triethanolamine laurylsulfate according to the method described in Example 8.

A mixture was then formulated as follows:

| | Parts |
|---|---|
| A 15% paste containing the above-obtained stabilized diazonium salt | 20 |
| 4.6 - bis - (N - butylmethylolamino) - 2 - vinyl-s-triazine | 0.5 |
| Dilaurylitaconate | 6 |
| Octyl acrylate | 1 |
| Water | 72.5 |
| Total | 100.0 |

The polymerization was carried out according to the method described in Example 8.

After polymerization, the precipitated chromogen-bonded-polymer was filtered and washed with 100 parts of water and 50 parts of methyl alcohol. The chromogen-bonded-polymer was thus obtained.

EXAMPLE 14

Chlorinated triamino cobalt phthalocyanine, prepared by reducing, after chlorination reaction, trinitro cobalt phthalocyanine, which was produced with cobalt salt instead of cuprous chloride according to the method described in Example 6, was diazotized and stabilized using zinc chloride according to the method described in Example 1.

A mixture was then formulated as follows:

| | Parts |
|---|---|
| A 15% paste containing thus-obtained stabilized diazonium salt | 25 |
| N-sulfoethylacrylamide | 3 |
| Sulfomethylacrylamide | 3 |
| Water | 69 |
| Total | 100 |

The polymerization was carried out according to the method described in Example 1.

After polymerization, 200 parts of methyl alcohol and 5 parts of sodium chloride were added to the solution to precipitate the chromogen-bonded-polymer. After filtration, the chromogen-bonded-polymer was washed with 50 parts of methyl alcohol, and dried in open air to obtain the chromogen-bonded-polymer powder. The polymer powder was quite soluble in alkaline aqueous solution and a clear solution was obtained.

EXAMPLE 15

Sulfonated tetrachloro-4.4′.4″-triamino copper phthalocyanine was diazotized and stabilized using N-methyl taurine according to the method described in Example 8.

A mixture was then formulated as follows:

| | Parts |
|---|---|
| A 15% paste containing the above-obtained stabilized diazo compound | 30 |
| Acrylic acid | 7 |
| Water | 63 |
| Total | 100 |

The polymerization was carried out according to the method described in Example 1.

After polymerization, 500 parts of acetone and 4 parts of sodium chloride were added to precipitate the chromogen-bonded-polymer. After filtration, the chromogen-bonded-polymer was washed in 10 parts of acetone, and dried in open air to obtain chromogen-bonded-polymer powder.

EXAMPLE 16

Monochloro triamino nickel phthalocyanine, prepared with monochloro phthalimide and nickel salt instead of phthalimide and cuprous chloride according to the method described in Example 5, was diazotized according to the method described in Example 8, and stabilized using zinc chloride according to the method described in Example 1.

A mixture was then formulated as follows:

| | Parts |
|---|---|
| A 15% paste containing thus-obtained stabilized diazonium salt | 7.2 |
| Methacrylic acid | 1.0 |
| Ethyleneglycolmonoacrylate | 3.0 |
| Trichloroethylene | 62.2 |
| Iso propyl alcohol | 26.6 |
| Total | 100.0 |

The polymerization was carried out according to the method described in Example 1.

After polymerization, the precipitated chromogen-bonded-polymer was filtered and dried in open air to obtain the chromogen-bonded-polymer powder.

EXAMPLE 17

4.4′.4″-triamino copper phthalocyanine blue was diazotized and stabilized using sarcosine instead of zinc chloride according to the method described in Example 1.

A mixture was then formulated as follows:

| | Parts |
|---|---|
| A 15% aqueous paste containing thus-obtained stabilized diazo compound | 30 |
| Acrylic acid | 7 |
| Methyl acrylate | 1 |
| Water | 62 |
| Total | 100 |

The polymerization was carried out according to the method described in Example 1.

After polymerization, 300 parts of methyl alcohol were added to precipitate the chromogen-bonded-polymer. After filtration, the chromogen-bonded-polymer was washed with 50 parts of methyl alcohol and dried in open air to obtain the chromogen-bonded-polymer powder

EXAMPLE 18

Chlorinated triamino cobalt phthalocyanine, prepared according to the method described in Example 14, was diazotized and stabilized using triethanolamine dodecylbenzenesulfonate according to the method described in Example 9.

A mixture was then formulated as follows:

| | Parts |
|---|---|
| A 15% paste containing the above-obtained stabilized diazonium compound | 25 |
| Methyl methacrylate | 7 |
| Water | 68 |
| Total | 100 |

The polymerization was carried out according to the method described in Example 1.

After polymerization, the precipitated chromogen-bonded-polymer was filtered and washed with 100 parts of water and 50 parts of methyl alcohol. A quantity of 5 parts of the chromogen-bonded polymer were dissolved in 95 parts of acetone and filtered. 400 parts of methyl alcohol were added to the filtrate with strong agitation to precipitate the chromogen-bonded-polymer. After filtration, the chromogen-bonded-polymer was dried in an open air to obtain the chromogen-bonded-polymer powder.

EXAMPLE 19

4.4′.4″-triamino copper phthalocyanine blue was diazotized and stabilized using zinc chloride according to the method described in Example 1.

A mixture was then formulated as follows:

| | Parts |
|---|---|
| A 15% paste containing the above-obtained stabilized diazonium salt | 20 |
| Ethylacrylate | 0.5 |
| Acrylonitrile | 5 |
| Sodium dodecylbenzenesulfonate | 0.5 |
| Water | 74.0 |
| | 100.00 |

The polymeriztion was carried out according to the method described in Example 1.

After polymerization, the precipitated chromogen-bonded-polymer was filtered and washed with 300 parts of water and 50 parts of methyl alcohol. And then the chromogen-bonded-polymer was dried in an open air to obtain its powder.

EXAMPLE 20

Triamino cobalt phthalocyanine blue, prepared by introducing amino radicals into cobalt phthalocyanine blue by postamination using hydroxylamine and ammonium molybdate as a catalyst in sulfuric acid medium, was diazotized according to the method described in Example 8 and stabilized using stannic chloride instead of zinc chloride according to the method described in Example 1.

The paste of the stabilized diazonium salt was washed with three times its quantity of acetone, and dried in open air.

A mixture was then formulated as follows:

| | Parts |
|---|---|
| The obtained powder of the stabilized diazonium salt | 4 |
| Aminostyrene acetic acid salt | 4 |
| Ethyleneglycolmonomethacrylate | 4 |
| Water | 88 |
| Total | 100 |

The polymerization was carried out at 60° C. for 2 hours and at 75° C. for 1 hour.

After polymerization, 500 parts of methyl alcohol were added to precipitate the chromogen-bonded-polymer. The precipitate was filtered and washed with 20 parts of methyl alcohol.

A quantity of 5 parts of the obtained chromogen-bonded-polymer was dissolved in 45 parts of water with vigorous stirring. To this solution, maintained under low pressure, ethylene oxide was introduced under pressure and reacted with the amino radicals of the chromogen-bonded-polymer in a quantity of about 20 moles of ethylene oxide per one amino radical of the chromogen-bonded-polymer.

EXAMPLE 21

Triamino cobalt phthalocyanine blue, prepared by condensing the nitrated product of phthalic anhydride (about 70% of the 4-nitro compound and about 30% of the 3-nitro compound) and phthalic anhydride at a molar ratio 3 to 1, using cobaltous chloride and reducing the nitro radicals of the condensate to amino radicals with stannous chloride and sodium sulfide, was diazotized according to the method described in Example 8 and stabilized using fluoroboric acid instead of zinc chloride according to the method described in Example 1.

A mixture was then formulated as follows:

| | Parts |
|---|---|
| A 25% paste containing the above-mentioned stabilized diazonium salt | 30 |
| N-vinyl pyrrolidone | 9 |
| 2-vinyl-5-methyl pyridinium acetate | 1 |
| Water | 60 |
| Total | 100 |

The polymerization was carried out according to the method described in Example 1.

After filtration of the above-obtained solution, a clear solution of the chromogen-bonded-polymer was obtained.

EXAMPLE 22

Triamino cobalt phthalocyanine blue, prepared using cobaltous chloride instead of cuprous chloride as in the method described in Example 1, was diazotized and stabilized using triethanolamine dodecylbenzene sulfonate according to the method described in Example 8. This paste was washed with acetone and dried in open air.

A mixture was then formulated as follows:

| | Parts |
|---|---|
| The obtained stabilized diazonium salt powder | 4 |
| Butyl acrylate | 6 |
| Styrene | 1 |
| Maleic anhydride | 2 |
| Trichloroethylene | 37 |
| Ethyleneglycolmonoethylether monoacetate | 50 |
| Total | 100 |

The polymerization was carried out according to the method described in Example 20. After polymerization, 3 parts of diethylenetriamine were added to the solution and reacted at 70° C. for 3 hours.

After the amination reaction, the resulting solution was poured into 400 parts of methyl alcohol containing 5 parts of 20% aqueous solution of sodium chloride to precipitate the aminated chromogen-bonded-polymer. The precipitate was filtered, washed with 50 parts of methyl alcohol and dried in open air.

This chromogen-bonded-polymer was easily dissolved in aqueous acidic solution containing an acid such as acetic acid, tartaric acid or hydrochloric acid.

EXAMPLE 23

Triamino nickel phthalocyanine, prepared by condensing 4 - nitro-phthalodinitrile and phthalodinitrile at a molar ratio 3 to 1 using nickel chloride and reducing the nitro radicals of the condensate to amino radicals with stannous chloride, was diazotized according to the method described in Example 5 and stabilized using stannic chloride instead of zinc chloride as in the method described in Example 1.

A mixture was then formulated as follows:

| | Parts |
|---|---|
| A 20% paste containing the thus-obtained stabilized diazonium salt | 20 |
| Monomethylitaconate monoacid | 3 |
| Methacrylamide | 3 |
| Water | 74 |
| Total | 100 |

The polymerization was carried out according to the method described in Example 1.

After polymerization, 1 part of sodium chloride and 200 parts of acetone were added to precipitate the chromogen-bonded-polymer. The precipitate was filtered, washed with 30 parts of acetone and dried in open air.

EXAMPLE 24

4,4′,4″-triamino cobalt phthalocyanine blue, prepared by using cobaltous chloride instead of cuprous chloride according as in the method described in Example 1, was diazotized and stabilized using fluoroboric acid according to the method described in Example 21.

A mixture was then formulated as follows:

| | Parts |
|---|---|
| A 15% paste containing the thus-obtained stabilized diazonium salt | 20 |
| Diethylitaconate | 4 |
| Vinylidene chloride | 3 |
| Vinyl acetate | 2 |
| Methacrylamide | 0.5 |
| β-hydroxy-γ-chloro-n-propylacrylate | 0.5 |
| Polyethyleneglycolalkylarylether | 0.3 |
| Water | 69.7 |
| Total | 100.00 |

The emulsion polymerization was carried out at 60° C. for 1 hour at 70° C. for 2 hours and at 80° C. for 30 minutes.

After polymerization, the obtained latex of the chromogen-bonded-polymer was filtered with a coarse filter cloth.

EXAMPLE 25

3,3′,3″-triamino copper phthalocyanine blue was diazotized and stabilized using fluoroboric acid instead of zinc chloride according to the method described in Example 1.

A mixture was then formulated as follows:

| | Parts |
|---|---|
| A 25% paste containing the thus-obtained stabilized diazonium salt | 20 |
| Laurylitaconate monoamide | 3 |
| Methacrylamide | 3 |
| Sodium alkylarylsulfonate | 0.1 |
| Water | 73.9 |
| Total | 100.00 |

The polymerization was carried out according to the method described in Example 1.

After polymerization, 400 parts of methyl alcohol were added to precipitate the chromogen-bonded-polymer. The precipitate was filtered, washed with 10 parts of acetone and dried in open air.

A quantity of 5 parts of the above-obtained chromogen-bonded-polymer and 0.7 part of paraformaldehyde were added to 95 parts of pyridine solution containing 2.7 parts of pyridine hydrochloric acid salt and reacted at 80° C. for 10 hours.

After the reaction, the pyridine of the solvent was mostly distilled off at 60° to 70° C. under reduced pressure. Thereafter, to precipitate the chromogen-bonded-polymer, 3 times its quantity of acetone was added to the remaining solution. The precipitate was filtered to obtain the chromogen-bonded-polymer.

EXAMPLE 26

Triamino copper phthalocyanine blue, prepared using cuprous chloride instead of cobaltous chloride according to the method described in Example 21, was diazotized according to the method described in Example 8 and stabilized using fluoroboric acid instead of zinc chloride according to the method described in Example 1.

A mixture was then formulated as follows:

| | Parts |
|---|---|
| A 25% paste containing the above-obtained stabilized diazonium salt | 20 |
| N,N′-dimethylol itaconicdiamide | 5 |
| Ethyleneglycolmonomethacrylate | 2 |
| Water | 73 |
| Total | 100 |

The polymerization was carried out under mild pH conditions according to the method described in Example 1.

After polymerization, 60 parts of a 10% aqueous solution of sodium bisulfite were added to the obtained solution and sulfonation reaction was carried out at 60° C. for 30 minutes.

After filtration, 2 parts of sodium chloride and 500 parts of methyl alcohol were added to the filtrate to precipitate the chromogen-bonded-polymer. The precipitate was filtered, washed with 10 parts of acetone and dried in open air.

EXAMPLE 27

The following components were mixed together:

| | Parts |
|---|---|
| 5% solution of chromogen-bonded-polymer which was obtained according to the method described in the first step of Example 3 | 35.0 |
| Polyethylene glycol alkyl ether | 1.0 |
| Mineral turpene | 64.0 |
| Total | 100.0 |

The mixture thus obtained was vigorously stirred in a homogenizing mixer to prepare an oil-in-water type of emulsion for use as a textile printing paste. This emulsion was printed on a cloth by a gravure-type printing machine, dried on a steam cylinder and heated at 130° C. for 5 minutes in air to obtain a clear printed cloth having high resistance against abrasion, washing and organic solvents.

EXAMPLE 28

In a reaction vessel, a latex of approximately 28% resin content was prepared in accordance with the following formulation by an emulsion polymerization.

| | Parts |
|---|---|
| N-methylolacrylamide | 2.0 |
| Butyl acrylate | 13.0 |
| Vinylidene chloride | 13.0 |
| Sodium hydroxide | 0.2 |
| Potassium dihydrogen phosphate | 0.8 |
| Sodium alkylarylsulfonate | 0.95 |
| Sodium persulfate | 0.95 |
| Water | 70.00 |
| Total | 100.00 |

The following components were then mixed together:

| | Parts |
|---|---|
| 5% solution of chromogen-bonded-polymer which was obtained according to the method described in Example 6 | 30 |
| Latex prepared above | 10 |
| Polyethylene glycol nonylphenyl ether | 1 |
| Mineral turpene | 59 |
| Total | 100 |

The mixture thus formed was strongly stirred in a homogenizing mixer to prepare an oil-in-water type of emulsion for use as a textile printing paste.

This emulsion was printed on a cloth by a printing machine, dried on a steam cylinder and heated at 130° C. for 5 minutes in air to obtain clear printed cloth having a high resistance against abrasion, washing and organic solvents.

EXAMPLE 29

The chromogen-bonded-polymer solution prepared according to the method described in the first step of Example 3 was acidified with hydrochloric acid and treated with an aqueous solution of barium chloride to precipitate insoluble chromogen-bonded-polymer in a form of a paste.

The following components were mixed together:

| | Parts |
|---|---|
| The above insoluble chromogen-bonded-polymer paste | 80 |
| Polyethylene glycol nonyl phenylether | 20 |
| Total | 100 |

The mixture was vigorously stirred in a homogenizing mixer to prepare a water-dispersible chromogen-bonded-polymer slurry.

Further, the following components were mixed together:

| | Parts |
|---|---|
| The above water-dispersible chromogen-bonded-polymer slurry | 10 |
| The latex prepared according to the method described in Example 28 | 27 |
| 2% aqueous solution of hexamethylene bis-ethylene urea | 3 |
| Mineral turpene | 60 |
| Total | 100 |

The mixture was strongly stirred in a homogenizing mixer to prepare an oil-in-water type of emulsion for use as a textile printing paste.

This emulsion was printed on a cloth by a printing machine, dried on a steam cylinder and then heated at 130° C. for 5 minutes in air to obtain a clear printed cloth having high resistance against abrasion, washing and organic solvents.

EXAMPLE 30

| | Parts |
|---|---|
| Glycidylmethacrylate | 4.0 |
| Acrylamide | 1.0 |
| Butylacrylate | 25.0 |
| Sodium alkylarylsulfonate | 0.9 |
| Ammonium persulfate | 0.1 |
| Water | 69.0 |
| Total | 100.0 |

The above components were reacted together at 70 to 80° C. for 6 hours in an emulsion polymerization vessel. The latex was thus prepared with about 28% of resin content.

The following components were mixed together:

| | Parts |
|---|---|
| 5% solution of chromogen-bonded-polymer prepared according to the method described in Example 7 | 25 |
| The latex prepared described in above | 5 |
| Mineral turpene | 70 |
| Total | 100 |

The mixture was strongly stirred in a homogenizing mixer to prepare an oil-in-water type of emulsion for use as a textile printing paste.

This emulsion was printed on a cloth by a silk-screen printing machine, dried on a steam cylinder, and after dipping the cloth in a 0.2% aqueous sodium hydroxide solution, it was heated and dried to obtain a clear printed cloth having high resistance against abrasion, washing and organic solvents.

EXAMPLE 31

The following components were mixed together:

| | Parts |
|---|---|
| Chromogen-bonded-polymer solution prepared according to the method described in Example 2 | 25 |
| 2% hexamethylene bis-ethylene urea | 5 |
| Polyethyleneglycol alkylether | 1 |
| Mineral turpene | 60 |
| Total | 100 |

The mixture was strongly stirred in a homogenizing mixer to prepare an oil-in-water type of emulsion for use as a textile printing paste.

This emulsion was printed on the warps only by a screen-printing machine, dried on a steam cylinder and heated. Then, they were woven together with white or colored wefts to obtain a clear and beautiful printed cloth having high resistance against chemicals and superior physical properties.

EXAMPLE 32

The following components were mixed together:

| | Parts |
|---|---|
| Stannous chloride | 5 |
| Urea | 3 |
| Water | 31 |
| Polyethyleneglycol nonylphenylether | 1 |
| Mineral turpene | 60 |
| Total | 100 |

The mixture was stirred in a homogenizing mixer to prepare an oil-in-water type of emulsion for use as a resistant printing paste.

| | Parts |
|---|---|
| Above oil-in-water type of emulsion | 90 |
| 5% solution of chromogen-bonded-polymer prepared according to the method described in Example 6 | 10 |
| Total | 100 |

The above components were mixed together to prepare a resistant color printing paste.

The paste was then printed on a cloth, which was steeped in Naphthol AS solution and dried on a steam cylinder. The cloth was then colored in a developer solution and washed. After eliminating the excess of Naphthol AS with an 0.2% aqueous solution of sodium hydroxide, the colored cloth was washed and dried on a steam cylinder to obtain clear colored cloth having high resistance against abrasion, washing and organic solvents.

EXAMPLE 33

The following components were mixed together:

| | Parts |
|---|---|
| 5% aqueous solution of methylcellulose | 50 |
| 10% solution of chromogen-bonded-polymer prepared by the method described in Example 1 | 20 |
| Zinc oxide paste (1:1) | 20 |
| Water | 10 |
| Total | 100 |

The resistant printing paste thus obtained was printed on a cloth. After drying and heat-treating it, the cloth was steeped in an aniline padding solution which consisted of the following components:

| | Parts |
|---|---|
| 3% methylcellulose aqueous solution | 8 |
| Aniline oil | 0.5 |
| Aniline salt | 8.5 |
| Potassium ferrocyanide | 5.4 |
| Sodium chlorate | 2.0 |
| Water | 74.6 |
| Total | 100.0 |

The cloth was dried on a steam cylinder for 15 minutes, then treated with sodium dichromate solution at 50° C. After washing and boiling the cloth, a clear resistant colored cloth was obtained.

EXAMPLE 34

The following components were mixed together to prepare a paste:

| | Parts |
|---|---|
| Ammonia solution (28%) | 2 |
| Water | 32 |
| Polyethyleneglycol octylphenylether | 1 |
| Mineral turpene | 65 |
| Total | 100 |

The following components were then mixed together:

| | Parts |
|---|---|
| 5% solution of chromogen-bonded-polymer prepared according to the method described in the first step of Example 5 | 10 |
| Above described paste | 75 |
| Rongalite solution (1:1) | 15 |
| Total | 100 |

Thereafter, the mixture was printed on a cloth which was already dyed with direct dyestuff, and the cloth was then dried on a steam cylinder, heated for 5 to 15 minutes according to in ordinary steam-heating treatment and washed and dried to obtain a clear and beautiful discharge printed cloth having an excellent resistance to chemicals and superior physical properties.

EXAMPLE 35

A printing paste which consisted of the following:

| | Parts |
|---|---|
| The chromogen-bonded-polymer solution as described in Example 1 | 35 |
| Polyethyleneglycol alkylether | 1 |
| Mineral turpene | 64 |
| Total | 100 |

This paste was printed on a refined and bleached cloth, and after the cloth was dried on a steam cylinder, a mixture of the following components:

| | Parts |
|---|---|
| Rapidogen dyestuff (Red) | 5 |
| Methanol | 5 |
| 38° Bé aqueous sodium hydroxide solution | 3 |
| Water | 12 |
| 5% aqueous solution of methylcellulose | 75 |
| Total | 100 |

was printed on it. Then, the cloth was heated in a rapidager to develop the color. Two colored patterned cloth was obtained through washing, soaping, washing and drying steps.

EXAMPLE 36

Water was penetrated into a mixed spun cloth of terephthalic fibers and cotton fibers before the cloth was steeped in a jigger with a chromogen-bonded-polymer solution prepared according to the method described in Example 5 and with 200 liters of water (ratio 1:4). Dyeing was carried out so that a desired color was obtained under the elevated temperature.

After dyeing, the cloth was washed and dried on a steam cylinder, and then, it was heated at 130° C. for 5 minutes to obtain a clear printed cloth having high resistance to abrasion, washing, and organic solvents.

EXAMPLE 37

95 parts of 3% aqueous solution of chromogen-bonded-polymer prepared according to the first step of the method described in Example 5 and 5 parts of 10% aqueous solution of melamine-formalin condensate were mixed together with 20 times their volume of water to prepare a dyeing bath.

After a refined and bleached cotton yarn was dyed with the above dyeing bath at 130° C. for 5 minutes, there was obtained a beautiful printed cloth having high chemical and physical resistance properties.

EXAMPLE 38

The following components were mixed together:

| | Parts |
|---|---|
| Latex of chromogen-bonded-polymer prepared according to the method described in Example 3 | 30 |
| Polyethyleneglycol laurylether | 1 |
| Mineral turpene | 39 |
| 50% xylene solution of long-oil alkyd resin | 30 |
| Total | 100 |

The mixture was strongly stirred in a homogenized mixer to prepare an oil-in-water type printing paste.

This paste was printed on a non-woven fabric which was prepared by using various binders together with synthetic fibers such as polyacrylonitrile, polyamide, polyester, etc. and natural fibers such as cotton. Then, the fabrics were dried on a steam cylinder and heated at 130° C. for 5 minutes in air to obtain a clear and brilliant color printed non-woven fabric having excellent chemical and physical properties.

EXAMPLE 39

A 3% of pulp solution was prepared by fully beating 3 parts pulp in a beater and adding sufficient water thereto to make up to 100 parts.

Thereafter, the solution was blended together with 10 parts of a mixture which consisted of rosin-soap, titanium dioxide and 5% aqueous solution of chromogen-bonded-polymer prepared according to the method described in Example 2. By adjusting the pH of the pulp solution to be slightly acid (pH=4.5–5.0) by adding 0.2 parts of aluminum sulfate, the chromogen-bonded-polymer was fixed.

A colored paper of 130 g./m.$^2$ was manufactured by a paper-making machine.

According to the method of this example, the yield of the filler increased considerably compared with that of the filler of the usual colored paper, and at the same time the quality of the obtained paper improved since the deterioration of paper usually caused by filling of pigment was eliminated.

EXAMPLE 40

A mixture consisting of the following components:

| | Parts |
|---|---|
| Latex prepared according to the method described in Example 28 | 80 |
| 10% solution of chromogen-bonded-polymer prepared according to the method described in Example 5 | 20 |
| Total | 100 |

was vigorously stirred in a mixer.

The mixture was homogeneously sprayed on a random-web consisting of 75% nylon and 25% staple-fiber and the web was dried at 130° C. for 10 minutes to obtain a strong and soft colored non-woven fabric having excellent properties.

EXAMPLE 41

358 parts of 4.8% aqueous sodium hydroxide solution and 80 parts of cellulose xanthate were mixed together and made up to 438 parts. 10 parts of 5% solution of chromogen-bonded-polymer prepared according to the method described in Example 1 and 0.3 part of titanium dioxide were mixed with the solution obtained above, and after filtering and defoaming, it was spun out into a common coagulation bath. The resulting fiber with stretch was drawn in a second bath at 80 to 90° C. After washing and drying at 50 to 60° C. for 3 hours, viscose rayon was obtained.

With this method, defects such as falling out of the pigment in the coagulation bath or limits imposed on the particle size which can be used, may be completely eliminated.

EXAMPLE 42

80 parts of polyvinyl alcohol which were completely free from sodium acetate, were charged in a vessel and diluted to a 15% solution by an addition of 453 parts of water. The polyvinyl alcohol was completely dissolved either by adjusting the pH of the solution to be slightly alkaline (pH=8–9), or by keeping the solution at 60 to 80° C. for 10 to 15 hours.

The solution thus obtained was stirred vigorously together with 10 parts of 5% solution of the chromogen-bonded-polymer prepared according to the first step of the method described in Example 5 and a homogeneous solution was thereby obtained.

After filtering and defoaming, the latter solution was spun out into a coagulation bath, heated at 200 to 300° C. for a few minutes and acetalized to obtain a colored polyvinyl fiber.

According to the method of this example, such defects as the falling out of the pigment in the coagulation bath or limits imposed on the particle size which may be used, may be completely eliminated.

EXAMPLE 43

5 parts of 10% dimethylformamide solution of the chromogen-bonded-polymer prepared according to the method described in Example 19 and 95 parts of 10% dimethylformamide solution of polyacrylonitrile were mixed together to obtain a homogeneous solution.

The solution was spun to a clear colored yarn by a conventional wet yarn spinning process. A clear and beautiful polyacrylonitrile yarn was thus obtained.

EXAMPLE 44

Printing ink for cellulose or polyethylene film was prepared from the following components:

| | Parts |
|---|---|
| 80% solution of the oil-soluble chromogen-bonded-polymer described in Example 4 | 10 |
| Polyamide condensate | 30 |
| Butanol | 30 |
| Toluene | 30 |
| Total | 100 |

The above chromogen-bonded-polymer, composed of a self-crosslinkabe resin, attached many of the pigment molecules to form pigment particles. Therefore, the colored prints obtained by a gravure printing had excellent properties against rub and solvents.

EXAMPLE 45

| | Parts |
|---|---|
| The chromogen-bonded-polymer described in Example 12 | 27.9 |
| Barium sulfate | 13.1 |
| Printing ink varnish | 59.0 |
| Total | 100.0 |

Offset printing ink was prepared from the formula above by mixing them with 3-rolled mill.

The above chromogen-bonded polymer, composed of a self-crosslinkable resin, attached many of the pigment molecules. In addition, since it had an organophilic group in its structure, the color was dispersed well into a printing ink varnish. The thus obtained printing ink had excellent tinting strength and printability. Color prints were obtained by offset printing which had outstanding rub-fastness, and other advantageous physical and chemical properties.

EXAMPLE 46

An oil-in-water type emulsion printing ink was obtained from the following composition:

| | Parts |
|---|---|
| 5% solution of chromogen-bonded-polymer described in Example 6 | 35 |
| Polyethyleneglycol alkylether | 1 |
| Xylol | 64 |
| Total | 100 |

This emulsion was printed on a paper by gravure printing with the result that a beautiful print was obtained after heating to dryness. The color was firmly fixed on a paper fiber by the reaction of it with the fiber whereby the paper so printed had excellent properties against bleeding, rubbing and solvents.

EXAMPLE 47

A water base printing ink was obtained by thoroughly mixing the following components in a colloid mill:

| | Parts |
|---|---|
| 5% chromogogen-bonded-polymer solution described in Example 7 | 35 |
| Gum arabic | 50 |
| Water | 15 |
| Total | 100 |

The printing ink was printed on a paper to obtain a wallpaper by flexographic printing. After heating the paper to dryness, the color was firmly fixed on the paper fiber because of the reaction of it with the fiber whereby the paper so printed had excellent properties against bleeding, rubbing and solvents.

EXAMPLE 48

5% xylene cellosolveacetate methylethylketone (4:3:3) solution of the chromogen-bonded-polymer described in Example 10 was sprayed uniformly on a surface of a leather by a high pressure spray gun and the leather was dried in an open air to obtain a colored leather.

EXAMPLE 49

| | Parts |
|---|---|
| 8% chromogen-bonded-polymer solution described in Example 3 | 35.0 |
| Polyethyleneglycol alkylether | 1.0 |
| Mineral turpene | 64.0 |
| Total | 100.0 |

The above components were mixed together and strongly stirred in a homogenized mixer to obtain an oil-in-water type emulsion printing paste.

The paste was printed on de-fatted leather. After the drying of the leather in open air at 40° C., a printed leather was obtained.

EXAMPLE 50

10 parts of the chromogen-bonded-polymer prepared according to the method described in Example 5 were dissolved in 200 parts of water.

De-fatted leather was dipped in the latter solution at room temperature for 5 minutes. After drying the leather at 40° C., a dip-dyed leather having excellent fastness was obtained which was superior in properties to one obtained from a conventional method and had much gross with only a calender-treating. According to this example, the dyeing temperature may be relatively low compared to that of a conventional method, whereby it is much more economical.

EXAMPLE 51

Chromogen-bonded-polymer prepared according to the method described in Example 16, about twice the weight of glycerine and well-known suitable additives were mixed together to obtain a stamping ink.

Printed patterns made with this ink on paper or cloth by well-known printing methods had excellent properties with regard to physical and chemical resistance.

EXAMPLE 52

A mixture was made of the following components:

| | Parts |
|---|---|
| The oil soluble chromogen-bonded-polymer powder prepared according to the method described in Example 12 | 80 |
| Linseed oil | 20 |
| Total | 100 |

The above components were blended and tubed to obtain an oil paint. This paint had excellent dispersibility, concentration and gloss. Pictures painted with this paint had bright hues, and strong rub-fastness.

EXAMPLE 53

| | Parts |
|---|---|
| 10% solution of the chromogen-bonded-polymer prepared according to the method described in Example 17 | 50 |
| 30% aqueous gum arabic solution | 30 |
| Glycerine | 20 |
| Total | 100 |

The above components were mixed together to obtain a water paint. Painting was carried out with the paint, the paint being suitably diluted with water. Resulting pictures were excellent in rub-fastness, because the chromogen-bonded-polymer reacted with and fixed to cellulose in the paper. The pictures had bright hues, and excellent chemical resistance.

EXAMPLE 54

10 parts of oil soluble chromogen-bonded-polymer prepared according to the method described in Example 4, 30 parts of alkyd resin, 35 parts of butanol and 25 parts of toluol were blended together in a vessel to obtain a printing ink for hardboard printing.

The printing ink was printed on the well-base coated hardboard by a gravure-offset printing machine. The board was then dried in open air and heated by hot air to obtain a colored hardboard having excellent properties as to coloring and strong rub-fastness.

According to the conventional method of hardboard printing, a clear resin top-coating over the printed surface had been required. However, according to this method of printing, prints having an excellent rub-fastness were obtained without the need for the clear resin top-coat treatment.

EXAMPLE 55

In an aqueous solution of chromogen-bonded-polymer described in Example 14, woodchip was dipped and then dried to obtain colored chip having strong fastness for chemical resistance.

EXAMPLE 56

A wooden product was uniformly sprayed with the xylene-after cellosolve-methyl ethyl ketone (2:1:1) solution of the chromogen-bonded-polymer prepared according to the method described in Example 8 using a high-pressure spray-gun.

After drying the wooden product in open air, a colored wooden product was obtained, having excellent color fastness.

EXAMPLE 57

Polyvinyl acetate emulsion was prepared by polymerizing the following components:

| | Parts |
|---|---|
| 5% aqueous solution of polyvinyl alcohol | 200 |
| Vinyl acetate | 100 |
| Potassium persulfate | 0.7 |
| Dimethylphthalate | 10 |
| Total | 310.7 |

9 parts of titanium dioxide, 10 parts of water and 5 parts of 5% aqueous solution of sodium phosphate were mixed together with the polyvinylacetate emulsion prepared above to obtain a white polyvinylacetate emulsion polymerization paint. After adding thereto a chromogen-bonded-polymer prepared according to the method described in Example 3, the emulsion paint obtained was applied to the wooden product to obtain a beautifully colored wooden product having an excellent durability.

EXAMPLE 58

6 parts of casein and 10 parts of starch were mixed together with 30 parts of water. After permitting the starch and the casein to swell, 20 parts of 5% aqueous solution of sodium hydroxide was mixed therewith and heated at 60° C. to dissolve the casein and starch to produce a clear solution.

50 parts of 3% aqueous solution of sodium oleate were mixed, then added to the starch-casein solution to prepare a concentrated solution of soluble casein paint. The chromogen-bonded-polymer prepared according to the method described in Example 7 was mixed with this paint and the mixture was stirred.

Woodchip was painted wtih the resulting colored paint, and air-dried to obtain a colored woodchip having excellent durability.

EXAMPLE 59

1 part of chromogen-bonded-polymer prepared according to the method described in Example 11 was dissolved in 6 parts of ethyl cellosolve and mixed with 17 parts of 40% xylene-methyl-ethyl ketone (1:1) mixed solution of thermosetting acrylic resin nad 3 parts of 50% cellosolve acetate solution of epoxy resin.

After being diluted to a suitable viscosity, the resulting paint was sprayed on steel plate. After heating the sprayed paint at 150° C. for 30 minutes, a transparent colored steel plate was obtained having excellent fastness for mechanical tests.

EXAMPLE 60

A mixture composed of 300 parts of 38% formalin and 100 parts of urea was boiled for 4 hours at 40 to 45° C. After evaporating off the moisture from the mixture, the mixture was distilled under reduced pressure to obtain a transparent and sticky condensate as distillation residue. Thereafter, the condensate was dissolved in an alcohol and the thus-prepared resin solution was applied over boards.

A top board was dipped in the resin-solution in which there was dissolved a chromogen-bonded-polymer prepared according to the method described in Example 1.

After air-drying the dipped board, discrete wooden boars were laminated and pressed thereon at 130° C. under a pressure of 1,500 lbs./in.$^2$ whereby a colored laminated board having excellent properties was thus obtained.

EXAMPLE 61

90 parts of rubber-latex which had been adjusted to 25% rubber content by the addition of water and 10 parts of the colored latex prepared according to the method described in Example 3 were mixed homogeneously to obtain a colored rubber latex.

By coagulating and after-treating by known methods, there was obtained a beautifully colored rubber.

According to this method, the crosslinking of the crude rubber was so much accelerated by the heat of vulcanization that the resulting rubber was free from the deterioration and oxidation which often results from known methods of coloring.

EXAMPLE 62

The following components were blended together:

| | Part |
|---|---|
| Chromogen-bonded-polymer prepared according to the method described in Example 13 | 1 |
| Process oil | 1 |

and then mixed together with 100 parts of crude rubber by a 2-roll mill to obtain a beautiful colored rubber sheet.

According to this method, the rubber was exothermed to be at 100 to 130° C. during the rolling process. The operation time required was about 15 minutes, whereby the crosslinking of the rubber was much accelerated. The rapid crosslinking served to reinforce the rubber and also to eliminate its deterioration or oxidation.

EXAMPLE 63

95 parts of xylene-butylacetate (1:1) were mixed with 5 parts of chromogen-bonded-polymer prepared according to the method described in Example 9 to obtain a colored solution.

With a high pressure spray-gun, the solution was sprayed uniformly on the surface of a well-dried concrete wall and the wall was dried in open air to obtain a colored concrete wall.

According to this method of coloring, the surface of concrete wall was covered with a beautiful color which had an excellent covering power. Thus, the coloring solution obtained with the method of this example is advantageously utilizable for coloring materials consisting of cement, slate, mortar, etc.

EXAMPLE 64

The following mixture was prepared:

| | Parts |
|---|---|
| Methylmethacrylate | 150 |
| Azobisisobutylonitrile | 0.4 |
| Chromogen - bonded - polymer powder prepared according to the method described in Example 18 | 0.1 |
| Total | 150.5 |

The chromogen-bonded-polymer powder and azobisisobutylonitrile were dissolved in methylmethacrylate. After heating at 80° C. for 10 minutes, the solution was cooled and then filtered.

The thus-obtained syrupy solution was poured between two glass plates which were disposed in parallel, and held in a waterbath at 50° C. in order to polymerize the monomer between the plates to produce a colored polymethylmethacrylate plate.

EXAMPLE 65

The following mixture was made:

| | Parts |
|---|---|
| Polymethylmethacrylate | 150 |
| Chromogen-bonded-polymer powder prepared according to the method described in Example 18 | 0.1 |
| Total | 150.1 |

The mixture was well mixed by tumbling and a molded polymethylmethacrylate product uniformly colored was obtained by feeding the mixture into a pressurized molding machine.

EXAMPLE 66

1000 parts of fatty acid and 1 part of chromogen-bonded-polymer prepared according to the method described in Example 15 were mixed together.

According to the conventional process for making soap, the mixture was saponified, salted out, cooled and cut to prepare the colored soap.

EXAMPLE 67

2 parts of chromogen-bonded-polymer prepared according to the method described in Example 18 were dissolved in 3 parts of benzyl alcohol, and well known suitable additives were mixed together therewith to obtain a ball-point pen ink.

In a known ball-point pen inks, crystals of dye form and grow after a long storage period. However, in the ink made by this example, such phenomena did not occur. Written material written by this ink did not bleed in oils and fats which is an advantageous property for ball-point pen ink.

While there have been described what are considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

EXAMPLE 68

A quantity of 4 parts of 5% aqueous solution of chromogen-bonded-polymer, prepared according to the method described in Example 20, was homogeneously mixed with 99 parts of 20% aqueous solution of sodium alkylbenzenesulfonate. This solution was then dried with a spray drier to obtain the blue colored detergent powder.

EXAMPLE 69

A clear solution of the chromogen-bonded-polymer, prepared according to the method described in Example 21, and the well-known additive (ethyleneglycol) was provided into a felt pen type fountain pen. This water type felt pen ink was also available for a nylon filament pen type fountain pen.

EXAMPLE 70

A white cotton cloth was dipped in a dyeing bath consisting of the following components:

| | Parts |
|---|---|
| 2% acidic aqueous solution of the chromogen-bonded-polymer prepared according to the method described in Example 22 containing acetic acid | 98 |
| N,N,N',N'-tetraglycidyl hexamethylenediamine diacetic acid salt | 0.5 |
| Water | 1.5 |
| Total | 100.0 |

After dipping, the dipped cloth was put into a 0.3% alkaline aqueous solution of sodium hydroxide. After this treatment, a colored cloth was obtained having excellent properties for washing and crocking.

EXAMPLE 71

A quantity of 4 parts of the chromogen-bonded-polymer prepared according to the method described in Example 23 was added to 20 parts of a 20% aqueous solution of ammonium hydroxide and diluted with water to 100 parts. This solution was then mixed with 4 parts of 50% aqueous solution of hexamethylmethylolmelamine and 20 parts of a latex (40% of solid content) copolymerized ethylacrylate-styrene-N-methylolacrylamide (80:18:2 percent by weight). The above mixture was sprayed on a glass plate and cured at 150° C. for 20 minutes to obtain a bluish colored glass plate.

EXAMPLE 72

A mixture consisting of the following components:

| | Parts |
|---|---|
| Latex of the chromogen-bonded-polymer prepared according to the method described in Example 24 | 90 |
| Hexamethylenediamine | 2 |
| Ethyleneglycoldiglycidylether | 1 |
| Water | 7 |
| Total | 100 |

was stirred with a mixer.

A random-web consisting of polyester, acetate rayon and viscose staple-fiber was dipped in a bath of the above mixture containing the chromogen-bonded-polymer latex.

The dipped web was pasted through a mangle and dried at 130° C. for 10 minutes to obtain a colored non-woven fabric having excellent properties.

EXAMPLE 73

The following components were mixed together:

| | Parts |
|---|---|
| 5% solution of the chromogen-bonded-polymer prepared according to the method described in Example 25 | 40 |
| Glyoxal | 0.5 |
| Water | 59.5 |
| Total | 100.0 |

A white cotton cloth was dipped in the bath of the above solution, passed through a mangle, dried at 60° C. and cured at 130° C. for 5 minutes to obtain a slightly bluish cloth having good properties.

EXAMPLE 74

The following components were mixed together:

| | Parts |
|---|---|
| 5% solution of the chromogen-bonded-polymer prepared according to the method described in Example 26 | 50 |
| Hexamethylmethylolmelamine | 1 |
| Ammonium tartrate | 1 |
| Water | 48 |
| Total | 100 |

A leather was dipped in the above solution at room temperature for 3 minutes. After drying at 40° C., a dip-dyed leather was ironed for 2 minutes. A colored leather having an excellent fastness was obtained.

EXAMPLE 75

A quantity of 14 parts of 4,4',4'$_2$-triamino copper phthalocyanine blue hydrochloride paste (the converted weight as the dried solid) was diazotized and stabilized using triethanolamine dodecylbenzene sulfonate according to the method described in Example 8. The stabilized diazonium salt was dispersed in water and the resulting dispersion was made up to 320 parts by the adding of water thereto. Thereafter, 31.5 parts of methyl methacrylate were added.

The polymerization was carried out according to the method described in Example 8. After polymerization, the precipitated chromogen-bonded-polymer was filtered, washed with 300 parts of water and 200 parts of methyl alcohol, and then dried.

After such drying, 10 parts of the chromogen-bonded-polymer was dissolved in 90 parts of methyl ethyl ketone. After filtration, the filtrate, i.e., the methyl ethyl ketone solution of the chromogen-bonded-polymer was poured into 100 parts of methyl alcohol with stirring and 500 parts of water were further added thereto to precipitate the chromogen-bonded-polymer. The precipitated chromogen-bonded-polymer was removed by filtration, washed with 100 parts of water and 50 parts of methyl alcohol, dried, and pulverized to obtain the non-reactive chromogen-bonded-polymer powder.

This chromogen-bonded-polymer so obtained was found to be useful as a printing ink, a paint and a coloring agent for plastics and synthetic fibers. As the coloring agent for the plastics and fibers, polymethyl methacrylate was colored by dry blending, casting and spraying methods; unsaturated polyester and epoxy resins were colored by casting and spraying methods, acrylonitrile-butadiene-styrene copolymer and polystryrene were colored by dry blending and spraying methods and polyvinyl chloride fibers were colored by dope dyeing method.

According to the method described in this example, the chromogen-bonded-polymer having the characteristic radicals indicated in the sixth column of the below set forth Table I–A was respectively obtained by using each quantity of the reactants listed in the table.

TABLE I–A

| No. | Triamino metal phthalocyanine hydrochloride: Compound | Triamino metal phthalocyanine hydrochloride: Weight parts | Weight parts of 35% aqueous solution of HCl | Weight parts of $NaNO_2$ | Stabilizer: Compound | Stabilizer: Weight parts | Addition-polymerizable monomer: Compound | Addition-polymerizable monomer: Weight parts | Characteristic radicals introduced to the chromogen-bonded-polymer |
|---|---|---|---|---|---|---|---|---|---|
| 1 | 4.4'.4"-triamino copper phthalocyanine blue hydrochloride. | 14 | 103 | 4.2 | Triethanolamine dodecyl benzene sulfonate. | 31.9 | Ethyl methacrylate. | 45 | Ethyl ester. |
| 2 | do | 14 | 103 | 4.2 | do | 31.9 | Ethyl acrylate | 45 | Do. |
| 3 | do | 14 | 103 | 4.2 | do | 31.9 | Nimethyl itaconate. | 45 | Methyl ester. |
| 4 | do | 14 | 103 | 4.2 | do | 31.9 | Styrene | 90 | Phenyl. |
| 5 | do | 14 | 103 | 4.2 | do | 31.9 | Isoprene | 60 | Vinylene. |
| 6 | do | 14 | 103 | 4.2 | do | 31.9 | Methyl methacrylate.<br>Acrylonitrile | 31.5<br>13.5 | Methyl ester.<br>Nitrile. |
| 7 | do | 14 | 103 | 4.2 | β Naphthalene-thiol. | 12 | Methyl methacrylate. | 31.5 | Methyl ester. |
| 8 | Triamino copper phthalocyanine blue hydrochloride obtained by reducing trinitro copper phthalo, cyanine blue prepared by using 4-nitro phthalic anhydride, 3-nitrophthalic anhydride and phthalic anhydride (molar ratio 2:1:1). | 14 | 103 | 4.2 | Triethanolamine dodecyl benzene sulfonate. | 31.9 | do | 31.5 | Do. |
| 9 | Triamino copper phthalocyanine blue hydrochloride obtained by reducing trinitro copper phthalocyanine blue prepared by using nitro phthalimide obtained by nitrating on phthalimide, and phthalimide (molar ratio 3:1). | 14 | 103 | 4.2 | do | 31.9 | do | 31.5 | Do. |
| 10 | Triamino copper phthalocyanine blue hydrochloride obtained by reducing trinitro copper phthalocyanine blue prepared by using nitro phthalic anhydride, obtained by nitrating on phthalic anhyride, and phthalic anhydride (molar ratio 3:1). | 14 | 103 | 4.2 | do | 31.9 | do | 31.5 | Do. |
| 11 | Triamino copper phthalocyanine blue hydrochloride obtained by reducing trinitro copper phthalocyanine blue prepared by using nitro phthalamide, obtained by nitrating on phthalamide, and phthalamide (molar ratio 3:1). | 14 | 103 | 4.2 | do | 31.9 | do | 31.5 | Do. |
| 12 | Triamino copper phthalocyanine blue hydrochloride obtained by reducing trinitro copper phthalocyanine blue prepared by using nitro phthalonitrile, obtained by nitrating on phthalonitrile, and phthalonitrile (molar ratio 3:1). | 14 | 103 | 4.2 | do | 31.9 | do | 31.5 | Do. |
| 13 | 4.4'.4"-triamino-5.5'.5".5'"-tetrachloro copper phthalocyanine hydrochloride. | 10 | 100 | 2.5 | do | 18.7 | do | 30 | Do. |
| 14 | Triamino copper phthalocyanine blue hydrochloride obtained by introducing amino radicals into copper phthalocyanine blue by post-amination using hydroxyl amine. | 14 | 103 | 4.2 | do | 31.9 | do | 31.5 | Do. |

TABLE I-A—Continued

| No. | Triamino metal phthalocyanine hydrochloride: Compound | Weight parts | Weight parts of 35% aqueous solution of HCl | Weight parts of $NaNO_2$ | Stabilizer: Compound | Weight parts | Addition-polymerizable monomer: Compound | Weight parts | Characteristic radicals introduced to the chromogen-bonded-polymer |
|---|---|---|---|---|---|---|---|---|---|
| 15 | do | 14 | 103 | 4.2 | do | 31.9 | Ethyl methacrylate. | 45 | Ethyl ester. |
| 16 | do | 14 | 103 | 4.2 | do | 31.9 | Ethyl acrylate | 45 | Do. |
| 17 | 4.4'.4''-triamino cobalt phthalocyanine hydrochloride. | 14 | 103 | 4.2 | do | 31.9 | Methyl methacrylate. | 31.5 | Methyl ester. |
| 18 | do | 14 | 103 | 4.2 | do | 31.9 | Ethyl methacrylate. | 31.5 | Ethyl ester. |
| 19 | Triamino cobalt phthalocyanine hydrochloride obtained by reducing trinitro cobalt phthalocyanine prepared by using nitro phthalic anhydride, obtained by nitrating on phthalic anhydride, and phthalic anhydride (molar ratio 3:1). | 14 | 103 | 4.2 | do | 31.9 | Methyl methacrylate. | 31.5 | Methyl ester. |
| 20 | Triamino cobalt phthalocyanine hydrochloride obtained by introducing amino radicals into cobalt phthalocyanine by post-amination using hydroxyl amine. | 14 | 103 | 4.2 | do | 31.9 | do | 31.5 | Do. |
| 21 | 4.4'.4''-triamino nickel phthalocyanine hydrochloride. | 14 | 103 | 4.2 | do | 31.9 | do | 31.5 | Do. |
| 22 | Triamino nickel phthalocyanine hydrochloride obtained by introducing amino radicals into nickel phthalocyanine by post-amination using hydroxyl amine. | 14 | 103 | 4.2 | do | 31.9 | do | 31.5 | Do. |

EXAMPLE 76

A quantity of 14 parts of 4.4'.4''-triamino copper phthalocyanine blue hydrochloride paste (the converted weight as the dried solid) was diazotized and stabilized using triethanolamine dodecylbenzene sulfonate according to the method described in Example 8. The stabilized diazonium salt was dispersed in water and the resulting dispersion was made up to 440 parts by the adding of water thereto. Thereafter, 45 parts of acrylonitrile were added.

The polymerization was carried out according to the method described in Example 8. After polymerization, the precipitated chromogen-bonded-polymer was removed by filtration, washed with 500 parts of water and 100 parts of methyl alcohol, and then dried. After drying, the chromogen-bonded-polymer was pulverized to obtain the non-reactive chromgen-bonded-polymer powder.

This chromogen-bonded-polymer was found to be useful as a dope-coloring agent for polyacrylonitrile fibers and acrylonitrile-copolymer fibers.

According to the method described in this example, the chromogen-bonded-polymer having the characteristic radicals indicated in the sixth column of the below set forth Table II–A was respectively obtained by using each quantity of the reactants listed in the table.

TABLE II-A

| No. | Triamino metal phthalocyanine hydrochloride: Compound | Weight parts | Weight parts of 35% aqueous solution of HCl | Weight parts of $NaNO_2$ | Stabilizer: Compound | Weight parts | Addition-polymerizable monomer: Compound | Weight parts | Characteristic radicals introduced to the chromogen-bonded-polymer |
|---|---|---|---|---|---|---|---|---|---|
| 1 | 4.4'.4''-triamino copper phthalocyanine blue hydrochloride. | 14 | 103 | 4.2 | Triethanolamine dodecyl benzene. sulfonate. | 31.9 | Methacrylonitrile | 45 | Nitrile. |
| 2 | do | 14 | 103 | 4.2 | do | 31.9 | Acrylonitrile<br>Ethyl methacrylate. | 33.7<br>11.3 | Nitrile.<br>Ethyl ester. |
| 3 | do | 14 | 103 | 4.2 | do | 31.9 | Acrylonitrile<br>Ethyl acrylate | 27<br>18 | Nitrile.<br>Ethyl ester. |
| 4 | do | 14 | 103 | 4.2 | do | 31.9 | Acrylonitrile<br>N.N-dimethyl-aminoethyl-methacrylate. | 39.2<br>16.8 | Nitrile.<br>N.N-dimethy-amino ethyl ester. |
| 5 | Triamino copper phthalocyanine blue hydrochloride obtained by reducing trinitro copper phthalocyanine blue prepared by using nitrophthalic anhydride, obtained by nitrating on phthalic anhydride, and phthalic anhydride (molar ratio 3:1). | 14 | 103 | 4.2 | do | 31.9 | Acrylonitrile | 45 | Nitrile. |
| 6 | Triamino copper phthalocyanine blue hydrochloride obtained by reducing trinitro copper phthalocyanine blue prepared by using nitro phthalonitrile, obtained by nitrating on phthalonitrile, and phthalonitrile (molar ratio 3:1). | 14 | 103 | 4.2 | do | 31.9 | do | 45 | Do. |
| 7 | Triamino copper phthalocyanine blue hydrochloride obtained by introducing amino radicals into copper phthalocyanine blue by post-amination using hydroxylamine. | 14 | 103 | 4.2 | do | 31.9 | do | 45 | Do. |
| 8 | 4.4'.4''-triamino cobalt phthalocyanine hydrochloride. | 14 | 103 | 4.2 | do | 31.9 | do | 45 | Do. |
| 9 | Triamino cobalt phthalocyanine hydrochloride obtained by introducing amino radicals into cobalt phthalocyanine by post-amination using hydroxyl-amine. | 14 | 103 | 4.2 | do | 31.9 | do | 45 | Do. |
| 10 | 4.4'.4''-triamino nickel phthalocyanine hydrochloride. | 14 | 103 | 4.2 | do | 31.9 | do | 45 | Do. |
| 11 | Triamino nickel phthalocyanine hydrochloride obtained by introducing amino radicals into nickel phthalocyanine by post-amination using hydroxylamine. | 14 | 103 | 4.2 | do | 31.9 | do | 45 | Do. |

EXAMPLE 77

A quantity of 14 parts of 4.4'.4''-triamino copper phthalocyanine blue hydrochloride paste (the converted weight as the dried solid) was diazotized and stabilized using triethanolamine dodecylbenzene sulfonate according to the method described in Example 8.

The stabilized diazonium salt was dispersed in water and the resulting dispersion was made up to 440 parts by adding water. Thereafter, 48.3 parts of ethyl methacrylate, 16.1 parts of butyl methacrylate, 3.5 parts of ethyleneglycol monomethacrylate and 2.1 parts of glycidyl methacrylate were added.

The polymerization was carried out according to the method described in Example 8. After polymerization, the precipitated chromogen-bonded-polymer was removed by filtration and washed with 500 parts of water and 100 parts of methyl alcohol.

After drying, the chromogen-bonded-polymer powder was dissolved in methyl ethyl ketone, filtered, precipitated in methyl alcohol and water, washed with water and methyl alcohol, dried, and pulverized according to the method described in Example 75 to obtain the active-reactive chromogen-bonded-polymer having epoxy and hydroxyl radicals.

This chromogen-bonded-polymer was found to be useful as a printing ink and paint with suitable thermoplastic resins, reactive thermoplastic resins, cross-linking agents or other vehicles for papers, textiles, leathers, wooden products, hardboards, glass plates, metal foils, metal plates, plastics and the like.

According to the method described in this example, the chromogen-bonded-polymer having the characteristic radicals indicated in the sixth column of the below set forth Table III-A was respectively obtained by using each quantity of the reactants listed in the table.

TABLE III-A

| No. | Triamino metal phthalocyanine hydrochloride: Compound | Weight parts | Weight parts of 35% aqueous solution of HCl | Weight parts of $NaNO_2$ | Stabilizer: Compound | Weight parts | Addition-polymerizable monomer: Compound | Weight parts | Characteristic radicals introduced to the chromogen-bonded-polymer |
|---|---|---|---|---|---|---|---|---|---|
| 1 | 4.4'.4''-triamino copper phthalocyanine blue hydrochloride. | 14 | 103 | 4.2 | Triethanolamine dodecyl benzene sulfonate. | 31.9 | Ethyl methacrylate. | 32.2 | Epoxy. |
| | | | | | | | Butyl methacrylate. | 32.2 | |
| | | | | | | | Ethyleneglycol mono-methacrylate. | 3.5 | (Hydroxyl). |
| | | | | | | | Glycidyl acrylate. | 2.1 | |
| 2 | do | 14 | 103 | 4.2 | do | 31.9 | Ethyl methacrylate. | 64.4 | Chlorohydrine. |
| | | | | | | | Ethyleneglycol mono-methacrylete. | 3.5 | (Hydroxyl). |
| | | | | | | | γ-Chloro-β-hydroxy-η-propyl methacrylate. | 2.1 | |
| 3 | do | 14 | 103 | 4.2 | do | 31.9 | Butyl methacrylate. | 64.4 | Methyl-methylol. |
| | | | | | | | Ethyleneglycol mono-methacrylate. | 3.5 | |
| | | | | | | | N-methylmethylolacrylamide | 2.1 | (Hydroxyl). |
| 4 | do | 14 | 103 | 4.2 | do | 31.9 | Ethyl methacrylate. | 16.1 | Epoxy. |
| | | | | | | | Butyl methacrylate. | 48.3 | |
| | | | | | | | Propyleneglycol mono-methacrylate. | 3.5 | (Hydroxyl). |
| | | | | | | | Glycidyl methacrylate. | 2.1 | |
| 5 | do | 14 | 103 | 4.2 | do | 31.9 | Ethyl methacrylate. | 48.3 | Epoxy. |
| | | | | | | | Butyl acrylate | 16.1 | |
| | | | | | | | Acrylic acid | 3.5 | (Carboxyl). |
| | | | | | | | Glycidyl methacrylate. | 2.1 | |
| 6 | do | 14 | 103 | 4.2 | do | 31.9 | Methylmethacrylate. | 48.3 | Epoxy. |
| | | | | | | | Butyl methacrylate. | 16.1 | |
| | | | | | | | Acrylamide | 3.5 | (Amide). |
| | | | | | | | Glycidyl methacrylate. | 2.1 | |
| 7 | 4.4'.4''-triamino cobalt phthalocyanine hydrochloride. | 14 | 103 | 4.2 | do | 31.9 | Ethyl methacrylate. | 48.3 | Epoxy. |
| | | | | | | | Butyl methacrylate. | 16.1 | |
| | | | | | | | Ethyleneglycol mono-methacrylate. | 3.5 | (Hydroxyl). |
| | | | | | | | Glycidyl methacrylate. | 2.1 | |
| 8 | 4.4'.4''-triamino nickel phthalocyanine hydrochloride. | 14 | 103 | 4.2 | do | 31.9 | Ethyl methacrylate. | 48.3 | Epoxy. |
| | | | | | | | Butyl methacrylate. | 16.1 | |
| | | | | | | | Ethyleneglycol mono-methacrylate. | 3.5 | (Hydroxyl). |
| | | | | | | | Glycidyl methacrylate. | 2.1 | |

EXAMPLE 78

A quantity of 14 parts of 4.4′4″-triamino copper phthalocyanine blue hydrochloride paste (the converted weight as the dried solid) was diazotized and stabilized using triethanolamine dodecylbenzene sulfonate according to the method described in Example 8.

The stabilized diazonium salt was dispersed in water and the resulting dispersion was made up to 440 parts by adding water thereto. Thereafter, 49.9 parts of ethyl methacrylate, 16.6 parts of butyl methacrylate and 3.5 parts of ethyleneglycol monomethacrylate were added.

The polymerization was carried out according to the method described in Example 8. After polymerization, the precipitated chromogen-bonded-polymer was filtered and washed with 500 parts of water and 100 parts of methyl alcohol.

After drying, the chromogen-bonded-polymer powder was dissolved in methyl ethyl ketone, filtered, precipitated in methyl alcohol and water, washed with water and methyl alcohol, dried and pulverized according to the method described in Example 75 to obtain the weakly-reactive chromogen-bonded-polymer having hydroxy radicals.

This chromogen-bonded-polymer was found to be useful as a printing ink and a paint with suitable thermoplastic resins, reactive thermoplastic resins, cross-linking agents, precondensates of thermosetting resins or other vehicles for paper, textiles, leathers, wooden products, hardboards, glass plates, metal foils, metal plates, plastics and the like.

According to the method described in this example, the chromogen-bonded-polymer having the characteristic radicals indicated in the sixth column of the below set forth Table IV–A was respectively obtained by using each quantity of the reactants listed in the table.

TABLE IV–A

| No. | Triamino metal phthalocyanine hydrochloride: Compound | Triamino metal phthalocyanine hydrochloride: Weight parts | Weight parts of 35% aqueous solution of HCl | Weight parts of $NaNO_2$ | Stabilizer: Compound | Stabilizer: Weight parts | Addition-polymerizable monomer: Compound | Addition-polymerizable monomer: Weight parts | Characteristic radicals introduced to the chromogen-bonded-polymer |
|---|---|---|---|---|---|---|---|---|---|
| 1 | 4.4′.4″-triamino copper phthalocyanine blue hydrochloride. | 14 | 103 | 4.2 | Triethanolamine dodecyl benzene sulfonate. | 31.9 | Ethyl methacrylate.<br>Butyl methacrylate.<br>Propyleneglycol mono-methacrylate. | 33.3<br>33.2<br>3.5 | Hydroxyl. |
| 2 | do | 14 | 103 | 4.2 | do | 31.9 | Methyl methacrylate.<br>Ethyl acrylate<br>Methacrylic acid | 49.9<br>16.6<br>3.5 | Carboxyl. |
| 3 | do | 14 | 103 | 4.2 | do | 31.9 | Butyl methacrylate.<br>Ethoxyethyl methacrylate.<br>Methacrylamide | 53.2<br>13.3<br>3.5 | Amide. |
| 4 | do | 14 | 103 | 4.2 | do | 31.9 | Ethyl methacrylate.<br>Ethyleneglycol mono-methacrylate.<br>N.N.-dimethyl-amino-ethyl methacrylate. | 63<br>3.5<br>3.5 | Hydroxyl. |
| 5 | Triamino copper phthalocyanine blue hydrochloride obtained by introducing amino radicals into copper phthalocyanine blue by post-amination using hydroxylamine. | 14 | 103 | 4.2 | do | 31.9 | Ethyl methacrylate.<br>Butyl methacrylate.<br>Ethyleneglycol mono-methacrylate. | 49.9<br>16.6<br>3.5 | Do. |
| 6 | 4.4′.4″-triamino cobalt phthalocyanine hydrochloride. | 14 | 103 | 4.2 | do | 31.9 | Ethyl methacrylate.<br>Butyl methacrylate.<br>Ethyleneglycol mono-methacrylate. | 49.9<br>16.6<br>3.5 | Do. |
| 7 | 4.4′.4″-triamino nickel phthalocyanine hydrochloride. | 14 | 103 | 4.2 | do | 31.9 | Ethyl methacrylate.<br>Butyl methacrylate.<br>Ethyleneglycol mono-methacrylate. | 49.9<br>16.6<br>3.5 | Do. |

EXAMPLE 79

A quantity of 10 parts of 4.4′.4″ - triamino copper phthalocyanine blue hydrochloride paste (the converted weight as the dried solid) was diazotized according to the method described in Example 1 and stabilized using triethanolamine dodecylbenzene sulfonate according to the method described in Example 8.

The stabilized diazonium salt was dispersed in water and the resulting dispersion was made up to 300 parts by adding water thereto. Thereafter, 10 parts of acrylamide, 15 parts of ethyleneglycol mono-methacrylate, 5 parts of ethyl acrylate and 5 parts of butyl acrylate were also added.

The polymerization was carried out according to the method described in Example 1. After polymerization, the chromogen-bonded-polymer was precipitated by adding methyl alcohol, filtered off, washed with methyl alcohol, and dried according to the method described in Example 1.

Then, the thus obtained chromogen-bonded-polymer was methylolated using a 37% aqueous solution of formaldehyde according to the method described in Example 2. After methylolation, the chromogen-bonded-polymer was precipitated by adding methyl alcohol, filtered off, washed with methyl alcohol, and dried according to the method described in Example 2 to obtain the active-reactive chromogen-bonded-polymer having methylol radicals and hydroxyl radicals.

This chromogen-bonded-polymer was found to be useful as a coloring agent for paper, yarns, textiles, leathers and the like by printing, padding and spraying methods, and for water-type paints.

According to the method described in this example, the chromogen-bonded-polymer having the characteristic radicals indicated in the sixth column of the below set forth Table V-A was respectively obtained by using each quantity of the reactants listed in the table.

water were charged with stirring. Then, the above-obtained stabilized diazonium salt, 3 parts of polyethyleneglycol nonylphenyl ether and 200 parts of water were added thereto with stirring.

The polymerization was carried out at 45° C. for 1 hour, and at 65° C. for 1 hour. After polymerization, the resulting chromogen-bonded-polymer latex was cooled to room temperature and then neutralized with an aqueous solution of sodium carbonate. After filtration, the active-

TABLE V-A

| No. | Triamino metal phthalocyanine hydrochloride: Compound | Weight parts | Weight parts of 35% aqueous solution of HCl | Weight parts of $NaNO_2$ | Stabilizer: Compound | Weight parts | Addition-polymerizable monomer: Compound | Weight parts | Characteristic radicals introduced to the chromogen-bonded-polymer |
|---|---|---|---|---|---|---|---|---|---|
| 1 | 4.4'.4''-triamino copper phthalocyanine blue hydrochloride. | 10 | 74 | 3.0 | Triethanolamine dodecyl benzene sulfonate. | 22.8 | Acrylamide<br>Ethyleneglycol mono-methacrylate.<br>Acrylic acid<br>Ethyl acrylate<br>Butyl acrylate<br>(Further methylolating.) | 10<br>15<br>1.8<br>5<br>5 | Methylol.<br>(Hydroxyl, carboxyl.) |
| 2 | Triamino copper phthalocyanine blue hydrochloride obtained by introducing amino radicals into copper phthalocyanine blue by post-amination using hydroxylamine. | 10 | 74 | 3.0 | do | 22.8 | Acrylamide<br>Ethyleneglycol mono-methacrylate<br>Ethyl acrylate<br>Butyl acrylate<br>(Futher methylolating.) | 10<br>15<br>5<br>5 | Methylol.<br>(Hydroxyl.) |
| 3 | 4.4'.4''-triamino cobalt phthalocyanine hydrochloride. | 10 | 74 | 3.0 | do | 22.8 | Acrylamide<br>Ethyleneglycol mono-methacrylate.<br>Ethyl acryrate<br>Butyl acrylate<br>(Futher methylolating.) | 10<br>15<br>5<br>5 | Methylol.<br>(Hydroxyl.) |
| 4 | Triamino copper phthalocyanine hydrochloride obtained by introducing amino radicals into cobalt phthalocyanine by post-amination using hydroxylamine. | 10 | 74 | 3.0 | do | 22.8 | Acrylamide<br>Ethyleneglycol mono-methacrylate.<br>Ethyl acryrate<br>Butyl acrylate<br>(Further methylolating.) | 10<br>15<br>5<br>5 | Methylol.<br>(Hydroxyl.) |
| 5 | 4.4'.4''-triamino nickel phthalocyanine hydrochloride. | 10 | 74 | 3.0 | do | 22.8 | Acrylamide<br>Ethyleneglycol mono-methacrylate.<br>Ethyl acrylate<br>Butyl acrylate | 10<br>15<br>5<br>5 | Methylol.<br>(Hydroxyl.) |

EXAMPLE 80

A quantity of 10 parts of 4.4'.4''-triamino copper phthalocyanine blue hydrochloride paste (the converted weight as the dried solid) was diazotized and stabilized using zinc chloride according to the method described in Example 1.

Into a polymerization vessel, 5 parts of butyl acrylate 20 parts of acrylonitrile, 25 parts of glycidyl methacrylate, 6 parts of polyethyleneglycol nonylphenyl ether, 1 part of block polymer of polyethyleneglycol and polypropyleneglycol, 2 parts of dodecyl mercaptan and 50 parts of reactive chromogen-bonded-polymer latex, which had epoxy radicals in its structure, was obtained.

This chromogen-bonded-polymer was found to be useful as a coloring agent for paper, yarns, textiles, leathers and the like by printing and padding methods, and for water-type paints.

According to the method described in this example, the chromogen-bonded-polymer having the characteristic radicals indicated in the sixth column of the below set forth Table VI-A was respectively obtained by using each quantity of the reactants listed in the table.

TABLE VI-A

| No. | Triamino metal phthalocyanine hydrochloride: Compound | Weight parts | Weight parts of 35% aqueous solution of HCl | Weight parts of $NaNO^2$ | Stabilizer: Compound | Weight parts | Addition-polymerizable monomer: Compound | Weight parts | Characteristic radicals introduced to the chromogen-bonded-polymer |
|---|---|---|---|---|---|---|---|---|---|
| 1 | 4.4' .4''-triamino copper phthalocyanine blue hydrochloride. | 10 | 74 | 3.0 | Zinc chloride | 10 | Methyl methacrylate. | 50 | Methyl ester. |
| 2 | do | 10 | 74 | 3.0 | do | 10 | Ethyl acrylate<br>Butyl acrylate<br>Ethyleneglycol mono-methacrylate. | 32.5<br>15<br>2.5 | Hydroxyl. |
| 3 | Triamino copper phthalocyanine blue hydrochloride obtained by introducing amino radicals into copper phthalocyanine blue by post-amination using hydroxylamine. | 10 | 74 | 3.0 | do | 10 | Butyl acrylate<br>Acrylonitrile<br>Glydidyl methacrylate. | 5<br>20<br>25 | Epoxy. |

EXAMPLE 81

A quantity of 14 parts of 4.4′.4″-triamino copper phthalocyanine blue hydrochloride paste (the converted weight as the dried solid) was diazotized according to the method described in Example 8.

To the thus obtained aqueous solution of diazotized copper phthalocyanine blue, 14 parts of zinc chloride were added to stabilize the diazonium salt. After filtering off the precipitated stabilized diazonium salt, the resulting product was dissolved in water and the solution was made up to 560 parts by the adding of water thereto. Thereafter, 28 parts of ethyleneglycol mono-methacrylate were also added.

The polymerization was carried out according to the method described in Example 1. After polymerization, the precipitated chromogen-bonded-polymer was filtered and washed with 100 parts of acetone and then dried to obtain the weakly-reactive chromogen-bonded-polymer having hydroxyl radicals in its structure.

Then, 15 parts of the thus-obtained chromogen-bonded-polymer were dissolved in 285 parts of 98% sulfuric acid and stirred for 2 hours at 70° C. After the reaction, the sulfuric acid solution of the chromogen-bonded-polymer was poured into 300 parts of water to precipitate the chromogen-bonded-polymer. After filtering off and washing with 300 parts of water, the chromogen-bonded-polymer having sulfate radicals was obtained.

This chromogen-bonded-polymer and its salts were found to be useful as a coloring agent for soaps, detergents, cleansers and the like.

According to the method described in this example, the chromogen-bonded-polymer having the characteristic radicals indicated in the sixth column of the below set forth Table VII–A was respectively obtained by using each quantity of the reactants listed in the table.

TABLE VII-A

| No. | Triamino metal phthalocyanine hydrochloride: Compound | Triamino metal phthalocyanine hydrochloride: Weight parts | Weight parts of 35% aqueous solution of HCl | Weight parts of $NaNO_2$ | Stabilizer: Compound | Stabilizer: Weight parts | Addition-polymerizable monomer: Compound | Addition-polymerizable monomer: Weight parts | Characteristic radicals introduced to the chromogen-bonded-polymer |
|---|---|---|---|---|---|---|---|---|---|
| 1 | 4.4′.4″-triamino copper phthalocyanine blue hydrochloride. | 14 | 103 | 4.2 | Triethanolamine dodecyl benzene sulfonate. | 31.9 | N.N-dimethyl-aminoethyl methacrylate.<br>Methyl acrylate | 29.4<br>19.6 | N.N-dimethyl amino. |
| 2 | do | 14 | 103 | 4.2 | do | 31.9 | N.N-diethyl-aminoethyl methacrylate.<br>Butyl acrylate<br>Ethyl methacrylate. | 25<br>50<br>25 | N.N-diethyl-amino(electro-positive).<br>Butyl ester.<br>Ethyl ester. |
| 3 | do | 14 | 103 | 4.2 | do | 31.9 | Acrylic acid<br>Butyl acrylate<br>Ethyl methacrylate. | 20<br>50<br>30 | Carboxyl (electro-negative).<br>Butyl ester.<br>Ethyl ester. |
| 4 | Triamino copper phthalocyanine blue hydrochloride obtained by introducing amino radicals into copper phthalocyanine blue by post-amination using hydroxylamine. | 14 | 103 | 4.2 | Zinc chloride | 14 | Ethyleneglycol mono-methacrylate (further sulfating). | 28 | Sulfate. |
| 5 | 4.4′.4″-triamino cobalt phthalocyanine hydrochloride. | 14 | 103 | 4.2 | do | | Ethyleneglycol mono-methcarylate (further sulfating). | 28 | Sulfate. |

alcohol and then dried to obtain the chromogen-bonded-polymer having nitrile radicals. Then, 15 parts of the thus-obtained chromogen-bonded-polymer were dissolved in 225 parts of 84.5% sulfuric acid and stirred for 3 hours at 20–25/ C. and for 3 more hours at 50° C.

After the reaction, the sulfuric acid solution of the chromogen-bonded-polymer was poured into 2000 parts of water to precipitate the chromogen-bonded-polymer. After filtering off and washing with water and methyl alcohol, the weakly-reactive chromogen-bonded-polymer having amide radicals was obtained. Then, the thus-obtained chromogen-bonded-polymer was methylolated using 37% aqueous solution of formaldehyde according to the method described in Example 2 to obtain the active-reactive chromogen-bonded-polymer having methylol radicals in its structure.

This chromogen-bonded-polymer was found to be useful as a coloring agent for paper, yarns, textiles, leathers and the like by printing, padding and spraying methods, and for water-type paints.

Comparison of color between the chromogen-bonded-polymer derived from tri-amino copper phthalocyanine blue and that from tetra-amino copper phthalocyanine blue (1) Preparation of the chromogen-bonded-polymers Samples of hydrophilic and hydrophobic chromogen-bonded-polymers were respectively prepared by using diazonium chloride of tri- and tetra-amino copper phthalocyanine blue as an initiator for the polymerization according to the following procedures.

(A) Hydrophilic chromogen-bonded-polymers (a) methylolated copper phthalocyanine blue(tri)-bonded-polyacrylamide

EXAMPLE 82

A quantity of 14 parts of 4.4′.4″-triamino copper phthalocyanine blue hydrochloride paste (the converted weight as the dried solid) was diazotized and stabilized using triethanolamine dodecyl benzene sulfonate according to the method described in Example 76. Then, the stabilized diazonium salt was dispersed in water and the resulting dispersion was made up to 440 parts by the adding of water thereto. Thereafter, 28 parts of acrylonitrile were also added.

The polymerization was carried out according to the method described in Example 76. After polymerization, the precipitated chromogen-bonded-polymer was filtered, washed with 500 parts of water and 100 parts of methyl A quantity of 2.5 parts of tri-amino copper phthalocyanine blue was thoroughly mixed with 9.9 parts of 35% hydrochloric acid aqueous solution, and the resulting mixture was then made up to 90 parts by adding water and ice thereto. Thereafter, 0.9 parts of sodium nitrite dissolved in 10 parts of water was added to the above mixture and diazotization was carried out at 0–5° C. for 30 minutes.

After filtering the diazotized solution, 10 parts of acrylamide was added to the thus-obtained filtrate and a polymerization was carried out at 60–70° C. for 1 hour. After polymerization, the chromogen-bonded-polymer was precipitated in methyl alcohol and filtered.

Into the thus-obtained chromogen-bonded-polymer, a 5% aqueous solution of sodium carbonate and a 37% aqueous solution of formaldehyde were added, and water was further added to obtain a 5% aqueous solution of the chromogen-bonded-polymer. Thereafter, a methylolation was carried out at 65° C. for 30 minutes at a pH which was regulated to 8–9 to obtain methylolated copper phthalocyanine blue(tri)-bonded-polyacrylamide.

Methylolated copper phthalocyanine blue(tetra)-bonded-polyacrylamide

A quantity of 2.5 parts of tetra-amino copper phthalocyanine blue was thoroughly mixed with 12.9 parts of 35% hydrochloric acid aqueous solution, and the resulting mixture was made up to 90 parts by adding water and ice. Thereafter a diazotization was carried out by adding thereto 1.1 parts of sodium nitrite dissolved in 10 parts of water. Then, the polymerization and methylolation were carried out in the same manner as described above to obtain methylolated copper phthalocyanine blue(tetra)-bonded-polyacrylamide.

(B) Hydrophobic chromogen-bonded-polymers (a) and (b) copper phthalocyanine blue(tri)-bonded-polymethyl methacrylate and copper phthalocyanine blue (tetra)-bonded-polymethyl methacrylate Tri- and tetra-amino copper phthalocyanine blue were respectively diazotized according to the above mentioned methods.

Into thus-obtained diazotized solution, an aqueous emulsion containing 10 parts of methyl methacrylate, 1 part of polyethyleneglycol nonylphenyl ether (Trade name: Nonipol–400) and 20 parts of water was respectively added and a polymerization was carried out respectively at 60–70° C. for 1 hour.

After filtering, washing and drying, the copper phthalocyanine blue(tri)-bonded-polymethyl methacrylate and copper phthalocyanine blue(tetra)-bonded-polymethyl-methylacrylate were respectively obtained.

(2) Preparation of specimen (A) Padded cloth

The above obtained aqueous solutions of the methylolated copper phthalocyanine blue(tri and tetra)-bonded-polyacrylamide were respectively diluted by adding water to obtain respective 1% aqueous solutions of the products.

A polyester-cotton mixed cloth was padded in the above-obtained solution, dried in open air and cured at 140° C. for 5 minutes to obtain a pair of specimens conveniently designated Specimens No. 1 and 2 for comparison of their colors.

Specimen No. 1: Polyester-cotton mixed cloth padded with methylolated copper phthalocyanine blue (tri)-bonded-polyacrylamide Specimen No. 2: polyester-cotton mixed cloth padded with methylolated copper phthalocyanine blue (tetra)-bonded-polyacrylamide.

(B) Treated paper

Each 1 part of the above-obtained copper phthalocyanine blue(tri)-bonded-polymethyl methacrylate and copper phthalocyanine blue(tetra)-bonded-polymethyl methacrylate was respectively dissolved in 10 parts of dimethylformamide and then 10 parts of nitrocellulose type lacquer was further added to the resulting solutions. Thereafter, the thus-obtained lacquers were respectively spread on art papers with an applicator (0.076 mm.) and the resulting treated papers were dried in open air to obtain a pair of specimens conveniently designated specimens 3 and 4 for comparison of their colors.

Specimen No. 3: art-paper spread with copper phthalocyanine blue(tri)-bonded-polymethyl methacrylate Specimen No. 4: art-paper spread with copper phthalocyanine blue(tetra)-bonded-polymethyl methacrylate (C) MMA cast plate Methyl methacrylate monomers were polymerized by a conventional casting procedure to obtain a pair of specimens conveniently designated Specimens No. 5 and 6 of MMA cast plates respectively, colored with copper phthalocyanine blue(tri)-bonded-polymethyl methacrylate and copper phthalolyanine blue(tetra)-bonded-polymethyl methacrylate in a color concentration of 0.017%.

Specimen No. 5: MMA cast plate colored with copper phthalocyanine blue(tri)-bonded-polymethyl methacrylate Specimen No. 6: MMA cast plate colored with copper phthalocyanine blue(tetra)-bonded-polymethyl methacrylate (3) Inspection and measurement The above prepared specimens were observed with the naked eye to compare the difference of color between the chromogen-bonded-polymers derived from tri-amino copper phthalocyanine blue and those from tetra-amino copper phthalocyanine blue.

In addition, the reflectance of each specimen Nos. 1 to 4 was measured with a spectro-photometer (Hitachi Ltd.) to support the observation with the naked eye and the result is shown in the below-set forth table and in FIGS. 1 to 4 according to the C.I.E. system.

| Polymerization initiator | Monomer | Dominant wave length, mμ | Excitation purity, percent | Lightness, percent |
|---|---|---|---|---|
| Copper phthalocyanine blue tri-diazonium chloride. | Acrylamide (further methylolated). | 484.4 | 32.2 | 34.0 |
| Copper phthalocyanine blue tetra-diazonium chloride. | do | 486.8 | 35.9 | 34.1 |
| Copper phthalocyanine blue tri-diazonium chloride. | Methyl methacrylate. | 481.5 | 63.8 | 17.3 |
| Copper phthalocyanine blue tetra-diazonium chloride. | do | 484.1 | 58.5 | 21.0 |

Figure 5:
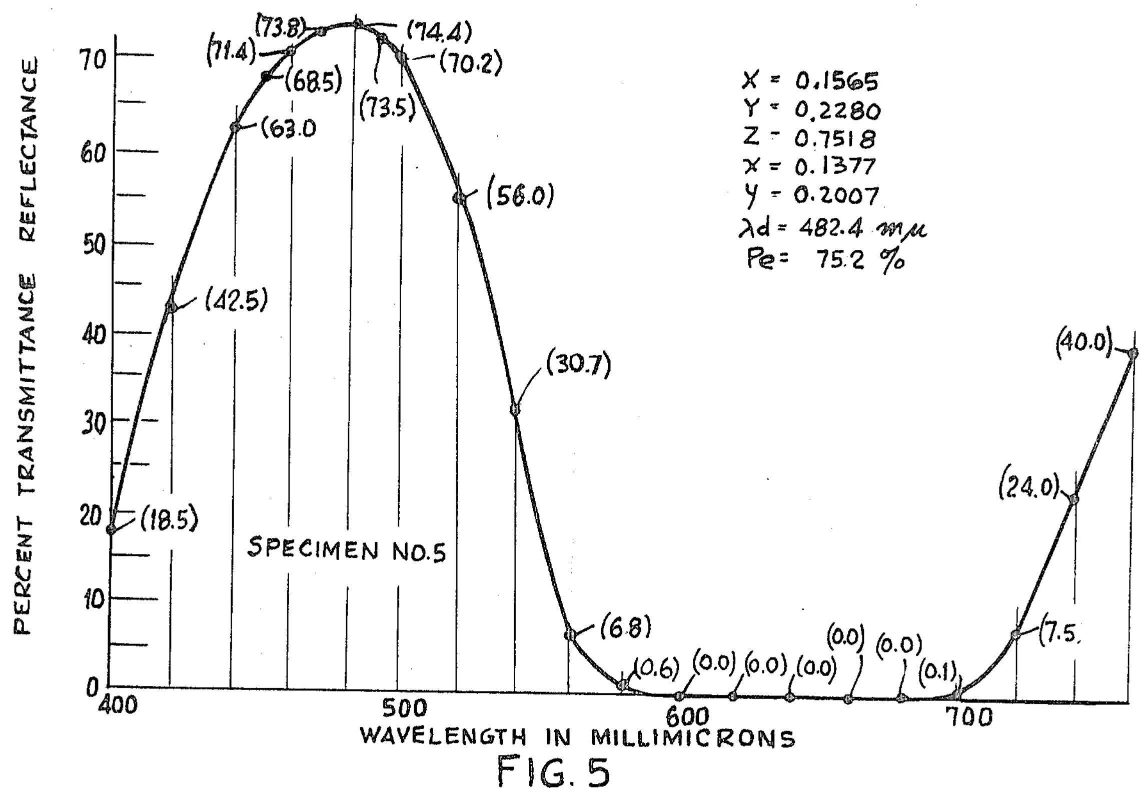
FIG. 5 is a curve similar to that of FIGS. 1 to 4 but showing the reflectance of a specimen of polymethylmethacrylate-casted plate colored with copper phthalocyanine blue (tri)-bonded-polymethyl methacrylate according to the invention.
Figure 6:
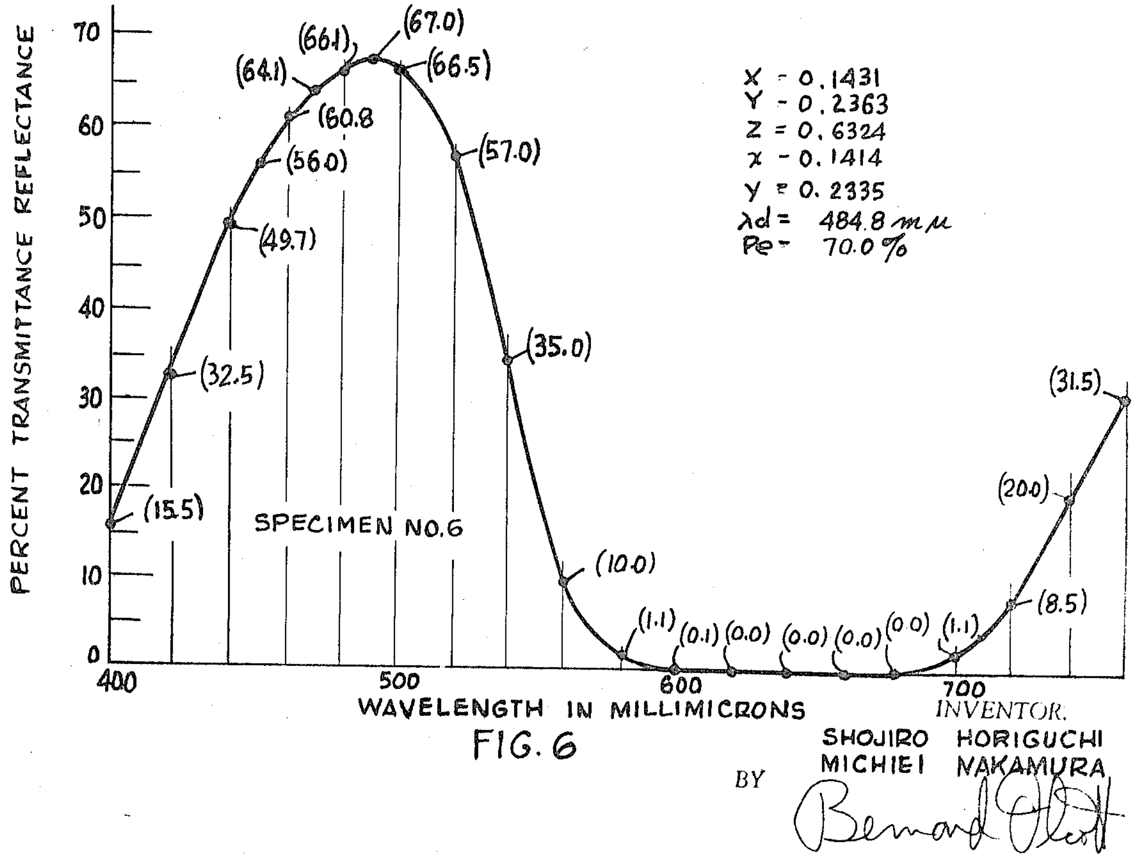
FIG. 6 is a curve similar to that of FIGS. 1 to 5 but showing the reflectance of a specimen of polymethylmethacrylate-casted plate colored with copper phthalocyanine blue (tetra)-bonded-polymethylmethacrylate.

The reflectances of specimens No. 5 and No. 6 were measured by means of a spectro-photometer (Hitachi Ltd.) to support the observation with the naked eye and the result is shown in the below mentioned table and FIGS. 5 and 6 according C.I.E. system.

| Polymerization initiator | Monomer | Dominant wave length, mμ | Excitation purity, percent | Lightness, percent |
|---|---|---|---|---|
| Copper phthalocyanine blue tri-diazonium chloride. | Methyl methacrylate. | 482.4 | 75.2 | 22.8 |
| Copper phthalocyanine blue tetra-diazonium chloride. | do | 484.8 | 70.0 | 23.7 |

(4) Conclusion

From the observation of the specimens 1 to 4 with the naked eye, it was found that color shade of the chromogen-bonded-polymers derived from tetra-amino copper phthalocyanine blue is greenish blue. This fact has been proved by the measurement with a spectro-photometer as shown in FIGS. 1 to 4, in which the dominant wavelength of the chromogen-bonded-polymers derived from tetra-amino copper phthalocyanine blue is on the longer side rather than that of those derived from tri-amino copper phthalocyanine blue in both cases of hydrophilic and hydrophobic products.

It has been found for specimens 5 and 6, as in cases of Specimens No. 1 to 4, that the color of chromogen-bonded-polymer derived from tetra-amino copper phthalocyanine is more on the greenish blue side than that from tri-amino copper phthalocyanine.

In connection with the foregoing, it has been stated that the chromogen-bonded-polymer obtained by using copper phthalocyanine blue tetra-diazonium salt (compound 4 of Table I–A) showed an extremely yellowish color shade and turned into a dull greenish blue as compared with the chromogen-bonded-polymer obtained from compounds 1, 2, and 3 of Table I–A. It has further been stated that copper phthalocyanine tetra-diazonium salt is not advantageously suitable as a starting material for the chromogen portion of the chromogen-bonded-polymer when copper phthalocyanine blue which is normally vivid in color is selected as the chromogen.

In addition to the above, it can be further stated that since the tetra-diazonium salt has in its structure four radicals which function as a polymerization initiator, a polymerization using the tetradiazonium salt would require much more attention than the tri-diazonium salt. Furthermore, since 4-nitro-phthalimide exceeds phthalimide in weight by a factor of three, tri-amino copper phthalocyanine blue can be produced at a cost which is about 20% cheaper than the cost of the production of the tetra-amino phthalocyanine blue.

While there have been described what are considered to be the preferred embodiments of the invention, it will be obvious to those skilled in the art that various changes and modifications may be made therein without departing from the invention and it is, therefore, aimed to cover all such changes and modifications as falling within the true spirit and scope of the invention.

What is claimed as new and desired to be secured by Letters Patent of the United States is:

1. A method of making a metal phthalocyanine-bonded-polymer comprising diazotizing triamino metal phthalocyanine in aqueous medium containing hydrochloric acid in a quantity which exceeds its theoretical quantity by at least 10 mols per one amino radical to produce the diazotized product comprising diazotized triamino metal phthalocyanine, stabilizing said diazotized product with a stabilizer selected from the group consisting of a first subgroup consisting of zinc chloride, stannic chloride, calcium chloride, barium chloride and aluminum chloride, a second subgroup consisting of fluoroboric acid and its salts of sodium, potassium, and ammonium, a third subgroup consisting of organic sulfonic acid, organic sulfonates, organic sulfuric acids and organic sulfates, a fourth subgroup consisting of 2-methylamino-5-sulfobenzoic acid, N-methyltaurine and sarcosine and a fifth subgroup consisting of β-naphthyl thiophenol and p-tertiary butyl thiophenol, precipitating said stabilized product, filtering said precipitated product, mixing said filtered product in water, adding an addition-polymerizable monomer to the mixture of said filtered product and polymerizing said monomer using said stabilized product as an initiator for said polymerizing to form said metal phthalocyanine-bonded-polymer.

2. A method as defined in claim 1 wherein the triamino metal phthalocyanine blue is copper phthalocyanine blue and the addition polymerizable monomer is methyl methacrylate.

3. A method as defined in claim 1 wherein the triamino metal phthalocyanine blue is copper phthalocyanine blue and the addition polymerizable monomer is acrylonitrile.

4. A method of making a copper phthalocyanine blue-bonded-polymer comprising diazotizing triamino copper phthalocyanine blue in aqueous medium containing hydrochloric acid in a quantity which exceeds its theoretical quantity by at least 10 mols per one amino radical to produce the diazotized product comprising diazotized triamino copper phthalocyanine blue, stabilizing said diazotized product with triethanol-amine dodecylbenzene sulfonate, precipitating said stabilized product, filtering said precipitated product, mixing said filtered product in water, adding acrylamide, ethyl acrylate, butyl acrylate and hydroxyethyl methacrylate to the mixture of said stabilized product, polymerizing said monomers using said stabilized product as an initiator for said polymerizing and reacting the thus-formed copper phthalocyanine blue-bonded-polymer with formaldehyde to introduce methylol radicals into the structure of said polymer.

5. A method of making a copper phthalocyanino blue-bonded-polymer comprising diazotizing triamino copper phthalocyanine blue in aqueous medium containing hydrochloric acid in a quantity which exceeds its theoretical quantity by at least 10 mols per one amino radical to produce the diazotized product comprising diazotized triamino copper phthalocyanine blue, stabilizing said diazotized product with triethanol-amine dodecylbenzene sulfonate, precipitating said stabilized product, filtering said precipitated product, mixing said filtered product in water, adding ethyl methacrylate, butyl methacrylate, glycidyl methacrylate and ethyleneglycol mono-methacrylate to the mixture of said stabilized product and polymerizing said monomers using said stabilized product as an initiator for said polymerizing to form said copper phthalocyanine blue-bonded-polymer having epoxy and hydroxyl radicals in the structure of said polymer.

6. A method as defined in claim 1 wherein said triamino metal phthalocyanine is selected from the group consisting of triamino copper phthalocyanine, triamino cobalt phthalocyanine and triamino nickel phthalocyanine.

7. A method as defined in claim 1 wherein said third subgroup of said stabilizer is selected from the group consisting of octyl sulfonic acid, decyl sulfonic acid, lauryl sulfonic acid, tetradecyl sulfonic acid, hexadecyl sulfonic acid, octadecyl sulfonic acid, butyl benzene sulfonic acid, amylbenzene sulfonic acid, hexylbenzene sulfonic acid, heptyl benzene sulfonic acid, octyl benzene sulfonic acid, nonyl benzene sulfonic acid, decyl benzene sulfonic acid, dodecyl benzene sulfonic acid, tetradecyl benzene sulfonic acid, hexadecylbenzene sulfonic acid, octadecyl benzene sulfonic acid, benzene sulfonic acid, p-chlorobenzene sulfonic acid, p-methylbenzene sulfonic acid, naphthalene-1,5-disulfonic acid, naphthalene-2,6-disulfonic acid, dinaphthylmethane sulfonic acid, octyl sulfuric acid, decyl sulfuric acid, lauryl sulfuric acid, tetradecyl sulfuric acid, hexadecyl sulfuric acid, octa-decylsulfuric acid, polyethyleneglycol sulfuric acid, polyethyleneglycol nonyl-phenyl ether sulfuric acid, polypropyleneglycol-polyethyleneglycol sulfuric acid and their salts of sodium, potassium, ammonium and triethanolamine.

8. A method as defined in claim 1 wherein said addition-polymerizable monomer is selected from the group consisting of a first subgroup consisting of addition-polymerizable monomers which have at least one active-reactive radical selected from the group consisting of methylol radical, alkyl methylol radical, sulfomethyl radical, epoxy radical, chlorohydrin radical, ethyleneimide radical, N-sulfoethyleneimide radical, ethyleneurea radical, N-sulfoethyleneurea radical, acid chloride radical, chlorotriazine radical, ketene radical, aldehyde radical, vinyl radical, isocyanate radical, acid azide radical, phenyl urethane radical, malonate-added-isocyanate radical and sodium sulfoisocyanate radical in their structures and which, after polymerization, form a polymer containing in its said structure said active-reactive radicals, a second subgroup consisting of addition-polymerizable monomers which have at least one weakly-reactive radical selected from the group consisting of hydroxy radical, mercapto radical, amino radical, imino radical, carboxyl radical, carboamide radical, sulfoamide radical, urea radical, ureido radical, urethane radical and nitrile radical in their structures and which, after polymerization, form a polymer containing in its structure said weakly-reactive radicals which are capable of linking with active-reactive radicals but incapable of crosslinking on themselves under ordinary crosslinking condition, and third subgroup consisting of addition-polymerizable monomers which have at least one non-reactive radical selected from the group consisting of alkyl ester radical, aryl ester radical, alkyl radical, alicyclic radical, aryl radical, chloride radical, alkyl-carbonyl radical, alkyl ether radical, N,N-dialkylamide radical, N-alkylimide radical, tertiary amino radical, sulfo radical and pyridine radical in their structures and which, after polymerization, form a polymer containing in its structure said non-reactive radicals which are incapable of linking with themselves or reactive radicals under ordinary crosslinking condition.

9. A method as defined in claim 8 wherein said first subgroup consists of N-methylolacrylamide,
N-methylolmethacrylamide,
N-methylolcrotonicamide,
N-methylolitaconicamide,
N,N'-dimethylolitaconicamide,
N-methylolmaleicamide,
N-methylolfumaricamide,
N-methylolvinylurea,
N,N-dimethylolvinylurea,
N-methylolpropenylurea,
N,N-dimethylolpropargylurea,
N,N'-dimethylol-4,6-diamino-2-vinyl-s-triazine,
N,N,N',N'-tetramethylol-4,6-diamino-2-vinyl-s-triazine,
N-methylmethylolacrylamide,
N-methylmethylolmethacrylamide,
N-methylmethylolcrotonicamide,
N-methylmethylolitaconicamide,
N,N'-dimethylmethylolitaconicdiamide,
N-methylmethylolmaleicamide,
N-methylmethylolfumaricamide,
N-methylmethylolvinylurea,
N,N-dimethylmethylolvinylurea,
N-methylmethylolpropenylurea,
N,N-dimethylmethylolpropenylurea,
N,N'-dimethylmethylol-4,6-diamino-2-vinyl-s-triazine,
N,N,N',N'-tetramethylmethylol-4,6-diamino-2-vinyl-s-triazine,
N-ethylmethylolacrylamide,
N-ethylmethylolmethacrylamide,
N,N'-diethylmethylolitaconicdiamide,
N-ethylmethylolitaconicmonoamide,
N-ethylmethylolvinylurea,
N,N'-diethylmethylolvinylurea,
N-ethylmethylolpropenylurea,
N,N-diethylmethylolpropenylurea,
N,N'-diethylmethylol-4,6-diamino-2-vinyl-s-triazine,
N,N,N',N'-tetraethylmethylol-4,6-diamino-2-vinyl-s-triazine,
N-propylmethylolacrylamide,
N-propylmethylolmethacrylamide,
N-propylmethylolitaconicamide,
N-propylmethylolvinylurea,
N,N'-dipropylmethylol-4,6-diamino-2-vinyl-s-triazine,
N-butylmethylolacrylamide,
N-butylmethylolmethacrylamide,
N-butylmethylolcrotonicamide,
N-butylmethylolitaconicmonoamide,
N,N'-dibutylmethylolitaconicdiamide,
N-butylmethylolmaleicamide,
N-butylmethylolfumaricamide,
N-butylmethylolvinylurea,
N,N-dibutylmethylolvinylurea,
N-butylmethylolpropenylurea,
N,N-dibutylmethylolpropenylurea,
N,N'-dibutylmethylol-4,6-diamino-2-vinyl-s-triazine,
N,N,N',N'-tetrabutylmethylol-4,6-diamino-2-vinyl-s-triazine,
N-sulfomethylacrylamide,
N-sulfomethylmethacrylamide,
N-sulfomethylcrotonicamide,
N-sulfomethylitaconicmonoamide,
N,N'-disulfomethylitaconicdiamide,
N-sulfomethylmaleicamide,
N-sulfomethylfumaricamide,
N-sulfomethylvinylurea,
N,N-disulfomethylvinylurea,
N-sulfomethylpropenylurea,
N,N-sulfomethylpropenylurea,
N,N'-disulfomethyl-4,6-diamino-2-vinyl-s-triazine,
N,N,N',N'-tetrasulfomethyl-4,6-diamino-2-vinyl-s-triazine,
acrylicazide,
methacrylicazide,
crotonicazide,
itaconicazide,
N-sulfoethylacrylimide,
N-sulfoethylmethacrylimide,
N-sulfoethylcrotonicimide,
N-sulfoethylitaconicimide,
N-sulfoethylvinylurea,
N-sulfoethylpropenylurea,
N,N'-disulfoethyl-4,6-diimino-2-vinyl-s-triazine
N-carboxyethyleneacrylimide,
N-carboxyethyleneacrylimide,
N-carboxyethylenecrotonicimide,
N-carboxyethyleneitaconicimide,
N-carboxyethylenevinylurea,
N-carboxyethylenepropenylurea,
N,N'-dicarboxyethylene-4,6-diimino-2-vinyl-s-triazine,
acrolein,
methacrolein,
crotonicaldehyde,
itaconicaldehyde,
acrylic chloride,
methacrylic chloride,
crotonic chloride,
itaconic chloride,
itaconic anhydride,
maleic anhydride,
ethyleneglycoldiacrylate,
ethyleneglycoldimethacrylate,
ethyleneglycoldiitaconate,
polyethyleneglycoldiacrylate,
polyethyleneglycoldimethacrylate,
propyleneglycoldiacrylate,
propyleneglycoldimethacrylate,
polypropyleneglycoldiacrylate,
polypropyleneglycoldimethacrylate,
propanedioldiacrylate,
propanedioldimethacrylate,
butanedioldiacrylate,
butanedioldimethacrylate,
allylacrylate,
allylmethacrylate,
N,N'-methylenebisacrylamide,
N,N'-methylenebismethacrylamide,
vinylisocyanate,
propenylisocyanate,
vinylphenylurethane,
propenylphenylurethane,
acrylethyleneimide,
methacrylethyleneimide,
crotonic ethyleneimide,
itaconic ethyleneimide,
3,5-diethyleneimino-1-vinyl-s-triazine,
glycidylacrylate,
glycidylmethacrylate,
glycidylcrotonate,
glycidylmonoitaconate,
glycidylmonomaleate,
glycidylmonofumarate,
diglycidylitaconate,
allylglycidylether,
$\beta$-hydroxy-$\gamma$-chloro-$\eta$-propylacrylate,
$\beta$-hydroxy-$\gamma$-chloro-$\eta$-propylmethacrylate,
mono-($\beta$-hydroxy-$\gamma$-chloro-$\eta$-propyl)itaconate,
di-($\beta$-hydroxy-$\gamma$-chloro-$\eta$-propyl)itaconate,
allyl-$\beta$-hydroxy-$\gamma$-chloro-$\eta$-propylether,
vinyl chloroacetate, 4,6-dichloro-2-vinyl-s-triazine, and
4-chloro-6-amino-2-vinyl-s-triazine.

10. A method as defined in claim 8 wherein said second subgroup consists of acrylic acid, methacrylic acid, crotonic acid, itaconic acid, maleic acid, fumaric acid, monomethylitaconate, monoethylitaconate, monobutylitaconate, monohexylitaconate, monomethylmaleate, monoethylmaleate, monobutylmaleate, monoethylfumarate, monobutylfumarate, acrylamide, methacrylamide, crotonicamide, itaconic diamide, itaconic monoestermonoamide, itaconic monoacid monoamide, maleic amide, maleic monoamide, fumaric amide, N-methylacrylamide, N-methylmethacrylamide, ethyleneglycolmonoacrylate, ethyleneglycolmonomethacrylate, ethyleneglycolmonocrotonate, ethyleneglycolmonoitaconate, polyethyleneglycolmonoacrylate, polyethyleneglycolmonomethacrylate, polyethyleneglycolmonoitaconate, polyethyleneglycolmonofumarate, propyleneglycolmonoacrylate, propyleneglycolmonomethacrylate, propyleneglycolmonoitaconate, polypropyleneglycolmonoacrylate, polypropyleneglycolmonomethacrylate, propanediolmonoacrylate, propandiolmonomethacrylate, butanediolmonoacrylate, butanediolmonomethacrylate, butanediolmonoitaconate, vinylphenol, aminostyrene, vinylurea, propenylurea, vinylethyleneurea, propenylethyleneurea, 4,6-diamino - 2 - vinyl-s-triazine, acrylonitrile, methacrylonitrile, crotonic nitrile and itaconic nitrile.

11. A method as defined in claim 8 wherein said third subgroup consists of methylacrylate, methylmethacrylate, methylcrotonate, dimethylitaconate, dimethylmaleate, dimethylfumarate, ethylacrylate, ethylmethacrylate, ethylcrotonate, diethylitaconate, diethylamaleate, diethylfumarate, propyl acrylate, propyl methacrylate, dipropylitaconate, butylacrylate, butylmethacrylate, butylcrotonate, dibutylitaconate, dibutylmaleate, dibutylfumarate, amylacrylate, amylmethacrylate, diamylitaconate, hexylacrylate, hexylmethacrylate, hexylitaconate, octylacrylate, octylmethacrylate, octylcrotonate, dioctylitaconate, dioctylmaleate, dioctylfumarate, laurylacrylate, laurylmethacrylate, laurylcrotonate, dilaurylitaconate, stearylacrylate, stearylmethacrylate, distearylitaconate, ethoxyethyl methacrylate, vinyl formate, vinyl acetate, vinyl propionate, vinyl stearate, vinyl oleate, vinyl benzoate, vinyl chloride, vinylidene chloride, methyl vinyl ketone, styrene, vinyl toluene, N-vinyl-ε-caprolactum, N-vinylphthalimide, butadiene, isoprene, chloroprene, chlorostyrene, nitrostyrene, methyl-α-chloroacrylate, ethyl-α-chloroacrylate, allylacetate, allylmethylether, allylbutylether, vinyl carbazol, N-vinylsuccinimide, vinyldimethylamine, vinyldiethylamine, vinylsulfonic acid, N,N-dimethylaminoethylacrylate, N,N-dimethylaminoethylmethacrylate, N,N - diethylaminoethylacrylate, N,N-diethylaminoethylmethacrylate, N-vinylpyrrolidone, and 2-vinyl-5-methyl pyridine.

12. A method as defined in claim 1 and further including the step of reacting said metal phthalocyanine-bonded-polymer with a compound which, when reacted with said polymer, provides active reactive radicals for said polymer to produce said metal phthalocyanine-bonded-polymer having said active-reactive radicals in its structure.

13. A method as defined in claim 12 wherein said compound is selected from the group consisting of formaldehyde, dimethylolurea, trimethylolurea, tetramethylolurea, dimethylol melamine, trimethylol melamine, tetramethylol melamine, pentamethylol melamine, hexamethylol melamine, dialkylmethylolurea, trialkylmethylolurea, tetraalkylmethylolurea, dialkylmethylol melamine, trialkylmethylol melamine, tetraalkylmethylol melamine, pentaalkylmethylol melamine, hexaalkylmethylol melamine, epichlorohydrin, dichlorohydrin, thionyl chloride, cyanuric chloride, phosgene and hydrazine-nitrous acid.

14. A method as defined in claim 1 and further including the step of reacting said metal phthalocyanine-bonded-polymer with a compound which, when reacted with said polymer, provides radicals being selected from the group consisting of carboxyl radical, sulfate radical, sulfo radical, hydroxyl radical, ether radical, carboamide radical, amino radical, imino radical, tertiary amino radical, pyridine radical, aliphatic hydrocarbon radicals having 2 to 18 carbon atoms, aromatic and cyclic hydrocarbon radicals, which are capable of rendering said polymer solubilizable and dispersible to produce said metal phthalocyanine-bonded-polymer having said solubilizable and dispersible radicals in its structure.

15. A method as defined in claim 14 wherein said compound is selected from the group consisting of chloroacetic acid, sodium bisulfite, sulfamic acid, ethylene oxide, methanol, ethanol, propanol, glycidol, glycerin, ammonia, methylamine, ethylamine, butyl amine, dimethyl amine, diethyl amine, dibutyl amine, ethylenediamine, propylene diamine, hexamethylene diamine, diethylene triamine, dipropylene triamine, alkali, acid, stearyl amine, butanol, octyl alcohol, stearic acid, palmitic acid, oleic acid, stearyl amide and N-methylol stearyl amide.

16. A method as defined in claim 1 and further including the step of reacting said metal phthalocyanine-bonded-polymer with a compound which, when reacted with said polymer, provides active reactive radicals for said polymer to produce metal phthalocyanine-bonded-polymer having said active-reactive radicals in its structure and further reacting said last-named polymer with a compound which, when reacted with said polymer, provides the radicals capable of rendering said polymer solubilizable and dispersible to produce said metal phthalocyanine-bonded-polymer having said solubilizable and dispersible radicals in its structure.

17. A method as defined in claim 1 wherein the triamino metal phthalocyanine blue is copper phthalocyanine blue and the addition polymerizable monomer is methyl methacrylate.

18. A method as defined in claim 1 wherein the triamino metal phthalocyanine blue is copper phthalocyanine blue and the addition polymerizable monomer is acrylonitrile, succinimido, vinyldimethylamine, vinyldiethylamine, vinylsulfonic acid, N,N-dimethylaminoethylacrylate, N,N-dimethylaminoethylmethacrylate, N,N-diethylaminoethylacrylate, N,N - diethylaminoethylmethacrylate, N-vinylpyrrolidone, and 2-vinyl-5-methyl pyridine.

19. A method as defined in claim 1 and further including the step of reacting said metal phthalocyanine-bonded-polymer with a compound which, when reacted with said polymer, provides active reactive radicals for said polymer to produce said metal phthalocyanine-bonded-polymer having said active-reactive radicals in its structure.

20. A method as defined in claim 19 wherein said compound is selected from the group consisting of formaldehyde, dimethylolurea, trimethylolurea, tetramethylolurea, dimethylol melamine, trimethylol melamine, tetramethylol melamine, pentamethylol melamine, hexamethylol melamine, dialkylmethylolurea, trialkylmethylolurea, tetraalkylmethylolurea, dialkylmethylol melamine, trialkylmethylol melamine, tetraalkylmethylol melamine, pentaalkylmethylol melamine, hexaalkylmethylol melamine, epichlorohydrin, dichlorohydrin, thionyl chloride, cyanuric chloride, phosgene and hydrazine-nitrous acid.

21. A method as defined in claim 1 and further including the step of reacting said metal phthalocyanine-bonded-polymer with a compound which, when reacted with said polymer, provides radicals being selected from the group consisting of carboxyl radical, sulfate radical, sulfo radical, hydroxyl radical, ether radical, carboamide radical, amino radical, imino radical, tertiary amino radical, pyridine radical, aliphatic hydrocarbon radicals having 2 to 18 carbon atoms, aromatic and cyclic hydrocarbon radicals, which are capable of rendering said polymer solubilizable and dispersible to produce said metal phthalocyanine-bonded-polymer having said solubilizable and dispersible radicals in its structure.

References Cited

UNITED STATES PATENTS

| | | | |
|---|---|---|---|
| 2,500,023 | 3/1950 | Burk | 260—41 C |
| 2,996,381 | 8/1961 | Oster et al. | 96—49 |
| 3,232,691 | 2/1966 | Wilyhelm et al. | 260—144 |
| 3,340,221 | 9/1967 | Goldberg et al. | 260—41 C |
| 3,344,098 | 9/1967 | Horiguchi et al. | 260—41 C |

FOREIGN PATENTS

| | | | |
|---|---|---|---|
| 949,404 | 2/1964 | Great Britain | 8—DIG. 7 |

ALLAN LIEBERMAN, Primary Examiner

U.S. Cl. X.R.

8—4; 117—142, 147, 152, 161 UZ, 161 UT; 260—41 C, 144, 145